United States Patent
Sato et al.

(10) Patent No.: US 10,302,905 B2
(45) Date of Patent: May 28, 2019

(54) OPTICAL SYSTEM, IMAGE-CAPTURING DEVICE COMPRISING OPTICAL SYSTEM AND METHOD FOR MANUFACTURING OPTICAL SYSTEM

(71) Applicant: Nikon Corporation, Minato-ku, Tokyo (JP)

(72) Inventors: Haruo Sato, Kawaguchi (JP); Issei Tanaka, Yokohama (JP)

(73) Assignee: Nikon Corporation, Tokyo (JP)

(*) Notice: Subject to any disclaimer, the term of this patent is extended or adjusted under 35 U.S.C. 154(b) by 96 days.

(21) Appl. No.: 15/544,308

(22) PCT Filed: Jan. 21, 2016

(86) PCT No.: PCT/JP2016/051723
§ 371 (c)(1),
(2) Date: Jul. 18, 2017

(87) PCT Pub. No.: WO2016/117651
PCT Pub. Date: Jul. 28, 2016

(65) Prior Publication Data
US 2018/0024315 A1 Jan. 25, 2018

(30) Foreign Application Priority Data

Jan. 23, 2015 (JP) .................................. 2015-011652
May 13, 2015 (JP) ................................. 2015-098229

(51) Int. Cl.
*G02B 9/64* (2006.01)
*G02B 1/115* (2015.01)
(Continued)

(52) U.S. Cl.
CPC ................ *G02B 9/64* (2013.01); *G02B 1/115* (2013.01); *G02B 13/02* (2013.01); *G02B 13/18* (2013.01)

(58) Field of Classification Search
None
See application file for complete search history.

(56) References Cited

U.S. PATENT DOCUMENTS

| | | | |
|---|---|---|---|
| 2009/0244724 A1 | 10/2009 | Shibata | |
| 2012/0050872 A1* | 3/2012 | Ito ............................ | G02B 7/08 359/601 |
| 2012/0327289 A1 | 12/2012 | Souma et al. | |

FOREIGN PATENT DOCUMENTS

| | | |
|---|---|---|
| JP | 2009-244696 A | 10/2009 |
| JP | 2009-244699 A | 10/2009 |

(Continued)

OTHER PUBLICATIONS

English Translation of International Search Report from International Patent Application No. PCT/JP2016/051723, dated Apr. 19, 2016.

*Primary Examiner* — Derek S. Chapel
(74) *Attorney, Agent, or Firm* — Shapiro, Gabor and Rosenberger, PLLC

(57) ABSTRACT

An optical system includes, disposed in sequence along an optical axis starting on an object side: a first lens group having a positive refractive power, which remains fixed relative to an image surface upon focusing; and a second lens group having a positive refractive power, which moves along the optical axis upon focusing, wherein: the first lens group includes: a first partial lens group that comprises at least two positive lenses and has a positive refractive power; and a negative lens, the second lens group includes: at least one meniscus lens with a convex surface thereof facing the object side; a second partial lens group that includes at least one negative lens and at least one positive lens, and has a positive refractive power; and a cemented lens that is formed (Continued)

by bonding together a plurality of lenses and has a positive refractive power, wherein: a predetermined conditional expression is satisfied.

36 Claims, 26 Drawing Sheets

(51) Int. Cl.
*G02B 13/02* (2006.01)
*G02B 13/18* (2006.01)

(56) References Cited

FOREIGN PATENT DOCUMENTS

| JP | 2011-170128 A | 9/2011 |
|---|---|---|
| WO | WO 2011-108428 A1 | 9/2011 |

* cited by examiner

OPTICAL SYSTEM, IMAGE-CAPTURING DEVICE COMPRISING OPTICAL SYSTEM AND METHOD FOR MANUFACTURING OPTICAL SYSTEM

TECHNICAL FIELD

The present invention relates to an optical system, an image-capturing device that comprises the optical system and a method for manufacturing the optical system.

BACKGROUND ART

Numerous lenses commonly known as rear-focusing lenses have been proposed in the related art (see, for instance, Patent Document #1).

CITATION LIST

Patent Literature

Patent Document #1: Japanese Laid Open Patent Publication No. 2011-170128

SUMMARY OF INVENTION

Technical Problem

However, comatic aberration cannot be corrected to a sufficient extent in the rear focusing lenses in the related art.

Solution to Problem

According to the 1st aspect of the present invention, an optical system comprises, disposed in sequence along an optical axis starting on an object side: a first lens group having a positive refractive power, which remains fixed relative to an image surface upon focusing; and a second lens group having a positive refractive power, which moves along the optical axis upon focusing, wherein: the first lens group comprises: a first partial lens group that comprises at least two positive lenses and has a positive refractive power; and a negative lens, the second lens group comprises: at least one meniscus lens with a convex surface thereof facing the object side; at least one negative lens disposed toward the image surface relative to the meniscus lens; a second partial lens group that is disposed next to and on the image surface side of a negative lens having a highest negative refractive power, among the at least one negative lens, comprises at least one positive lens, and has a positive refractive power; and a cemented lens that is disposed on the image surface side of the second partial lens group, is formed by bonding together a plurality of lenses and has a positive refractive power, wherein: a lens surface in the second partial lens group, located closest to the image surface side and a lens surface of the cemented lens, located closest to the object side, have a convex shape facing the image surface side and sit opposite each other via an air gap; and a following conditional expression is satisfied:

$$-1.00<(rbc2-rbc1)/(rbc2+rbc1)<0.00$$

where:
rbc1: a radius of curvature of the lens surface in the second partial lens group located closest to the image surface side; and
rbc2: a radius of curvature of the lens surface of the cemented lens located closest to the object side.

According to the 2nd aspect of the present invention, in the optical system according to the first aspect, it is preferred that a following conditional expression is satisfied:

$$0.00<|(ra2-ra1)/(ra2+ra1)|<1.00$$

where:
ra1: a radius of curvature of an object side lens surface of the meniscus lens; and
ra2: a radius of curvature of an image surface side lens surface of the meniscus lens.

According to the 3rd aspect of the present invention, in the optical system according to the first or second aspect, it is preferred that a following conditional expression is satisfied:

$$0.40<f2/f0<1.00$$

where:
f2: a focal length of the second lens group; and
f0: a focal length of an entire system in an infinity in-focus state.

According to the 4th aspect of the present invention, in the optical system according to the 1st through 3rd aspects, it is preferred that a following conditional expression is satisfied:

$$0.80<f1/f0<10.00$$

where:
f1: a focal length of the first lens group; and
f0: a focal length of an entire system in an infinity in-focus state.

According to the 5th aspect of the present invention, in the optical system according to any one of the 1st through 4th aspects, it is preferred that a following conditional expression is satisfied:

$$55.00<vd1a$$

where:
vd1a: an average value of Abbe numbers of the at least two positive lenses in the first partial lens group.

According to the 6th aspect of the present invention, in the optical system according to any one of the 1st through 5th aspects, it is preferred that a following conditional expression is satisfied:

$$50.00<vd2b$$

where:
vd2b: an average value of Abbe numbers of the at least one positive lens in the second partial lens group.

According to the 7th aspect of the present invention, in the optical system according to any one of the 1st through 6th aspects, it is preferred that a following conditional expression is satisfied:

$$0.50<f2c/f0<3.00$$

where:
f2c: a focal length of the cemented lens; and
f0: a focal length of an entire system in an infinity in-focus state.

According to the 8th aspect of the present invention, in the optical system according to any one of the 1st through 7th aspects, it is preferred that the cemented lens includes at least one positive lens and at least one negative lens; and a following conditional expression is satisfied:

$$0.10<N2cp-N2cn<0.50$$

where:

N2cp: a refractive index at a d-line of an image surface side positive lens that is disposed closest to the image surface side, among the at least one positive lens, in the cemented lens; and N2cn: a refractive index at the d-line of a negative lens bonded on the object side of the image surface side positive lens, among the at least one negative lens, in the cemented lens.

According to the 9th aspect of the present invention, in the optical system according to any one of the 1st through 8th aspects, it is preferred that the optical system further comprises an aperture stop, via which an F number is determined, disposed toward the image surface side relative to the first lens group.

According to the 10th aspect of the present invention, in the optical system according to any one of the 1st through 8th aspects, it is preferred that the optical system further comprises an aperture stop, via which an F number is determined, disposed in the second lens group.

According to the 11th aspect of the present invention, in the optical system according to any one of the 1st through 8th aspects, it is preferred that the optical system further comprises an aperture stop, via which an F number is determined, disposed between the meniscus lens and a negative lens located closest to the object side, among the at least one negative lens in the second lens group.

According to the 12th aspect of the present invention, in the optical system according to any one of the 1st through 11th aspects, it is preferred that the optical system comprises at least one aspherical surface.

According to the 13th aspect of the present invention, in the optical system according to any one of the 1st through 12th aspects, it is preferred that an anti-reflection film is disposed at at least one optical surface; and the anti-reflection film comprises at least one layer formed through a wet process.

According to the 14th aspect of the present invention, in the optical system according to the 13th aspect, it is preferred that the anti-reflection film is a multilayer film; and the layer formed through the wet process is a layer at an outermost surface side, among layers constituting the multilayer film.

According to the 15th aspect of the present invention, in the optical system according to the 13th or 14th aspect, it is preferred that nd representing a refractive index at a d-line (wavelength $\lambda$=587.6 nm) of the layer formed through the wet process is equal to or less than 1.30.

According to the 16th aspect of the present invention, in the optical system according to any one of the 13th through 15th aspects, it is preferred that the optical surface at which the anti-reflection film is disposed is a lens surface having a concave shape viewed from an aperture stop.

According to the 17th aspect of the present invention, in the optical system according to the 16th aspect, it is preferred that the lens surface having the concave shape viewed from the aperture stop is an image surface side lens surface.

According to the 18th aspect of the present invention, in the optical system according to the 16th aspect, it is preferred that the lens surface having the concave shape viewed from the aperture stop is an object side lens surface.

According to the 19th aspect of the present invention, in the optical system according to any one of the 13th through 18th aspects, it is preferred that the optical surface at which the anti-reflection film is disposed is a lens surface having a concave shape viewed from the object side.

According to the 20th aspect of the present invention, in the optical system according to any one of the 13th through 18th aspects, it is preferred that the optical surface at which the anti-reflection film is disposed is a lens surface having a concave shape viewed from the image surface side.

According to the 21st aspect of the present invention, an image-capturing device comprises the optical system according to any one of the 1st through 20th aspects.

According to the 22nd aspect of the present invention, an optical system comprises, disposed in sequence along an optical axis starting on an object side: a first lens group having a positive refractive power, which remains fixed along an optical axis relative to the image surface upon focusing; a second lens group having a positive refractive power, which moves along the optical axis upon focusing; and a third lens group having a positive refractive power, which remains fixed along the optical axis relative to the image surface upon focusing, wherein: the first lens group comprises a partial lens group that comprises at least two positive lenses and has, as a whole, a positive refractive power and a negative lens; the second lens group comprises a positive lens, a negative lens and a cemented lens having a positive refractive power, disposed in sequence starting on the object side; the third lens group comprises a cemented lens; and a following conditional expression is satisfied:

$$-1.00<(r2nb+r2na)/(r2nb-r2na)<0.00$$

where:

r2na: a radius of curvature of an object side lens surface of the negative lens in the second lens group; and r2nb: a radius of curvature of an image side lens surface of the negative lens in the second lens group.

According to the 23rd aspect of the present invention, in the optical system according to any one of the 22nd aspect, it is preferred that the following conditional expression is satisfied:

$$0.35<f2/f1<1.00$$

where:

f2: a focal length of the second lens group; and f1: a focal length of the first lens group.

According to the 24th aspect of the present invention, in the optical system according to the 22nd or 23rd aspect, it is preferred that a following conditional expression is satisfied:

$$0.00<X2/f2<0.10$$

where:

X2: a distance by which the second lens group moves for focusing from an infinity in-focus state to a state equivalent to an image-forming magnification factor $\beta$=−1/30; and f2: a focal length of the second lens group.

According to the 25th aspect of the present invention, in the optical system according to any one of the 22nd through 24th aspects, it is preferred that a following conditional expression is satisfied:

$$1.00<f3/f0<20.00$$

where:

f3: a focal length of the third lens group; and f0: a focal length of an entire system in an infinity in-focus state.

According to the 26th aspect of the present invention, in the optical system according to any one of the 22nd through 25th aspects, it is preferred that the cemented lens in the second lens group is formed by bonding together a negative lens and a positive lens; and a following conditional expression is satisfied:

$$0.10<N24-N23<0.50$$

where:

N23: a refractive index at a d-line of the negative lens constituting part of the cemented lens in the second lens group; and N24: a refractive index at the d-line of the positive lens constituting part of the cemented lens in the second lens group.

According to the 27th aspect of the present invention, in the optical system according to any one of the 22nd through 26th aspects, it is preferred that the cemented lens in the third lens group comprises an object side positive lens that is disposed closest to the object side and a negative lens bonded on an image side of the object side positive lens; and a following conditional expression is satisfied:

$$0.10 < N31 - N32 < 0.50$$

where:

N31: a refractive index of the object side positive lens at a d-line; and

N32: a refractive index at the d-line of the negative lens bonded on the image side of the object-side positive lens.

According to the 28th aspect of the present invention, in the optical system according to any one of the 22nd through 27th aspects, it is preferred that a following conditional expression is satisfied:

$$57.00 < vd1a$$

where:

vd1a: an average value of Abbe numbers of the at least two positive lenses in the partial lens group.

According to the 29th aspect of the present invention, in the optical system according to any one of the 22nd through 28th aspects, it is preferred that the optical system further comprises an aperture stop, via which an F number is determined, disposed toward an image side relative to the first lens group.

According to the 30th aspect of the present invention, in the optical system according to any one of the 22nd through 28th aspects, it is preferred that the optical system further comprises an aperture stop, via which an F number is determined, disposed in the second lens group.

According to the 31st aspect of the present invention, it is preferred that the optical system according to any one of the 22nd through 28th aspects, further comprises an aperture stop, via which an F number is determined, disposed between the positive lens and the negative lens within the second lens group, or between the negative lens and the cemented lens within the second lens group.

According to the 32nd aspect of the present invention, in the optical system according to any one of the 22nd through 31st aspects, it is preferred that the optical system comprises at least one aspherical surface.

According to the 33rd aspect of the present invention, an image-capturing device comprises the optical system according to any one of the 22nd through 32nd aspects.

According to the 34th aspect of the present invention, a method for manufacturing an optical system that comprises a first lens group having a positive refractive power, which remains fixed relative to an image surface upon focusing, and a second lens group having a positive refractive power, which moves along an optical axis upon focusing, disposed in sequence along the optical axis starting on an object side, comprises: achieving that the first lens group comprises: a first partial lens group that comprises at least two positive lenses and has a positive refractive power; and a negative lens; achieving that the second lens group comprises: at least one meniscus lens with a convex surface thereof facing the object side; at least one negative lens, disposed toward an image surface side relative to the meniscus lens; a second partial lens group that is disposed next to and on the image surface side of a negative lens having a highest negative refractive power, among the at least one negative lens, comprises at least one positive lens and has a positive refractive power; and a cemented lens that is disposed on the image surface side of the second partial lens group, is formed by bonding together a plurality of lenses and has a positive refractive power; achieving that a lens surface located closest to the image surface side in the second partial lens group and a lens surface located closest to the object side in the cemented lens have a convex shape facing the image surface side and sit opposite each other via an air gap; and achieving that a following conditional expression is satisfied:

$$-1.00 < (rbc2 - rbc1)/(rbc2 + rbc1) < 0.00$$

where:

rbc1: a radius of curvature of the lens surface in the second partial lens group located closest to the image surface side; and rbc2: a radius of curvature of the lens surface of the cemented lens located closest to the object side.

According to the 35th aspect of the present invention, in the method for manufacturing an optical system according to the 34th aspect, it is preferred that the method further comprises: disposing an anti-reflection film at at least one optical surface, wherein: the anti-reflection film comprises at least one layer formed through a wet process.

According to the 36th aspect of the present invention, a method for manufacturing an optical system that comprises a first lens group having a positive refractive power, which remains fixed along an optical axis relative to an image surface upon focusing, a second lens group having a positive refractive power, which moves along the optical axis upon focusing, and a third lens group having a positive refractive power, which remains fixed along the optical axis relative to the image surface upon focusing, disposed in sequence along the optical axis starting on an object side, comprises: achieving that the first lens group comprises a partial lens group which comprises at least two positive lenses and has, as a whole, a positive refractive power, and a negative lens; achieving that the second lens group comprises a positive lens, a negative lens and a cemented lens having a positive refractive power, disposed in sequence starting on the object side; achieving that the third lens group comprises a cemented lens; and achieving that a following conditional expression is satisfied:

$$-1.00 < (r2nb + r2na)/(r2nb - r2na) < 0.00$$

where:

r2na: a radius of curvature of an object side lens surface of the negative lens in the second lens group; and r2nb: a radius of curvature of an image side lens surface of the negative lens in the second lens group.

DESCRIPTION OF EMBODIMENTS

Figure 1:
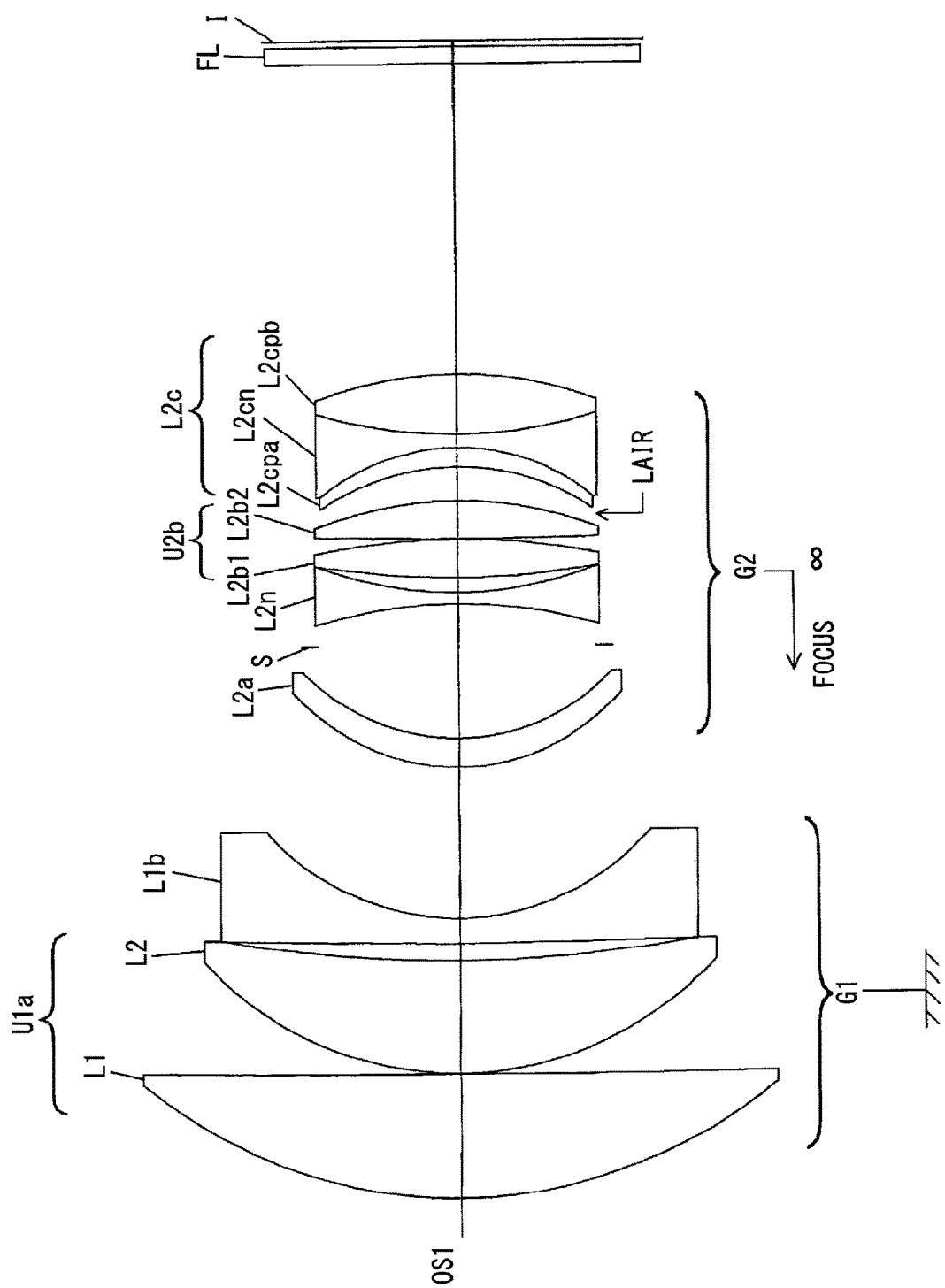
FIG. 1 is a figure showing a sectional view of a lens configuration adopted in an optical system in a first example in an infinity in-focus state.

The following is a description of an optical system, an image-capturing device and an optical system manufacturing method in a first embodiment of the present invention. As shown in FIG. 1, an optical system OS in the embodiment comprises a first lens group having a positive refractive power, which remains fixed relative to the image surface upon focusing, and a second lens group having a positive refractive power, which moves along an optical axis upon focusing, disposed in this order along the optical axis starting on an object side. The first lens group comprises a first partial lens group that is made up with at least two positive lenses and has a positive refractive power, and a negative lens. The second lens group comprises at least one meniscus lens with a convex surface thereof facing the object side, at least one negative lens, disposed further toward the image surface relative to the meniscus lens, a second partial lens group that is disposed next to and on the image surface side of a negative lens with a highest negative refractive power among the at least one negative lens, comprises at least one positive lens and has a positive refractive power, and a cemented lens that is disposed on the image surface side of the second partial lens group, which is formed by bonding a plurality of lenses and has a positive refractive power. A lens surface in the second partial lens group, located closest to the image surface side and a lens surface of the cemented lens located closest to the object side both assume a convex shape facing the image surface side and sit opposite each other via an air gap.

In the optical system OS in the embodiment, the problems of a rear focusing optical system basically with a fixed front group, more specifically, spherical aberration, comatic aberration and particularly sagittal comatic aberration, which occur more notably in large diameter lenses, can be better corrected without worsening chromatic aberration, field curvature and astigmatism. The following is a description of conditions required in the configuration of such an optical system.

It is desirable that the following conditional expression (1) be satisfied in the optical system OS in the embodiment.

$$-1.00 < (rbc2-rbc1)/(rbc2+rbc1) < 0.00 \quad (1), \text{where:}$$

rbc1: a radius of curvature of the lens surface in the second partial lens group closest to the image surface side; and rbc2: a radius of curvature of the lens surface of the cemented lens closest to the object side.

Conditional expression (1) defines the shape of the lens surface in the second partial lens group located closest to the image surface and the shape of the lens surface of the cemented lens that is disposed on the image surface side of the second partial lens group, which is located closest to the object side. When the air gap between the lens surface in the second partial lens group closest to the image surface and the lens surface of the cemented lens closest to the object side is regarded as an air lens, conditional expression (1) defines the reciprocal of a shape factor of the air lens. Crucial structural requirements are that the air lens takes on the shape of a positive lens and that the convex surface of this positive lens faces the image surface side. By adopting this structure, it becomes possible to assure good correction of spherical aberration and comatic aberration in a manner optimal for larger diameter optical systems.

The fact that conditional expression (1) indicates a negative value means that the absolute value of the radius of curvature of the interface of the air lens located on the object side is large and that the absolute value of the radius of curvature of the interface of the air lens on the image surface side is small. In addition, the fact that conditional expression (1) indicates a value within the range greater than "−1" and smaller than "0" means that assuming that the air lens takes the shape of a positive lens, it has the shape of a positive meniscus lens with the convex surface thereof facing the image side.

If conditional expression (1) indicated a value in the range greater than "0" and smaller than "+1", it would mean that assuming the air lens took the shape of a positive lens, it would have the shape of a positive meniscus lens with the convex surface thereof facing the object side. In addition, if conditional expression (1) indicated a value in the range greater than "+1" it would mean that assuming the air lens took the shape of a positive lens, it would be a positive lens with a bi-convex shape deviating from a plano-convex shape with the convex surface thereof facing the object side.

A value exceeding the upper limit value set in conditional expression (1) would indicate that assuming the air lens took the shape of a positive lens, it would have the shape of a positive meniscus lens with the concave surface thereof facing the image surface side. In other words, the radius of curvature of the lens surface in the second partial lens group located closest to the image surface side and the radius of curvature of the lens surface of the cemented lens closest to the object side would both take positive values. Under such circumstances, comatic aberration, sagittal comatic aberration, field curvature and astigmatism would become more pronounced. Namely, an undesirable outcome. It is to be noted that the various types of aberration can be corrected more effectively by setting the upper limit values in conditional expression (1) to −0.01. In addition, the advantageous effects of the embodiment can be maximized by setting the upper limit value in conditional expression (1) to −0.05.

A value below the lower limit value set in conditional expression (1) would indicate that assuming the air lens took the shape of a positive lens, it would have the shape of a bi-convex lens. In other words, the radius of curvature of the lens surface in the second partial lens group, located closest to the image surface side would take a positive value and the radius of curvature of the lens surface of the cemented lens closest to the object side would take a negative value. Under such circumstances, correction of spherical aberration would become difficult. Namely, a clearly undesirable outcome. It is to be noted that the various types of aberration can be corrected more effectively by setting the lower limit value in conditional expression (1) to −0.95. In addition, the advantageous effects of the embodiment can be maximized by setting the lower limit value in conditional expression (1) to −0.90.

By adopting the structure described above, a high performance optical system at which the extents of comatic aberration and, in particular, sagittal comatic aberration, and spherical aberration are kept down can be achieved without requiring a large number of components.

In addition, it is desirable that the following conditional expression (2) be satisfied in the optical system OS in the embodiment.

$$0.00<|(ra2-ra1)/(ra2+ra1)|<1.00 \qquad (2)$$

where:
ra1: a radius of curvature of the object side lens surface of the meniscus lens
ra2: a radius of curvature of the image surface side lens surface of the meniscus lens.

Conditional expression (2) defines the absolute value of the reciprocal of a shape factor pertaining to the meniscus lens in the second lens group. The meniscus lens may have either a positive refractive power or a negative refractive power, and the aberration correction achieved in the embodiment is characterized by the shape of the meniscus lens with its convex surface thereof facing the object side.

A value exceeding the upper limit value set in conditional expression (2) would indicate that the lens that should take a meniscus shape is actually either a bi-convex lens or a bi-concave lens. Under such circumstances, spherical aberration and comatic aberration would become more pronounced and the extent of short-distance aberration fluctuation would increase. Namely, the outcome would be undesirable. It is to be noted that the various types of aberration mentioned above can be corrected more effectively by setting the upper limit value in conditional expression (2) to 0.80. In addition, the various types of aberration mentioned above can be corrected even more effectively by setting the upper limit value in conditional expression (2) to 0.60. Furthermore, the advantageous effects of the embodiment can be maximized by setting the upper limit value in conditional expression (2) to 0.50.

The various types of aberration mentioned above can be corrected more effectively by setting the lower limit value in conditional expression (2) to 0.001. In addition, the various types of aberration mentioned above can be corrected even more effectively by setting the lower limit value in conditional expression (2) to 0.005.

It is also desirable that the following conditional expression (3) be satisfied in the optical system OS in the embodiment.

$$0.40<f2/f0<1.00 \qquad (3)$$

where:
f2: a focal length of the second lens group; and
f0: a focal length of the overall system in an infinity in-focus state.

Conditional expression (3) defines the optimal range for the focal length of the second lens group G2, i.e., the optimal range for the refractive power of the second lens group G2.

A value exceeding the upper limit value set in conditional expression (3) would indicate that the second lens group would have a lower refractive power, which would lead to a bulkier optical system and an increase in the extent to which the second lens group must move upon focusing. In other words, AF drive via an actuator would be difficult. In addition, the extents of short-distance fluctuation in field curvature and spherical aberration would increase. Namely, the outcome would be undesirable from the viewpoint of aberration correction, as well. It is to be noted that the various types of aberration mentioned above can be corrected more effectively by setting the upper limit value in conditional expression (3) to 0.90. In addition, the various types of aberration mentioned above can be corrected even more effectively by setting the upper limit value in conditional expression (3) to 0.85. Furthermore, the advantageous effects of the embodiment can be maximized by setting the upper limit value in conditional expression (3) to 0.80.

In addition, a value lower than the lower limit value set in conditional expression (3) would indicate that the second lens group would have a higher refractive power which would make it difficult to correct, in particular, spherical aberration, comatic aberration and sagittal comatic aberration. Namely, the outcome would be undesirable. It is to be noted that the various types of aberration can be corrected more effectively by setting the lower limit value in conditional expression (3) to 0.50. In addition, the various types of aberration can be corrected even more effectively by setting the lower limit value in conditional expression (3) to 0.60. Furthermore, the advantageous effects of the embodiment can be maximized by setting the lower limit value in conditional expression (3) to 0.70.

In addition, it is desirable that the following conditional expression (4) be satisfied in the optical system OS in the embodiment.

$$0.80 < f1/f0 < 10.00 \quad (4)$$

where:
f1: focal length of the first lens group
f0: focal length of the overall system in an infinity in-focus state.

Conditional expression (4) defines the optimal range for the focal length of the first lens group, i.e., the optimal range for the refractive power of the first lens group.

A value exceeding the upper limit value set in conditional expression (4) would indicate that the first lens group, which remains fixed relative to the image surface upon focusing, would be rendered into an afocal converter. In such a case, the entire optical system would become larger. This, in turn, would result in difficulty in AF drive via an actuator. An attempt at reducing the diameter of the optical system under such circumstances would result in worsened comatic aberration and sagittal comatic aberration. In other words, the outcome would be undesirable. It is to be noted that the various types of aberration mentioned above can be corrected more effectively by setting the upper limit value in conditional expression (4) to 7.00. In addition, the various types of aberration mentioned above can be corrected even more effectively by setting the upper limit value in conditional expression (4) to 6.00. Furthermore, the advantageous effects of the embodiment can be maximized by setting the upper limit value in conditional expression (4) to 5.00.

In addition, a value lower than the lower limit value set in conditional expression (4) would indicate that the first lens group would have a higher refractive power which would make it difficult to correct spherical aberration, field curvature and axial chromatic aberration. Namely, the outcome would be undesirable. It is to be noted that the various types of aberration mentioned above can be corrected more effectively by setting the lower limit value in conditional expression (4) to 0.90. In addition, the various types of aberration mentioned above can be corrected even more effectively by setting the lower limit value in conditional expression (4) to 1.00. Furthermore, the advantageous effects of the embodiment can be maximized by setting the lower limit value in conditional expression (4) to 1.50.

Furthermore, it is desirable that the following conditional expression (5) be satisfied in the optical system OS in the embodiment.

$$55.00 < vd1a \quad (5)$$

where:
vd1a: an average value of Abbe numbers of the at least two positive lenses in the first partial lens group.

Conditional expression (5) expresses conditions to be satisfied when setting the average value for the Abbe numbers of all the positive lenses in the first partial lens group which comprises a plurality of positive lenses. The first partial lens group, which is part of the first lens group, is located toward the object side within the first lens group and has a positive refractive power, bears significant relevance to achieving good correction of axial chromatic aberration and chromatic aberration of magnification. Through this embodiment, axial chromatic aberration, in particular, can be corrected with improved effectiveness by utilizing anomalous partial dispersion glass or fluorite.

If the conditions expressed in conditional expression (5) were not satisfied, the glass material having characteristics known as anomalous partial dispersion characteristics could not be used and thus it would be difficult to assure good correction of axial chromatic aberration and chromatic aberration of magnification and in particular, good correction of second-order dispersion. It is to be noted that the various types of aberration such as chromatic aberration can be corrected more effectively by setting the lower limit value in conditional expression (5) to 60.00. In addition, the various types of aberration such as axial chromatic aberration can be corrected even more effectively by setting the lower limit value in conditional expression (5) to 65.00. Furthermore, the advantageous effects of the embodiment can be maximized by setting the lower limit value in conditional expression (5) to 75.00.

It is further desirable that the following conditional expression (6) be satisfied in the optical system OS in the embodiment.

$$50.00 < vd2b \quad (6)$$

where:
vd2b: an average value of Abbe numbers of the at least one positive lens in the second partial lens group.

Conditional expression (6) expresses conditions to be satisfied when setting the average value for the Abbe numbers of all the positive lenses in the second partial lens group which comprises at least one positive lens. The second partial lens group, which is part of the second lens group, is located toward the object side within the second lens group, bears significant relevance to achieving good correction of axial chromatic aberration and chromatic aberration of magnification. Through this embodiment, axial chromatic aberration, in particular, can be corrected with improved effectiveness by utilizing anomalous partial dispersion glass or fluorite.

If the conditions expressed in conditional expression (6) were not satisfied, the glass material having characteristics known as anomalous partial dispersion characteristics could not be used and thus it would be difficult to assure good correction of axial chromatic aberration and chromatic aberration of magnification and in particular, good correction of second-order dispersion. It is to be noted that the various types of aberration such as chromatic aberration can be corrected more effectively by setting the lower limit value in conditional expression (6) to 53.00. In addition, the various types of aberration such as axial chromatic aberration can be corrected even more effectively by setting the lower limit value in conditional expression (6) to 55.00. Furthermore, the advantageous effects of the embodiment can be maximized by setting the lower limit value in conditional expression (6) to 58.00.

It is also desirable that the following conditional expression (7) be satisfied in the optical system OS in the embodiment.

$$0.50 < f2c/f0 < 3.00 \quad (7)$$

where:

f2c: a focal length of the cemented lens; and f0: a focal length of the overall system in an infinity in-focus state.

Conditional expression (7) defines the focal length of the cemented lens, i.e., the refractive power of the cemented lens.

A value exceeding the upper limit value set in conditional expression (7) would indicate that the cemented lens would have a lower refractive power. Under such circumstances, it would be difficult to comatic aberration, sagittal comatic aberration and field curvature. Namely, the outcome would be undesirable. It is to be noted that the various types of aberration mentioned above can be corrected more effectively by setting the upper limit value in conditional expression (7) to 2.50. Furthermore, the advantageous effects of the embodiment can be maximized by setting the lower limit value in conditional expression (7) to 2.00.

In addition, a value lower than the lower limit value set in conditional expression (7) would indicate that the cemented lens L2c would have a higher refractive power. Under such circumstances, it would be difficult to correct astigmatism and field curvature. Namely, the outcome would be undesirable. It is to be noted that the various types of aberration can be corrected more effectively by setting the lower limit value in conditional expression (7) to 0.70. Furthermore, the advantageous effects of the embodiment can be maximized by setting the lower limit value in conditional expression (7) to 1.00.

It is further desirable that the cemented lens in the optical system OS in the embodiment comprise at least one positive lens and at least one negative lens and that the cemented lens satisfy the following conditional expression (8).

$$0.10 < N2cp - N2cn < 0.50 \quad (8)$$

where:

N2cp: a d-line refractive index of the image surface side positive lens that is disposed closest to the image surface side among the at least one positive lens in the cemented lens.

N2cn: a d-line refractive index of the negative lens bonded on the object side of the image surface side positive lens among the at least one negative lens in the cemented lens.

Conditional expression (8) defines conditions to be satisfied with regard to the relationship between the value representing the refractive index at the d-line of the positive lens that is disposed closest to the image surface side, among the positive lenses, the minimum quantity of which is one, in the cemented lens, and the value representing the refractive index at the d-line of the negative lens bonded on the object side of the particular positive lens. Under these conditions, an optimal value can be set for the Petzval sum and field curvature and astigmatism can be effectively corrected.

A value exceeding the upper limit value set in conditional expression (8) would indicate that a large quantity of high dispersion glass material would be used, which would make it difficult to correct axial chromatic aberration and chromatic aberration of magnification. In other words, the outcome would be undesirable. It is to be noted that the various types of aberration mentioned above can be corrected more effectively by setting the upper limit value in conditional expression (8) to 0.45. In addition, the various types of aberration mentioned above can be corrected even more effectively by setting the upper limit value in conditional expression (8) to 0.40. Furthermore, the advantageous effects of the embodiment can be maximized by setting the upper limit value in conditional expression (8) to 0.30.

In addition, a value below the lower limit value set in conditional expression (8) would indicate that an optimal Petzval sum could not be set, which would make it difficult to correct field curvature and astigmatism. In other words, the outcome would be undesirable. It is to be noted that the various types of aberration can be corrected more effectively by setting the lower limit value in conditional expression (8) to 0.15. In addition, the various types of aberration can be corrected even more effectively by setting the lower limit value in conditional expression (8) to 0.20. Furthermore, the advantageous effects of the embodiment can be maximized by setting the lower limit value in conditional expression (8) to 0.25.

It is further desirable that the optical system OS in the embodiment comprise an aperture stop via which the F number is determined, disposed further toward the image surface side relative to the first lens group. It is even more desirable that the optical system OS comprise an aperture stop for determining the F number disposed within the second lens group. It is further desirable that the optical system OS comprise an aperture stop for determining the F number, disposed between the meniscus lens and the negative lens that is disposed closest to the object side among the at least one negative lens included in the second lens group. The presence of such an aperture stop will make it possible to effectively correct chromatic aberration and distortion.

It is desirable that the optical system OS in the embodiment comprise at least one aspherical surface. In such an optical system, comatic aberration, sagittal comatic aberration and spherical aberration can be corrected in a desirable manner.

Moreover, it is desirable that an anti-reflection film be disposed at at least one surface among optical surfaces in the optical system OS in the embodiment and that the anti-reflection film comprise at least one layer formed through a wet process. The extents of ghosting and flare occurring as light from an object is reflected at optical surfaces can be reduced by adopting this structure and as a result, a higher level of image forming performance can be achieved.

It is desirable that the anti-reflection film in the optical system OS in the embodiment be a multilayer film and that the layer formed through the wet process be a layer at an outermost surface side among the layers constituting the multilayer film. The difference between the refractive index of the layer formed through the wet process in this anti-reflection film and the refractive index of air can be reduced, which, in turn, makes it possible to further reduce light reflection and ultimately further reduce the extents of ghosting and flare.

In addition, it is desirable that nd, representing the refractive index at the d-line (wavelength $\lambda = 587.6$ nm) pertaining to the layer formed through the wet process be equal to or less than 1.30 in the optical system OS in the embodiment. Since the refractive index difference between the layer formed through the wet process and the air can be reduced through these measures, light reflection will be further reduced, which in turn will make it possible to further reduce the extents of ghosting and flare.

It is desirable that the optical surface at which the anti-reflection film is disposed in the optical system OS in the embodiment be a lens surface having a concave shape viewed from the aperture stop. Light tends to be reflected readily at a lens surface having a concave shape viewed from the aperture stop, and accordingly, the extents of ghosting and flare can be effectively reduced by forming an anti-reflection film at such a lens surface.

In addition, it is desirable that the lens surface having a concave shape viewed from the aperture stop in the optical system OS in the embodiment be an image surface side lens surface of a lens included in the first lens group. Light tends to be reflected readily at a lens surface having a concave shape viewed from the aperture stop, among the optical surfaces in the first lens group. Accordingly, the extents of ghosting and flare can be effectively reduced by forming an anti-reflection film at such a lens surface.

Furthermore, it is desirable that the lens surface having a concave shape viewed from the aperture stop in the optical system OS in the embodiment be an object side lens surface of a lens included in the first lens group. Light tends to be reflected readily at a lens surface having a concave shape viewed from the aperture stop, among the optical surfaces in the first lens group. Accordingly, the extents of ghosting and flare can be effectively reduced by forming an anti-reflection film at such a lens surface.

In addition, it is desirable that the lens surface having a concave shape viewed from the aperture stop in the optical system OS in the embodiment be an image surface side lens surface of a lens included in the second lens group. Light tends to be reflected readily at a lens surface having a concave shape viewed from the aperture stop, among the optical surfaces in the second lens group. Accordingly, the extents of ghosting and flare can be effectively reduced by forming an anti-reflection film at such a lens surface.

It is also desirable that the lens surface having a concave shape viewed from the aperture stop in the optical system OS in the embodiment be an object side lens surface of a lens included in the second lens group. Light tends to be reflected readily at a lens surface having a concave shape viewed from the aperture stop, among the optical surfaces in the second lens group. Accordingly, the extents of ghosting and flare can be effectively reduced by forming an anti-reflection film at such a lens surface.

It is further desirable that the optical surface at which the anti-reflection film is disposed in the optical system OS in the embodiment be a lens surface having a concave shape viewed from the object side. Light tends to be reflected readily at a lens surface having a concave shape viewed from the object side among the optical surfaces in the first lens group and the second lens group. Accordingly, the extents of ghosting and flare can be effectively reduced by forming an anti-reflection film at such a lens surface.

It is desirable that the optical surface at which the anti-reflection film is disposed in the optical system OS in the embodiment be a lens surface having a concave shape viewed from the image side. Light tends to be reflected readily at a lens surface having a concave shape viewed from the image side among the optical surfaces in the first lens group and the second lens group. Accordingly, the extents of ghosting and flare can be effectively reduced by forming an anti-reflection film at such a lens surface.

It is to be noted that the anti-reflection film in the optical system in the embodiment may be formed through a dry process or the like instead of a wet process. In such a case, it is desirable to form the anti-reflection film so that it comprises at least one layer with a refractive index equal to or less than 1.30. In conjunction with an anti-reflection film formed through a dry process or the like as described above, advantages similar to those achieved via the anti-reflection film formed through the wet process can be realized. It is desirable that the layer with a refractive index equal to or less than 1.30 be the layer at an outermost surface side among the layers constituting the multilayer film.

Figure 9:
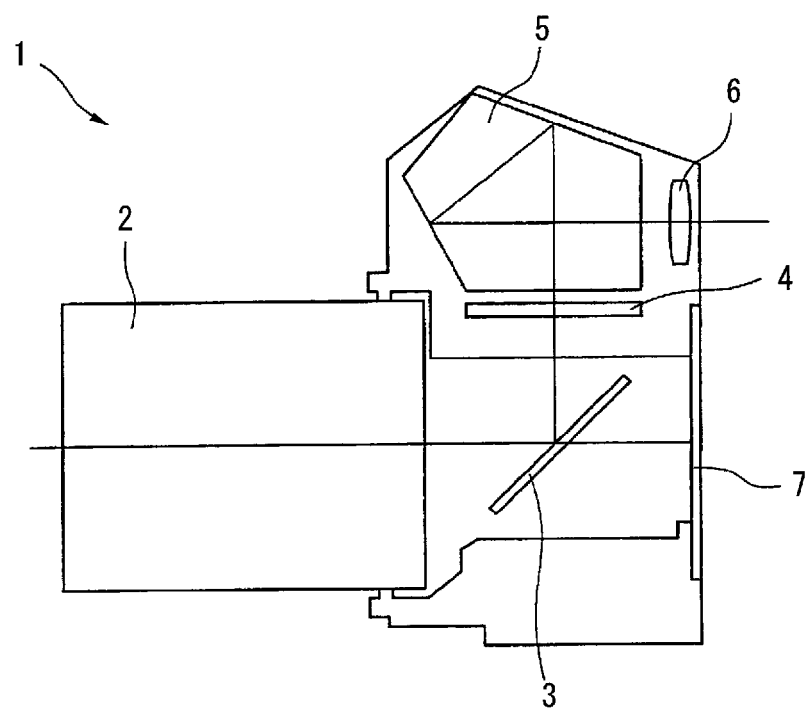
FIG. 9 is a figure showing a sectional view of a single lens reflex camera having the optical system according to the present invention.

FIG. 9 is a schematic sectional view of a single lens reflex camera 1 (hereafter will be simply referred to as a camera in the description of the embodiment) embodying the image-capturing device that comprises the optical system described above. In the camera 1, light departing an object (photographic subject) (not shown) is condensed at a photographic lens 2 (optical system OS) and an image is formed via a quick-return mirror 3 on a reticle 4. The light having formed an image at the reticle 4 is reflected a plurality of times within a pentaprism 5 and is then guided to an eyepiece lens 6. The photographer is thus able to view an object (photographic subject) image as an upright image via the eyepiece lens 6.

In addition, as the photographer presses a shutter release button (not shown), the quick-return mirror 3 retreats to a position outside the optical path, and the light from the object (photographic subject) (not shown), condensed at the photographic lens 2, forms a subject image on an image sensor 7. Thus, an image is captured at the image sensor 7 with the light from the object (photographic subject) and the image thus captured is recorded as an object (photographic subject) image into a memory (not shown). Through this process, the photographer is able to photograph the object (photographic subject) with the camera 1. It is to be noted that the photographic lens 2 in the camera 1 shown in FIG. 9 may be a detachable lens or an integrated part of the camera 1. Furthermore, the camera 1 may be what has been referred to as a single lens reflex camera or it may be a compact camera that does not include a quick-return mirror and the like or a mirrorless single lens reflex camera.

The optical system OS with its characteristic lens configuration described above is used as the photographic lens 2, which achieves a large diameter and makes it possible to reduce the extents of spherical aberration, sagittal comatic aberration, field curvature and comatic aberration, in the camera 1. As a result, the camera 1 itself can be achieved as an image-capturing device with a large diameter lens, which is capable of telephoto shooting while keeping down spherical aberration, sagittal comatic aberration, field curvature and meridional comatic aberration.

In addition, the alternatives described below may be adopted as deemed appropriate as long as the optical performance remains intact.

While the optical system in the embodiment adopts a two-group configuration, the structural characteristics and the like described above may be adopted in another group configuration such as a three-group configuration or a four-group configuration. In addition, they may be adopted in a configuration with an additional lens or an additional lens group that is disposed closest to the object, a configuration with an additional lens or an additional lens group that is disposed closest to the image side or in a configuration with an additional lens or an additional lens group that is disposed between lens groups. It is to be noted that the term "lens group" is used to refer to a portion made up with at least one lens, which is separated via an air gap.

Furthermore, the optical system according to the present invention may adopt a structure in which part of a lens group, a single lens group in its entirety or a plurality of lens groups is made to move along the optical axis as a focusing lens group upon focusing from an infinity-distance object to a short-distance object. It is particularly desirable to use the second lens group as the focusing lens group. Such a focusing lens group can also be used for autofocusing and is optimal for motor drive for autofocus operation in which an ultrasonic motor, for instance, is utilized.

In addition, a lens group, a partial lens group or a part thereof in the optical system according to the present invention may be utilized as a vibration-proofing lens group, which is made to move in a direction having a component perpendicular to the optical axis or rotationally move (swing) along a direction in which a plane containing the optical axis ranges in order to correct image blurring caused by a camera shaking or the like. It is particularly desirable to use the second lens group or part of the second lens group as the vibration-proofing lens group in the optical system according to the present invention.

A lens constituting part of the optical system according to the present invention may have a spherical lens surface, a planar lens surface or an aspherical lens surface. A spherical or planar lens surface is desirable in that the lens can be machined with ease and facilitates assembly/adjustment, which makes it possible to prevent degradation of optical performance due to error occurring during the machining and assembly/adjustment processes. A spherical or planar surface is also desirable in that even in the event of the image surface misalignment, the extent of degradation in imaging performance will be limited. An aspherical lens surface may be formed through grinding. Or an aspherical surface may be a glass mold aspherical surface constituted of glass formed in an aspherical shape with a mold or a composite aspherical surface constituted of resin disposed at the surface of glass and formed in an aspherical shape. Furthermore, the present invention may be adopted in conjunction with a lens with a diffractive surface, or it may be adopted in conjunction with a gradient index lens (GRIN lens) or a plastic lens.

While it is desirable to dispose an aperture stop S near the center of the optical system OS, the function of an aperture stop may be fulfilled via a lens frame without disposing a dedicated aperture stop member.

Figure 10:
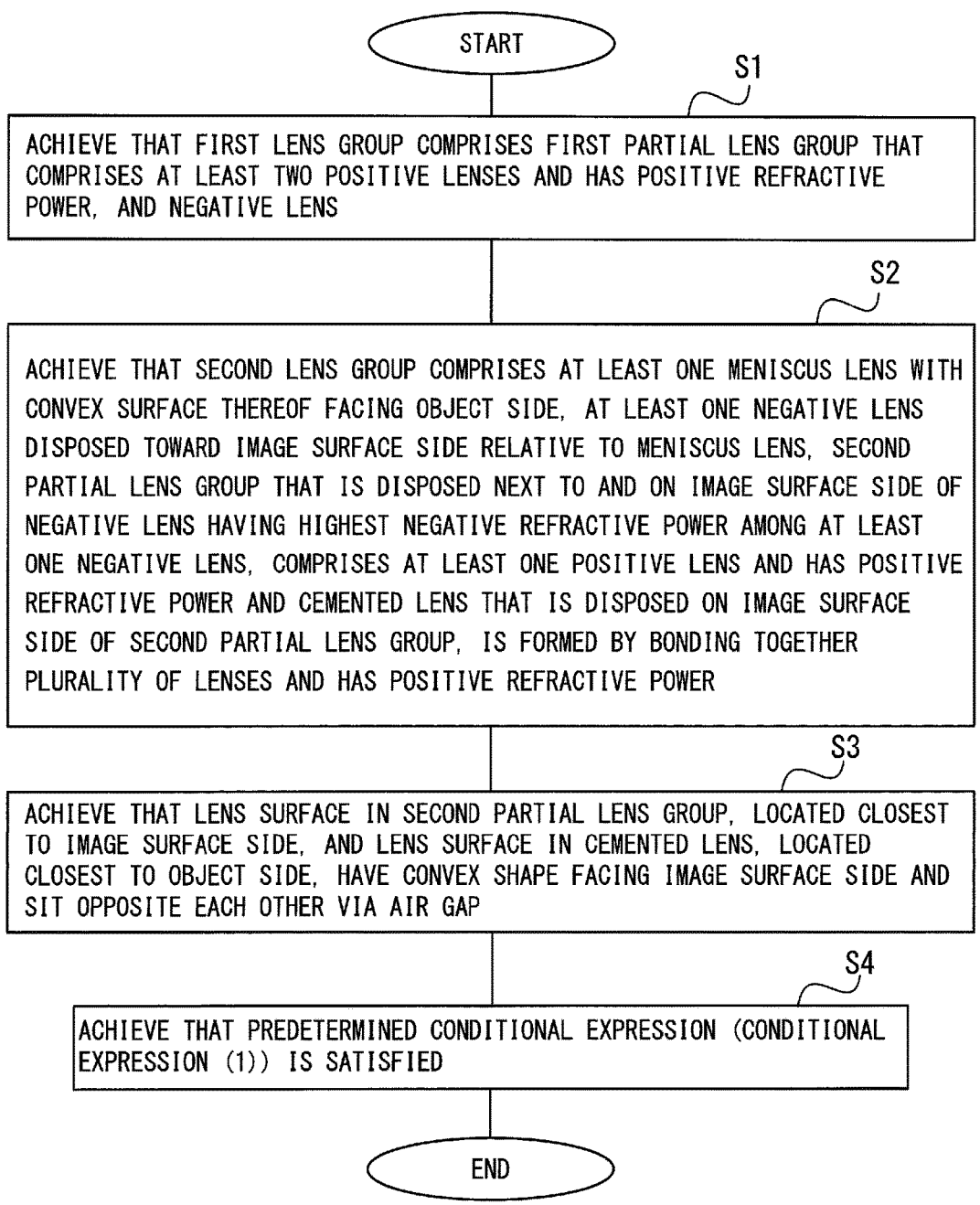
FIG. 10 is a figure showing a flowchart in reference to which a method for manufacturing the optical system according to the present invention is to be explained.

Next, in reference to FIG. 10, an optical system manufacturing method for manufacturing an optical system OS in an embodiment will be briefly explained. The optical system manufacturing method through which an optical system OS comprising a first lens group having a positive refractive power, which remains fixed relative to the image surface upon focusing, and a second lens group having a positive refractive power, which moves along the optical axis upon focusing, disposed in this order along the optical axis starting on the object side, is manufactured, comprises the following steps S1 through S4.

A step of achieving that the first lens group comprises;

a first partial lens group that comprises at least two positive lenses and has a positive refractive power; and a negative lens (step S1)

A step of achieving that the second lens group comprises;

at least one meniscus lens with a convex surface thereof facing the object side;

at least one negative lens, disposed toward the image surface side relative to the meniscus lens;

a second partial lens group that is disposed next to and on an the image surface side of a negative lens with highest negative refractive power, among the at least one negative lens, comprises at least one positive lens and has a positive refractive power; and a cemented lens that is disposed on the image surface side of the second partial lens group, is formed by bonding together a plurality of lenses and has a positive refractive power (step S2).

A step of achieving that a lens surface in the second partial lens group located closest to the image surface side, and a lens surface of the cemented lens located closest to the object side, both have a convex shape facing the image surface side and sit opposite each other via an air gap (step S3).

A step of achieving that predetermined conditional expression (1) is satisfied (step S4)

$$-1.00 < (rbc2-rbc1)/(rbc2+rbc1) < 0.00 \qquad (1)$$

where:

rbc1: a radius of curvature of the lens surface in the second partial lens group located closest to the image surface side; and rbc2: a radius of curvature of the lens surface of the cemented lens located closest to the object side.

Through this optical system manufacturing method, an optical system requiring a small number of components, assuring a high level of performance and lesser extents of comatic aberration and, in particular, sagittal comatic aberration, and spherical aberration can be manufactured.

The optical system OS in the embodiment as described above makes it possible to provide a high-performance lens ideal in application of an image-capturing device such as a camera, and in lens for printing and lens for copying as well as an image-capturing device that requires a high-performance lens.

The following is a description of examples of the optical system OS given in reference to drawings. It is to be noted that FIG. 1, FIG. 3, FIG. 5 and FIG. 7 show configurations of optical systems OS (OS1 through OS4) in the individual examples.

Each aspherical surface in the examples can be expressed with the following equation (a), with y representing the height measured along the direction perpendicular to the optical axis, S(y) representing the distance (sag quantity) measured along the optical axis from the tangent plane of the vertex of the aspherical surface to the aspherical surface at the height y, r representing the radius of curvature at a reference spherical surface (paraxial curvature radius), κ representing the conic constant and An indicates the aspherical coefficient of the nth order;

$$X(y)=(y^2/r)/[1+[1-\kappa(y^2/r^2)]^{1/2}]+A4 \times y^4+A6 \times y^6+A8 \times y^8+A10 \times y^{10} \qquad (a)$$

It is to be noted that the aspherical coefficient A2 of the second order is 0 in all the examples. In addition, each aspherical surface is marked with "*" affixed on the right side of its surface number in the tables provided in correspondence to the individual examples.

First Example

FIG. 1 illustrates the configuration of an optical system OS1 in the first example. The optical system OS1 comprises a first lens group G1 having a positive refractive power, which remains fixed relative to the image surface upon focusing, and a second lens group G2 having a positive refractive power, which moves along the optical axis toward the object side upon focusing from an infinity-distance object to a short-distance object, disposed in this order along the optical axis starting on the object side.

The first lens group G1 comprises a first partial lens group U1a having a positive refractive power and a negative meniscus lens L1b with a convex surface thereof facing the object side, disposed in this order starting on the object side. The first partial lens group U1a is made up with a positive meniscus lens L1 with a convex surface thereof facing the object side and a positive meniscus lens L2 with a convex surface thereof facing the object side, disposed in this order starting on the object side.

The second lens group G2 comprises a positive meniscus lens L2a having a positive refractive power, which comprises an aspherical surface located on the object side with a convex surface thereof facing the object side, an aperture stop S, a bi-concave negative lens L2n, a second partial lens group U2b having a positive refractive power and a cemented lens L2c having a positive refractive power disposed in this order starting on the object side. The second partial lens group U2b is made up with a bi-convex positive lens L2b1 and a bi-convex positive lens L2b2, disposed in this order starting on the object side. The cemented lens L2c is a cemented triplet constituted with a positive meniscus lens L2cpa with a concave surface thereof facing the object side, a bi-concave lens L2cn and a bi-convex lens L2cpb, disposed in this order starting on the object side. An air lens Lair having the shape of a positive meniscus lens with a convex surface thereof facing the image side is present between the positive lens L2b2 in the second partial lens group U2b and the positive meniscus lens L2cpa in the cemented lens L2c located on the image side of the positive lens L2b2.

An anti-reflection film, which will be described in detail later, is formed at an image side lens surface (surface number 6) of the negative meniscus lens L1b in the first lens group G1 and at an object side lens surface (surface number 7) of the positive meniscus lens L2a in the second lens group G2 in the optical system OS1 in the first example.

It is to be noted that a dummy glass FL equivalent to an optical low-pass filter is disposed between the second lens group G2 in the optical system OS1 and the image surface.

Table 1 below lists data values pertaining to the optical system OS1 in the first example. In [Overall Specification] in Table 1, "f" indicates the focal length, "FNO" indicates the F number, "ω" indicates the half angle of field (unit: "°"), "Y" indicates the image height, "TL" indicates the total length of the optical system OS1 and "Bf" indicates the air-converted back focus. It is to be noted that the total length TL indicates the distance measured on the optical axis from the lens surface (first surface) in the optical system OS1, which is located closest to the object, to the image surface I and that the air-converted back focus Bf indicates the distance measured on the optical axis from the lens surface (19th surface) in the optical system OS1, which is located closest to the image, to the image surface I when the dummy glass FL is removed.

In addition, in [Surface Data], the order (surface number) with which a given optical surface is positioned viewed from the object side along the direction in which light advances is indicated in the first column, the radius of curvature of each optical surface is indicated in the second column r, the surface distance (the distance between an nth surface (n is an integer) and an n+1th surface) is indicated in the third column d, the Abbe number at the d-line (wavelength λ=587.6 nm) is indicated in the fourth column vd and the refractive index at the d-line is indicated in the fifth column nd. Furthermore, radius of curvature r=∞ means a flat surface at a lens and means an opening at the aperture stop S. The refractive index nd=1.00000 of air is not indicated. In addition, the surface distance for the last surface (21st surface) indicates the distance to the image surface measured on the optical axis.

In [Lens Group Focal Length], the surface number of the surface located closest to the object side in each lens group (starting surface) and the focal length of the particular lens group are indicated.

In [Individual Distance Data], F indicates the focal length of the entire system, β indicates the image forming magnification factor with which the object is magnified in the image, Di (i is an integer) indicates a variable surface distance pertaining to an ith surface. In addition, "Infinite" indicates an infinity in-focus state, "Intermediate" indicates an intermediate distance in-focus state and "Short-distance" indicates a short distance in-focus state. It is to be noted that D0 indicates the distance from the object to the first surface.

While "mm" is normally used as the unit for length, such as the focal length f, the radius of curvature r and the surface distance d, among all the data values below, equivalent optical performance can be achieved in an optical system that is either proportionally expanded or proportionally reduced and thus, the applicable unit is not limited to "mm". In addition, the reference symbols and the data notations described above are applicable in subsequent examples as well.

TABLE 1

[Overall Specification]

F = 104.998
FNO = 1.45
Ω = 11.67
Y = 21.6
TL = 138.172
Bf = 39.040

[Surface Data]

| Surface Number | r | d | nd | vd |
|---|---|---|---|---|
| Object Surface | ∞ | ∞ | | |
| 1 | 59.3821 | 15.0000 | 67.05 | 1.592010 |
| 2 | 2111.8569 | 0.1000 | | |
| 3 | 42.1099 | 13.5000 | 95.25 | 1.433852 |
| 4 | 163.9281 | 2.0500 | | |
| 5 | 910.8352 | 3.0000 | 41.51 | 1.575010 |
| 6 | 31.1157 | variable | | |
| 7* | 25.7531 | 3.5000 | 63.88 | 1.516800 |
| 8 | 26.0291 | 11.0000 | | |
| 9(aperture) | ∞ | 5.0000 | | |
| 10 | −61.5878 | 1.4000 | 38.03 | 1.603420 |
| 11 | 48.1663 | 1.7000 | | |
| 12 | 100.0582 | 4.6000 | 52.34 | 1.755000 |
| 13 | −88.2818 | 0.1000 | | |
| 14 | 816.5192 | 4.5000 | 95.00 | 1.437000 |
| 15 | −47.3484 | 4.0000 | | |
| 16 | −30.2264 | 2.3000 | 40.66 | 1.883000 |
| 17 | −26.4929 | 1.6000 | 40.98 | 1.581440 |
| 18 | 59.4448 | 7.1000 | 40.66 | 1.883000 |
| 19 | −50.1636 | variable | | |
| 20 | ∞ | 2.0000 | 63.88 | 1.516800 |
| 21 | ∞ | 0.72160 | | |
| Image Surface | ∞ | | | |

[Lens Group Focus length]

| Group | Starting Surface | Focal Length |
|---|---|---|
| 1 | 1 | 184.873 |
| 2 | 7 | 79.704 |

[Individual Distance Data]

| | Infinite | Intermediate | Short-distance |
|---|---|---|---|
| F or β | 104.99784 | −0.03333 | −0.11367 |
| D0 | ∞ | 3056.2575 | 861.8284 |
| d6 | 18.00000 | 13.08750 | 2.80879 |
| d19 | 37.00000 | 41.91250 | 52.19121 |

The lens surface designated with surface number 7 in the optical system OS1 in the first example is formed as an aspherical surface. Table 2 below provides aspherical surface data, i.e., the values taken for the conic constant κ and the various aspherical coefficients A4 through A10. It is to be noted that "E–n" means "×10–n" in the description of subsequent examples.

TABLE 2

[Aspherical Surface Data]

| | κ | A4 | A6 | A8 | A10 |
|---|---|---|---|---|---|
| No. 7 surface | 0.8825 | −5.01264E−07 | 1.89197E−10 | −2.18100E−12 | 5.75259E−15 |

Table 3 below lists specific values taken for the conditional expressions pertaining to the optical system OS1 in first example described above. It is to be noted that rbc1 represents the radius of curvature of the lens surface in the second partial lens group located closest to the image surface side. rbc2 represents the radius of curvature of the lens surface of the cemented lens located closest to the object side. ra1 represents the radius of curvature of the object side lens surface of the meniscus lens. ra2 represents the radius of curvature of the image surface side lens surface of the meniscus lens. f0 represents the focal length of the entire system in an infinity in-focus state. f1 represents the focal length of the first lens group. f2 represents the focal length of the second lens group. vd1a represents the average value of the Abbe numbers of the at least two positive lens, in the first partial lens group. vd2b represents the average value of the Abbe numbers of the at least one positive lenses, in the second partial lens group. f2c represents the focal length of the cemented lens. N2cp represents the refractive index at the d-line, pertaining to the positive lens that is disposed closest to the image surface side, among the image surface side positive lenses, the minimum quantity of which is one, in the cemented lens. N2cn represents the refractive index at the d-line, pertaining to the negative lens bonded on the object side of the image surface side positive lenses, among the negative lenses, the minimum quantity of which is one, in the cemented lens. These reference signs will be used the description of the subsequent examples as well.

TABLE 3

[Values Corresponding to Conditional Expressions]

| | |
|---|---|
| (1) | (rbc2 − rbc1)/(rbc2 + rbc1) = −0.221 |
| (2) | \|(ra2 − ra1)/(ra2 + ra1)\| = 0.00533 |
| (3) | f2/f0 = 0.759 |
| (4) | f1/f0 = 1.761 |
| (5) | vd1a = (67.05 + 95.25)/2 = 81.15 |
| (6) | vd2b = (52.34 + 95.00)/2 = 73.67 |
| (7) | f2c/f0 = 1.311 |
| (8) | N2cp − N2cn = 0.302 |

As indicated above, the optical system OS1 in the first example satisfies all the conditions expressed in conditional expressions (1) through (8).

Figure 2:
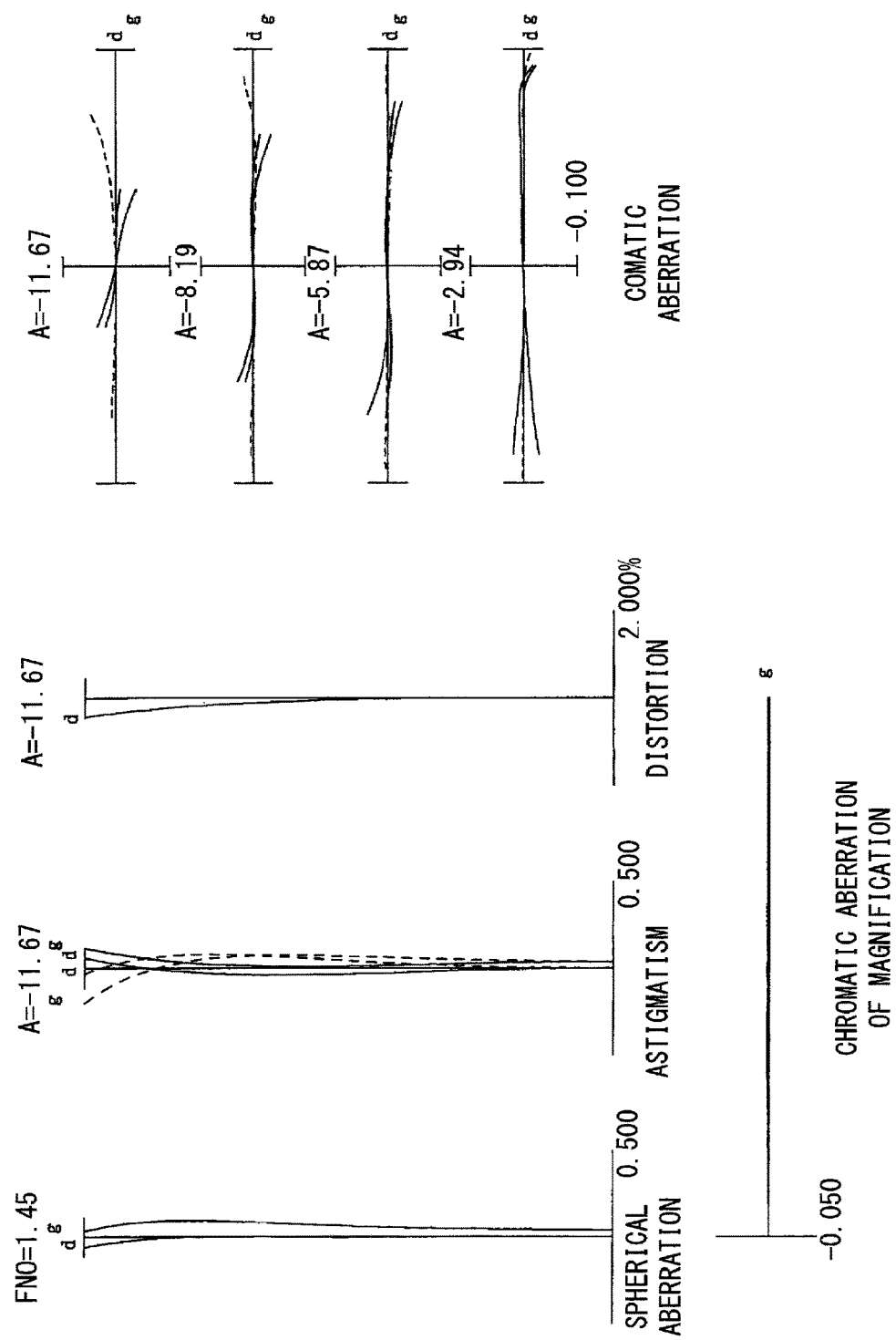
FIG. 2 is a figure showing diagrams of various types of aberration occurring at the optical system in the first example in an infinity in-focus state.

FIG. 2 provides diagrams pertaining to various types of aberration, i.e., spherical aberration, astigmatism, distortion, chromatic aberration of magnification and comatic aberration, occurring at the optical system OS1 in the first example in an infinity in-focus state. In these aberration diagrams FNO indicates the F number, Y indicates the image height and A indicates the half angle of field [unit: "°"]. In addition, d and g in the aberration diagrams respectively indicate the aberration at the d-line (wavelength λ=587.6 nm) and the aberration at the g-line (wavelength λ=435.8 nm). In the astigmatism diagram, the solid line represents the sagittal image surface and the dotted line represents the meridional image surface. Furthermore, in the comatic aberration diagram that indicates comatic aberration occurring at various half angles of field A, the meridional comatic aberration occurring at the d-line and the g-line is represented by the solid lines, the sagittal comatic aberration occurring at the d-line along the meridional direction is represented by the dotted line on the left side of the origin point and the sagittal comatic aberration occurring at the d-line along the sagittal direction is represented by the dotted line on the right side of the origin point. It is to be noted that the notational designations in these aberration diagrams will also be used in the description of subsequent examples. As the various aberration diagrams in FIG. 2 clearly indicate, the various types of aberration, including spherical aberration, sagittal comatic aberration, field curvature, astigmatism and meridional comatic aberration are well corrected in the optical system OS1 in the first example, allowing the optical system OS1 to assure a high level of optical performance.

Figure 11:
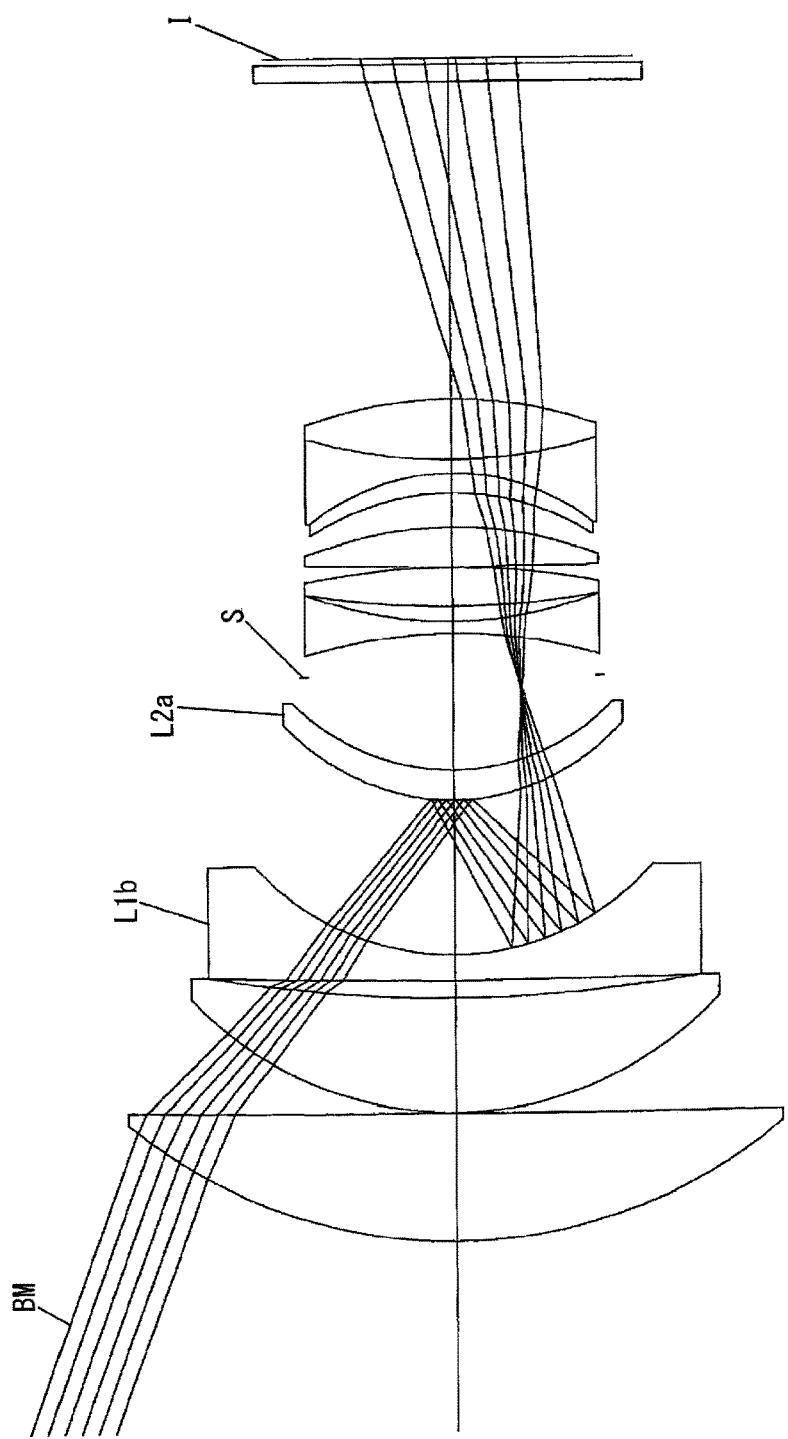
FIG. 11 is a figure showing how ghosting and flare may be caused to occur at the image surface by light which, after entering the optical system in the first example of the present invention, has been reflected at a first reflective surface and a second reflective surface.

Next, the cause of ghosting and flare occurring in the optical system in the example will be explained. FIG. 11 illustrates how a light beam, having entered the optical system in the example, and then reflected at a first reflective surface and a second reflective surface may form ghosting and flare occurring at the image plane I. In the example presented in FIG. 11, part of a light beam BM, having traveled from the object side and entered the optical system as shown in the figure, is reflected at the object side lens surface (surface number 7; the first reflective surface where reflected light that will cause ghosting and flare is generated) of the positive meniscus lens L2a in the second lens group G2 and is then reflected again at the image surface side lens surface (surface number 6; the second reflective surface where reflected light that will cause ghosting and flare is generated) of the negative meniscus lens L1b in the first lens group G1, before it ultimately reaches the image surface I where it causes ghosting and flare. It is to be noted that the first reflective surface is a lens surface having a convex shape viewed from the object side and the second reflective surface is a lens surface with a concave shape viewed from the aperture stop S. In the optical system in the example, an anti-reflection film, via which reflection of light over a wide wavelength range can be prevented over a wide entry angle range, is formed at these lens surfaces so as to limit the occurrence of light reflection and ultimately reduce the extents of ghosting and flare.

Second Example

Figure 3:
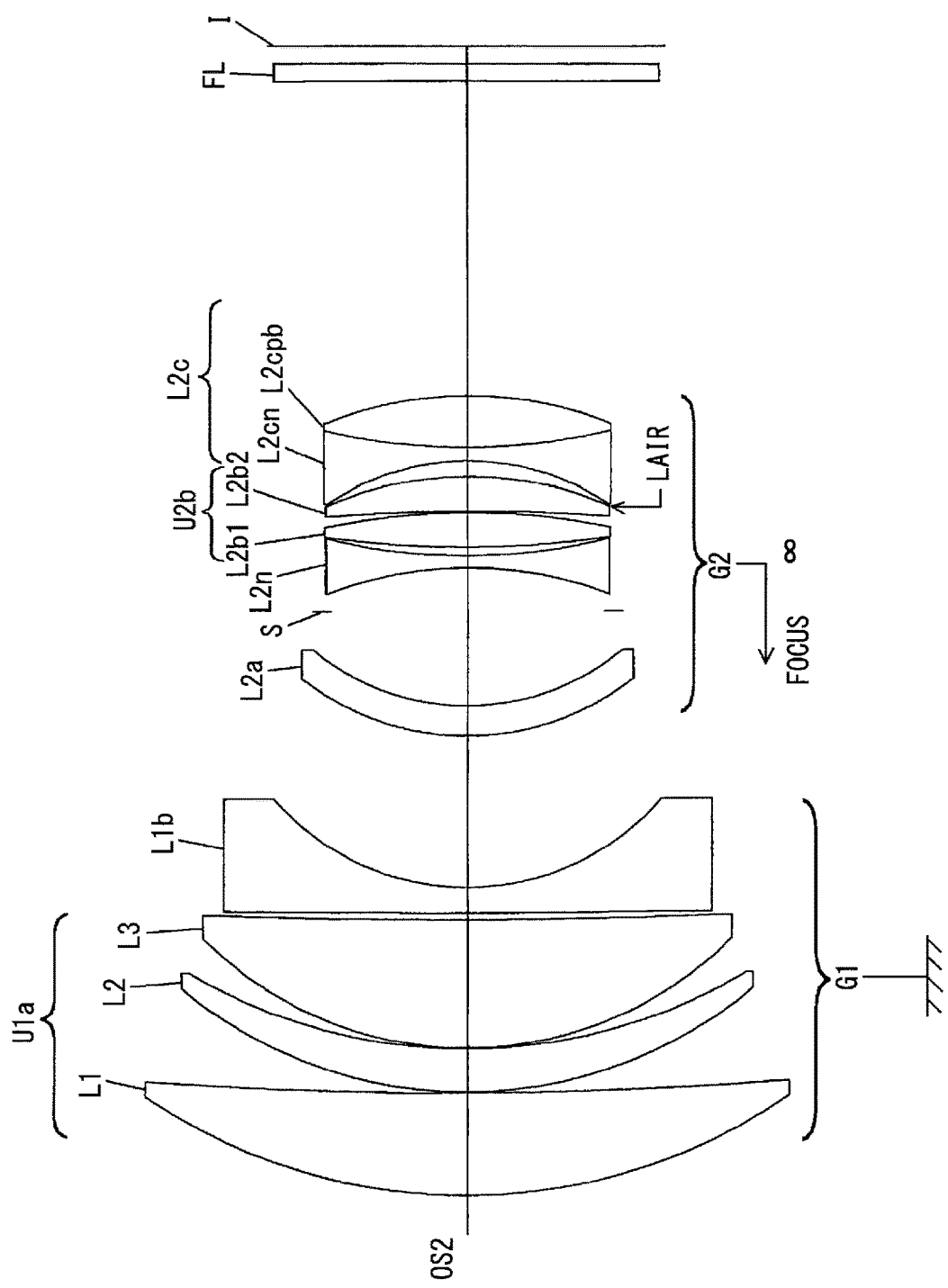
FIG. 3 is a figure showing a sectional view of a lens configuration adopted in an optical system in a second example in an infinity in-focus state.

FIG. 3 illustrates the configuration of an optical system OS2 in the second example. The optical system OS2 comprises a first lens group G1 having a positive refractive power, which remains fixed relative to the image surface upon focusing, and a second lens group G2 having a positive refractive power, which moves along the optical axis toward the object side upon focusing from an infinity-distance object to a short-distance object, disposed in this order along the optical axis starting on the object side.

The first lens group G1 comprises a first partial lens group U1a having a positive refractive power and a negative meniscus lens L1b with a convex surface thereof facing the object side, disposed in this order starting on the object side. The first partial lens group U1a is made up with a positive meniscus lens L1 with a convex surface thereof facing the object side, a positive meniscus lens L2 with a convex surface thereof facing the object side and a positive meniscus lens L3 with a convex surface thereof facing the object side, disposed in this order starting on the object side.

The second lens group G2 comprises a negative meniscus lens L2a having a negative refractive power, which comprises an aspherical surface located on the object side with a convex surface thereof facing the object side, an aperture stop S, a bi-concave negative lens L2n, a second partial lens group U2b having a positive refractive power and a cemented lens L2c having a positive refractive power disposed in this order starting on the object side. The second partial lens group U2b is made up with two positive lenses, which are a bi-convex positive lens L2b1 and a positive meniscus lens L2b2 with a convex surface thereof facing the image side disposed in this order starting on the object side. The cemented lens L2c is formed by bonding together a bi-concave lens L2cn and a bi-convex lens L2cpb disposed in this order starting on the object side. An air lens Lair having the shape of a positive meniscus lens with a convex surface thereof facing the image side is present between the positive meniscus lens L2b2 in the second partial lens group U2b and the bi-concave lens L2cn in the cemented lens L2c located on the image side of the positive meniscus lens L2b2.

An anti-reflection film, which will be described in detail later, is formed at an image surface side lens surface (surface number 17) of the positive meniscus lens L2b2 in the second lens group G2 and at an object side lens surface (surface number 18) of the bi-concave lens L2cn in the second lens group in the optical system OS2 in the second example.

It is to be noted that a dummy glass FL equivalent to an optical low-pass filter is disposed between the second lens group G2 in the optical system OS2 and the image surface.

Table 4 below lists data values pertaining to the optical system OS2 in the second example.

TABLE 4

[Overall Specification]

f = 104.985
FNO = 1.45
ω = 11.60
Y = 21.6
TL = 133.304
Bf = 39.756

[Surface Data]

| Surface Number | r | d | nd | vd |
|---|---|---|---|---|
| Object Surface | ∞ | ∞ | | |
| 1 | 65.5439 | 12.0000 | 67.05 | 1.592010 |
| 2 | 469.0639 | 0.1000 | | |
| 3 | 51.6435 | 5.0000 | 95.25 | 1.433852 |
| 4 | 63.4218 | 0.1000 | | |

TABLE 4-continued

[Overall Specification]

| 5 | 43.2901 | 14.9000 | 95.25 | 1.433852 |
|---|---|---|---|---|
| 6 | 719.6236 | 0.8000 | | |
| 7 | 1524.3810 | 3.0000 | 41.51 | 1.575010 |
| 8 | 29.4708 | variable | | |
| 9* | 30.4072 | 3.5000 | 63.88 | 1.516800 |
| 10 | 28.1927 | 11.0000 | | |
| 11(aperture) | ∞ | 5.0000 | | |
| 12 | −45.9604 | 1.4000 | 38.03 | 1.603420 |
| 13 | 67.1419 | 1.0000 | | |
| 14 | 114.0411 | 4.0000 | 52.34 | 1.755000 |
| 15 | −82.7814 | 0.1000 | | |
| 16 | −251.4911 | 4.0000 | 67.90 | 1.593190 |
| 17 | −42.3484 | 1.8000 | | |
| 18 | −29.4744 | 1.6000 | 40.98 | 1.581440 |
| 19 | 73.5963 | 6.0000 | 40.66 | 1.883000 |
| 20 | −44.1244 | variable | | |
| 21 | ∞ | 2.0000 | 63.88 | 1.516800 |
| 22 | ∞ | 2.03220 | | |
| Image Surface | ∞ | | | |

[Lens Group Focus length]

| Group | Starting Surface | Focal Length |
|---|---|---|
| 1 | 1 | 168.942 |
| 2 | 9 | 83.635 |

[Individual Distance Data]

| | Infinite | Intermediate | Short-distance |
|---|---|---|---|
| F or β | 104.98455 | −0.03333 | −0.11345 |
| D0 | ∞ | 3055.1843 | 866.6962 |
| D8 | 17.56670 | 12.21265 | 1.34750 |
| D20 | 36.40494 | 41.75899 | 52.62414 |

The lens surface designated with surface number 9 in the optical system OS2 in the second example is formed as an aspherical surface. Table 5 below provides aspherical surface data, i.e., the values taken for the conic constant κ and the various aspherical coefficients A4 through A10.

TABLE 5

[Aspherical Surface Data]

| | κ | A4 | A6 | A8 | A10 |
|---|---|---|---|---|---|
| No. 9 Surface | 1.0000 | −1.20371E−06 | −1.96557E−09 | 2.39507E−12 | 0.00000E+00 |

Table 6 below lists specific values corresponding to the conditional expressions pertaining to the optical system OS2 in the second example described above.

TABLE 6

[Values Corresponding to Conditional Expressions]

| (1) | (rbc2 − rbc1)/(rbc2 + rbc1) = −0.179 |
|---|---|
| (2) | \|(ra2 − ra1)/(ra2 + ra1)\| = 0.0378 |
| (3) | f2/f0 = 0.797 |
| (4) | f1/f0 = 1.609 |
| (5) | vd1a = (67.05 + 95.25 + 95.25)/3 = 85.85 |
| (6) | vd2b = (52.34 + 67.90)/2 = 60.12 |
| (7) | f2c/f0 = 1.627 |
| (8) | N2cp − N2cn = 0.302 |

As indicated above, the optical system OS2 in the second example satisfies all the conditions expressed in conditional expressions (1) through (8).

Figure 4:
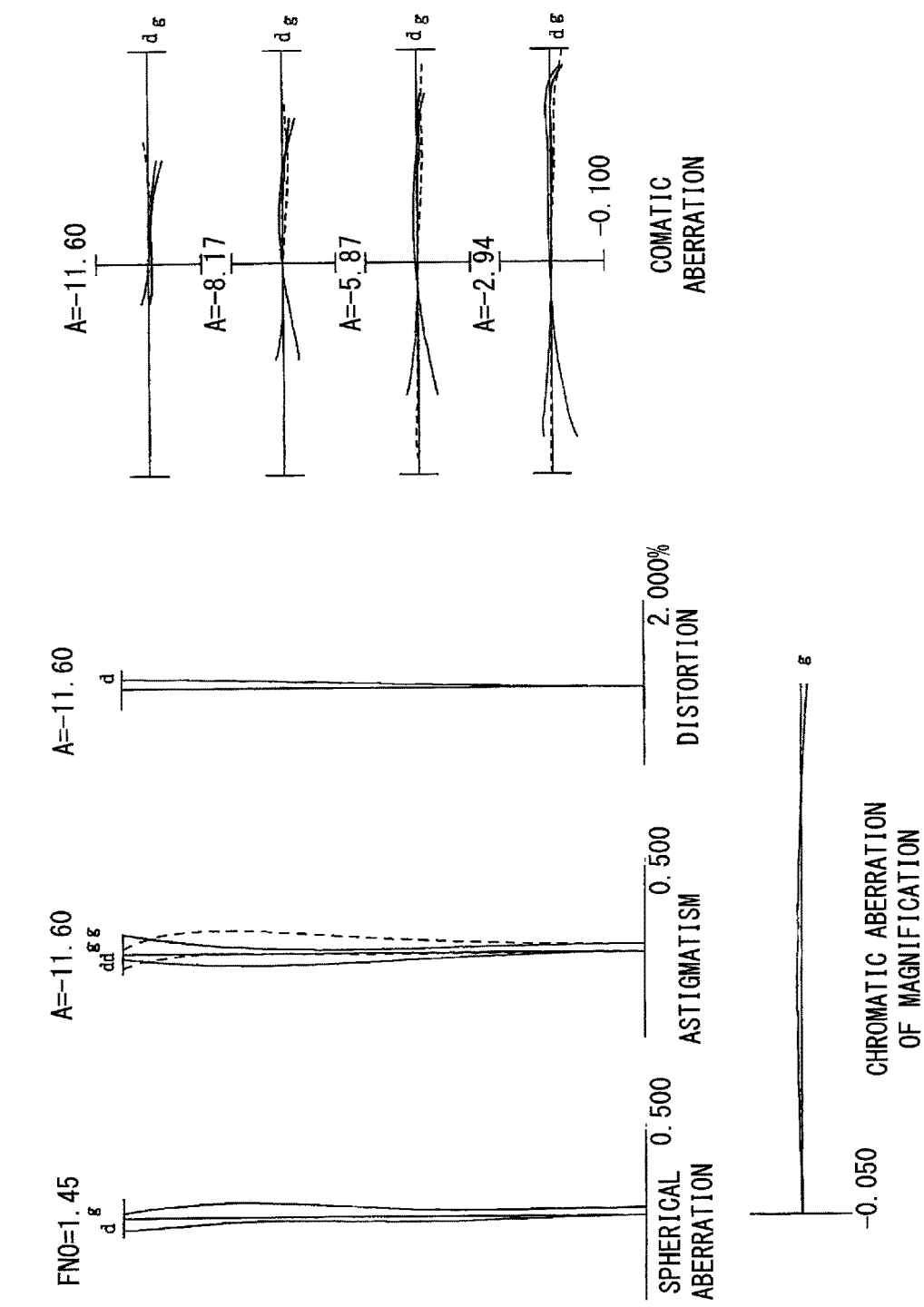
FIG. 4 is a figure showing diagrams of various types of aberration occurring at the optical system in the second example in an infinity in-focus state.

FIG. 4 provides diagrams pertaining to various types of aberration, i.e., spherical aberration, astigmatism, distortion, chromatic aberration of magnification and comatic aberration, occurring at the optical system OS2 in the second example in an infinity in-focus state. As the various aberration diagrams in FIG. 4 clearly indicate, the various types of aberration, including spherical aberration, sagittal comatic aberration, field curvature, astigmatism and meridional comatic aberration, are well corrected in the optical system OS2 in the second example, allowing the optical system OS2 to assure a high level of optical performance.

Third Example

Figure 5:
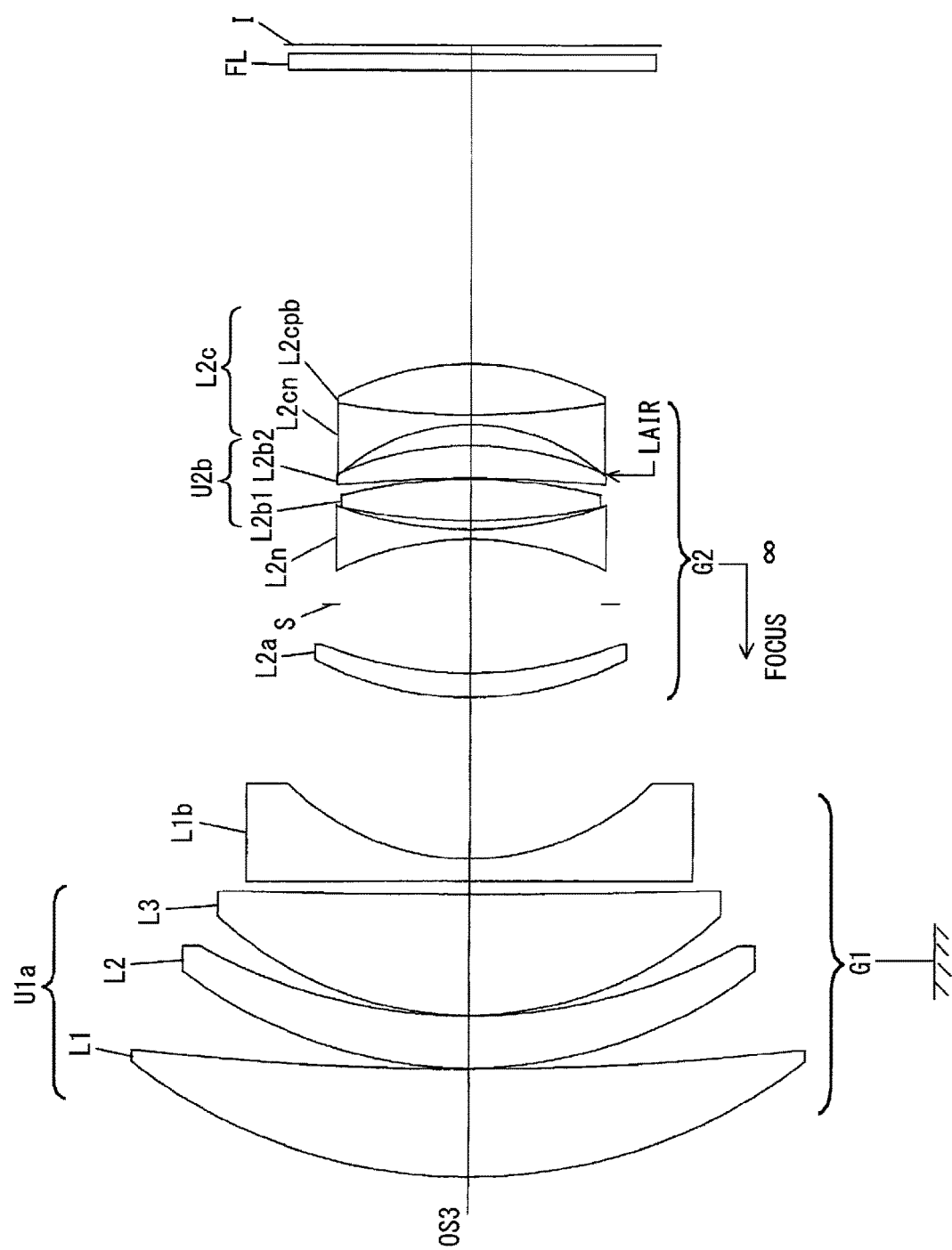
FIG. 5 is a figure showing a sectional view of a lens configuration adopted in an optical system in a third example in an infinity in-focus state.

FIG. 5 illustrates the configuration of an optical system OS3 in the third example. The optical system OS3 comprises a first lens group G1 having a positive refractive power, which remains fixed relative to the image surface upon focusing, and a second lens group G2 having a positive refractive power, which moves along the optical axis toward the object side upon focusing from an infinity-distance object to a short-distance object, disposed in this order along the optical axis starting on the object side.

The first lens group G1 comprises a first partial lens group U1a having a positive refractive power and a negative meniscus lens L1b with a convex surface thereof facing the object side, disposed in this order starting on the object side. The first partial lens group U1a is made up with a positive meniscus lens L1 with a convex surface thereof facing the object side, a positive meniscus lens L2 with a convex surface thereof facing the object side and a positive meniscus lens L3 with a convex surface thereof facing the object side, disposed in this order starting on the object side.

The second lens group G2 comprises a positive meniscus lens L2a having a positive refractive power, which comprises an aspherical surface located on the object side with a convex surface thereof facing the object side, an aperture stop S, a bi-concave negative lens L2n, a second partial lens group U2b having a positive refractive power and a cemented lens L2c having a positive refractive power disposed in this order starting on the object side. The second partial lens group U2b is made up with two positive lenses, which are a bi-convex positive lens L2b1 and a positive meniscus lens L2b2 with a convex surface thereof facing the image side disposed in this order starting on the object side. The cemented lens L2c is formed by bonding together a bi-concave lens L2cn and a bi-convex lens L2cpb disposed in this order starting on the object side. An air lens Lair having the shape of a positive meniscus lens with a convex surface thereof facing the image side is present between the positive meniscus lens L2b2 in the second partial lens group U2b and the bi-concave lens L2cn in the cemented lens L2c located on the image side of the positive meniscus lens L2b2.

An anti-reflection film, which will be described in detail later, is formed at an image surface side lens surface (surface number 13) of the negative lens L2n in the second lens group G2 and at an object side lens surface (surface number 14) of the positive lens L2b1 in the second lens group in the optical system OS3 in the third example.

It is to be noted that a dummy glass FL equivalent to an optical low-pass filter is disposed between the second lens group G2 in the optical system OS2 and the image surface.

Table 7 below lists data values pertaining to the optical system OS3 in the third example.

TABLE 7

[Overall Specifications]

f = 104.990
FNO = 1.45
Ω = 11.63
Y = 21.6
TL = 139.798
Bf = 38.536

[Surface Data]

| Surface Number | r | d | nd | vd |
|---|---|---|---|---|
| Object Surface | ∞ | ∞ | | |
| 1 | 67.1932 | 13.5330 | 67.05 | 1.592010 |
| 2 | 359.2303 | 0.1000 | | |
| 3 | 57.5687 | 6.5000 | 95.25 | 1.433852 |
| 4 | 68.1172 | 0.1000 | | |
| 5 | 45.4209 | 14.9000 | 95.25 | 1.433852 |
| 6 | 957.1515 | 1.5952 | | |
| 7 | 1254459.13 | 2.7917 | 41.51 | 1.575010 |
| 8 | 31.8163 | variable | | |
| 9* | 42.2905 | 3.0000 | 63.88 | 1.516800 |
| 10 | 49.3064 | 8.4600 | | |
| 11(aperture) | ∞ | 8.0000 | | |
| 12 | −38.2116 | 1.2000 | 38.03 | 1.603420 |
| 13 | 48.6139 | 1.1000 | | |
| 14 | 79.1234 | 5.2000 | 52.34 | 1.755000 |
| 15 | −64.0912 | 0.1000 | | |
| 16 | −158.4057 | 4.0000 | 67.90 | 1.593190 |
| 17 | −41.0735 | 2.6000 | | |
| 18 | −24.6260 | 1.2000 | 40.98 | 1.581440 |
| 19 | 97.9805 | 6.2000 | 40.66 | 1.883000 |
| 20 | −36.0234 | variable | | |
| 21 | ∞ | 2.0000 | 63.88 | 1.516800 |
| 22 | ∞ | 1.05592 | | |
| Image Surface | ∞ | | | |

[Lens Group Focus Length]

| Group | Starting Surface | Focal Length |
|---|---|---|
| 1 | 1 | 186.835 |
| 2 | 9 | 74.635 |

[Individual Distance Data]

| | Infinite | Intermediate | Short-distance |
|---|---|---|---|
| F or β | 104.99020 | −0.03333 | −0.11255 |
| D0 | ∞ | 3042.6662 | 860.2021 |
| D8 | 20.00000 | 15.14465 | 5.15469 |
| D20 | 36.16199 | 41.01735 | 51.00730 |

The lens surface designated with surface number 9 in the optical system OS3 in the third example is formed as an aspherical surface. Table 8 below provides aspherical surface data, i.e., the values taken for the conic constant κ and the various aspherical coefficients A4 through A10.

TABLE 8

[Aspherical Surface Data]

| | κ | A4 | A6 | A8 | A10 |
|---|---|---|---|---|---|
| No. 9 | 2.8015 | −3.33090E−06 | −2.52847E−09 | 0.00000E+00 | 0.00000E+00 |

Table 6 below lists specific values corresponding to the conditional expressions pertaining to the optical system OS3 in the third example described above.

TABLE 9

[Values Corresponding to Conditional Expressions]

| | |
|---|---|
| (1) | (rbc2 − rbc1)/(rbc2 + rbc1) = −0.250 |
| (2) | \|(ra2 − ra1)/(ra2 + ra1)\| = 0.0766 |
| (3) | f2/f0 = 0.711 |
| (4) | f1/f0 = 1.780 |
| (5) | vd1a = (67.05 + 95.25 + 95.25)/3 = 85.85 |
| (6) | vd2b = (52.34 + 67.90)/2 = 60.12 |
| (7) | f2c/f0 = 1.555 |
| (8) | N2cp − N2cn = 0.302 |

As indicated above, the optical system OS3 in the third example satisfies all the conditions expressed in conditional expressions (1) through (8).

Figure 6:
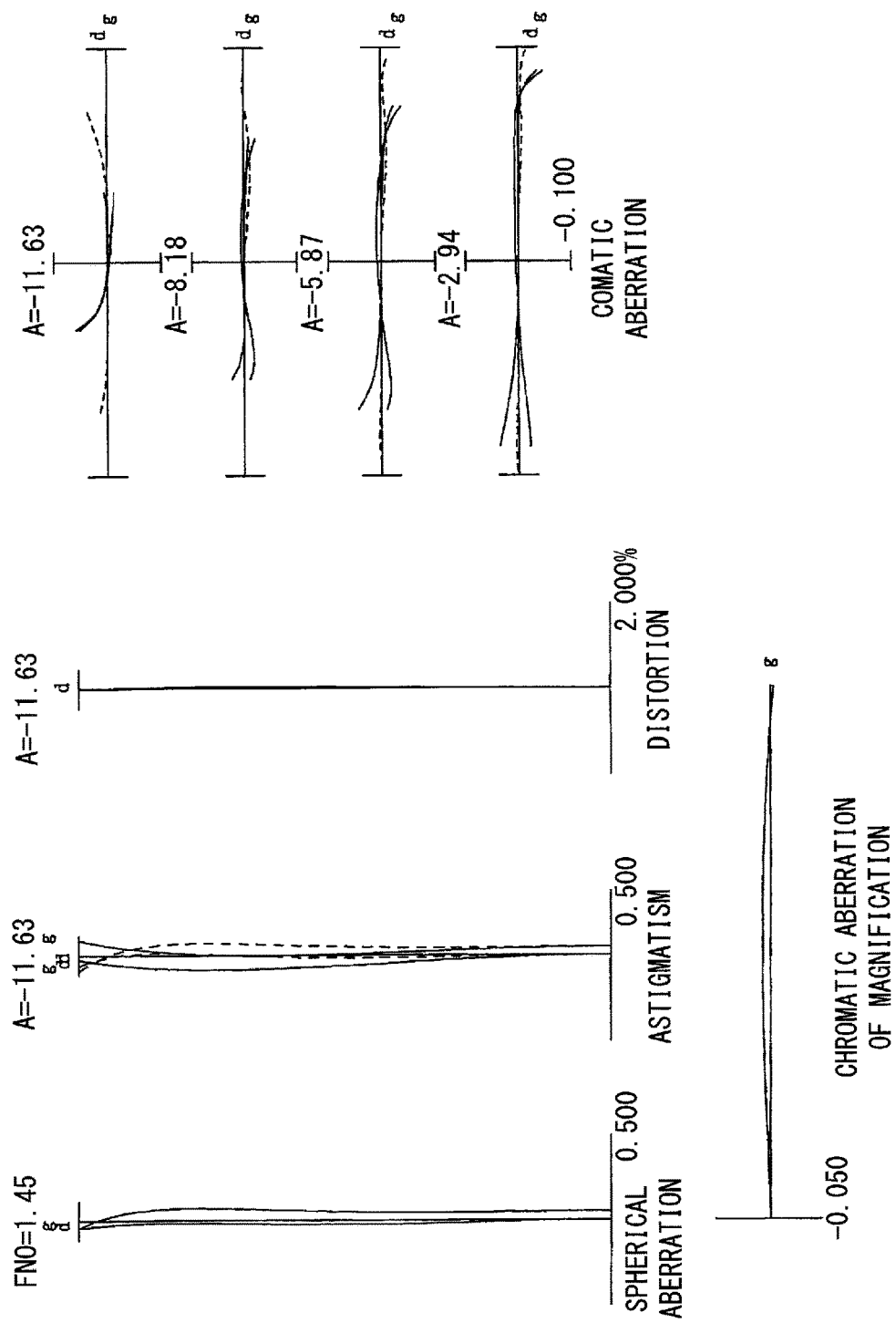
FIG. 6 is a figure showing diagrams of various types of aberration occurring at the optical system in the third example in an infinity in-focus state.

FIG. 6 provides diagrams pertaining to various types of aberration, i.e., spherical aberration, astigmatism, distortion, chromatic aberration of magnification and comatic aberration, occurring at the optical system OS3 in the third example in an infinity in-focus state. As the various aberration diagrams in FIG. 6 clearly indicate, the various types of aberration, including spherical aberration, sagittal comatic aberration, field curvature, astigmatism and meridional comatic aberration are well corrected in the optical system OS3 in the third example, allowing the optical system OS3 to assure a high level of optical performance.

Fourth Example

Figure 7:
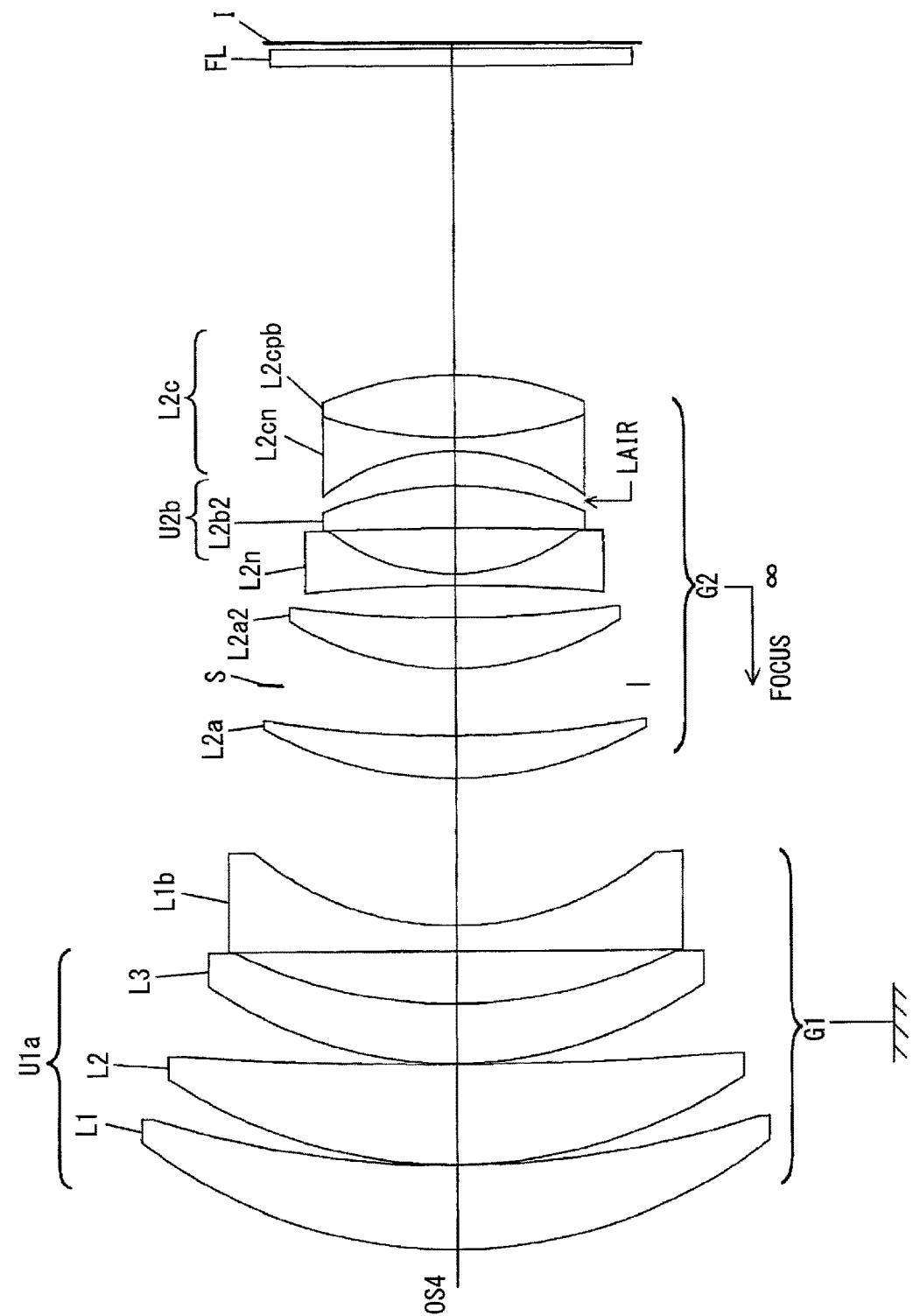
FIG. 7 is a figure showing a sectional view of a lens configuration adopted in an optical system in a fourth example in an infinity in-focus state.

FIG. 7 illustrates the configuration of an optical system OS4 in the fourth example. The optical system OS4 comprises a first lens group G1 having a positive refractive power, which remains fixed relative to the image surface upon focusing, and a second lens group G2 having a positive refractive power, which moves along the optical axis toward the object side upon focusing from an infinity-distance object to a short-distance object, disposed in this order along the optical axis starting on the object side.

The first lens group G1 comprises a first partial lens group U1a having a positive refractive power and a negative meniscus lens L1b with a convex surface thereof facing the object side, which comprises an aspherical surface located on the image side, disposed in this order starting on the object side. The first partial lens group U1a is made up with a positive meniscus lens L1 with a convex surface thereof facing the object side, a positive meniscus lens L2 with a convex surface thereof facing the object side and a positive meniscus lens L3 with a convex surface thereof facing the object side, disposed in this order starting on the object side.

The second lens group G2 comprises a positive meniscus lens L2a with a convex surface thereof facing the object side, an aperture stop S, a positive meniscus lens L2a2 with a convex surface thereof facing the object side, a bi-concave negative lens L2n, a second partial lens group U2b constituted with a positive meniscus lens L2b2 with a convex surface thereof facing the image side and a cemented lens L2c having a positive refractive power disposed in this order starting on the object side. The cemented lens L2c is formed by bonding together a bi-concave lens L2cn and a bi-convex lens L2cpb disposed in this order starting on the object side. An air lens Lair having the shape of a positive meniscus lens with a convex surface thereof facing the image side is present between the positive meniscus lens L2b2 in the second partial lens group U2b and the bi-concave lens L2cn in the cemented lens L2c located on the image side of the positive meniscus lens L2b2.

An anti-reflection film, which will be described in detail later, is formed at an image surface side lens surface (surface number 2) of the positive meniscus lens L1 in the first lens group G1 and at an object side lens surface (surface number 3) of the positive meniscus lens L2 in the first lens group G1.

It is to be noted that a dummy glass FL equivalent to an optical low-pass filter is disposed between the second lens group G2 in the optical system OS2 and the image surface.

Table 10 below lists data values pertaining to the optical system OS4 in the fourth example.

TABLE 10

[Overall Specifications]

f = 105.025
FNO = 1.45
ω = 11.59
Y = 21.6
TL = 142.650
Bf = 38.412

[Surface Data]

| Surface Number | r | d | nd | vd |
|---|---|---|---|---|
| Object Surface | ∞ | ∞ | | |
| 1 | 65.1262 | 10.0000 | 63.34 | 1.618000 |
| 2 | 125.8931 | 0.1000 | | |
| 3 | 66.3693 | 12.0000 | 95.25 | 1.433852 |
| 4 | 519.0687 | 0.1000 | | |
| 5 | 55.6397 | 7.0000 | 95.25 | 1.433852 |
| 6 | 64.6481 | 6.2000 | | |
| 7 | 10767.5395 | 3.0000 | 41.51 | 1.575010 |
| 8* | 39.8759 | variable | | |
| 9 | 50.7155 | 5.0000 | 82.57 | 1.497820 |
| 10 | 150.0671 | 5.8796 | | |
| 11(aperture) | ∞ | 2.0000 | | |
| 12 | 39.7132 | 6.0000 | 52.34 | 1.755000 |
| 13 | 153.9829 | 3.8107 | | |
| 14 | −202.5206 | 1.4000 | 38.03 | 1.603420 |
| 15 | 26.1649 | 5.4000 | | |
| 16 | −508.7617 | 5.0000 | 82.57 | 1.497820 |
| 17 | −44.2478 | 4.0000 | | |
| 18 | −28.0474 | 1.6000 | 40.98 | 1.581440 |
| 19 | 52.2303 | 7.5000 | 40.66 | 1.883000 |
| 20 | −41.8041 | variable | | |
| 21 | ∞ | 2.0000 | 63.88 | 1.516800 |
| 22 | ∞ | 0.68846 | | |
| Image Surface | ∞ | | | |

[Lens Group Focus Length]

| Group | Starting Surface | Focal Length |
|---|---|---|
| 1 | 1 | 461.214 |
| 2 | 9 | 77.598 |

[Individual Distance Data]

| | Infinite | Intermediate | Short-distance |
|---|---|---|---|
| F or β | 105.02520 | −0.03333 | −0.12482 |
| D0 | ∞ | 3148.0464 | 857.3496 |
| D8 | 17.56670 | 13.91567 | 4.28661 |
| D20 | 36.40494 | 40.05597 | 49.68503 |

The lens surface designated with surface number 8 in the optical system OS4 in the fourth example is formed as an aspherical surface. Table 11 below provides aspherical surface data, i.e., the values taken for the conic constant κ and the various aspherical coefficients A4 through A10.

TABLE 11

| | | [Aspherical Surface Data] | | | |
|---|---|---|---|---|---|
| | κ | A4 | A6 | A8 | A10 |
| No. 8 Surface | 0.8100 | 4.80154E−07 | 5.46322E−11 | 0.00000E+00 | 0.00000E+00 |

Table 12 below lists specific values corresponding to the conditional expressions pertaining to the optical system OS4 in the fourth example described above.

TABLE 12

| | [Values Corresponding to Conditional Expressions] |
|---|---|
| (1) | (rbc2 − rbc1)/(rbc2 + rbc1) = −0.224 |
| (2) | \|(ra2 − ra1)/(ra2 + ra1)\| = 0.4948 |
| (3) | f2/f0 = 0.739 |
| (4) | f1/f0 = 4.391 |
| (5) | vd1a = (63.34 + 95.25 + 95.25)/3 = 84.61 |
| (6) | vd2b = 82.57 |
| (7) | f2c/f0 = 1.194 |
| (8) | N2cp − N2cn = 0.302 |

As indicated above, the optical system OS4 in the fourth example satisfies all the conditions expressed in conditional expressions (1) through (8).

Figure 8:
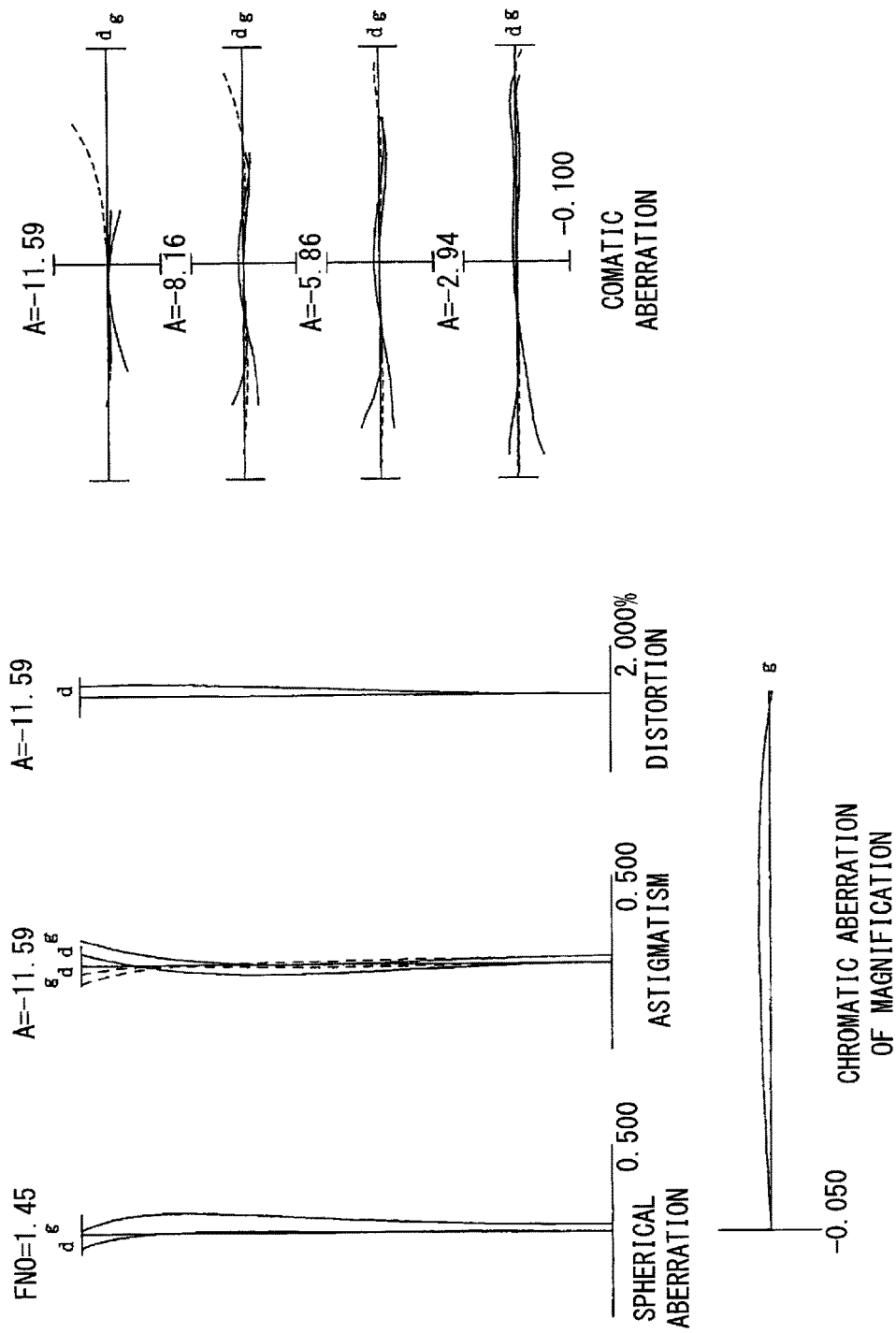
FIG. 8 is a figure showing diagrams of various types of aberration occurring at the optical system in the fourth implementation example in an infinity in-focus state.

FIG. 8 provides diagrams pertaining to various types of aberration, i.e., spherical aberration, astigmatism, distortion, chromatic aberration of magnification and comatic aberration, occurring at the optical system OS4 in the fourth example in an infinity in-focus state. As the various aberration diagrams in FIG. 8 clearly indicate, the various types of aberration, including spherical aberration, sagittal comatic aberration, field curvature, astigmatism and meridional comatic aberration are well corrected in the optical system OS3 in the third example, allowing the optical system OS3 to assure a high level of optical performance.

Through each of the examples described above, an optical system OS assuming a coverage angle of approximately 2ω=23° and a large diameter of F 1.4, which assures a high level of performance and good correction of spherical aberration, sagittal comatic aberration, field curvature and meridional comatic aberration, can be provided.

It will be obvious that the advantageous effects described above can be achieved by mounting any of the optical systems OS1 through OS4 in the above examples in the camera 1 described above. In addition, the examples described above each represent a specific example of the present invention and the present invention is in no way limited to these examples.

Figure 12:
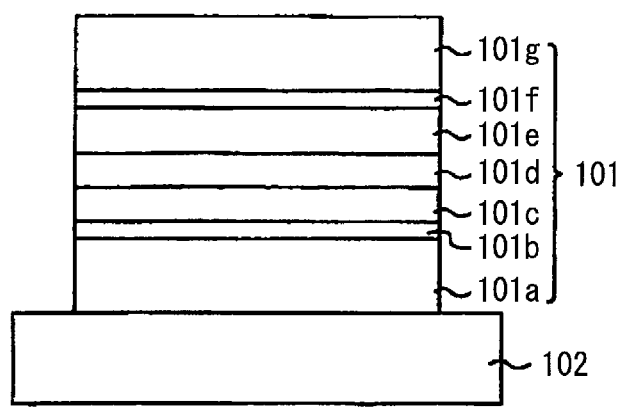
FIG. 12 is a figure showing an example of a layer structure that may be adopted in an anti-reflection film.

The anti-reflection film (may otherwise be referred to as a multilayer broadband anti-reflection film) used in the optical system in an embodiment of the present invention will be explained next. FIG. 12 presents an example of a film structure that may be adopted in the anti-reflection film. This anti-reflection film 101, constituted with seven layers, is formed at an optical surface of an optical member 102 such as a lens. A first layer 101a is constituted of aluminum oxide vapor-deposited through vacuum deposition. On top of the first layer 101a, a second layer 101b, constituted of a blend of titanium oxide and zirconium oxide, is formed through a vacuum deposition method. On top of the second layer 101b, a third layer 101c constituted of aluminum oxide vapor-deposited through vacuum deposition is formed, and a fourth layer 101d, constituted of a blend of titanium oxide and zirconium oxide, is formed on top of the third layer 101c through a vacuum deposition method. On top of the fourth layer 101d, a fifth layer 101e constituted of aluminum oxide vapor-deposited through vacuum deposition is formed, and a sixth layer 101f, constituted of a blend of titanium oxide and zirconium oxide, is formed on the fifth layer 101e through vacuum deposition.

On top of the sixth layer 101f formed as described above, a seventh layer 101g constituted of a blend of magnesium fluoride and silica is formed through a wet process and thus, formation of the anti-reflection film 101 in the embodiment is completed. The seventh layer 101g is formed through a type of wet process known as the sol-gel method. Through the sol-gel method, a sol prepared by mixing together specific materials is rendered into a gel with no fluidity through, for instance, hydrolysis or a poly-condensation reaction and a product is obtained by heating/breaking down this gel. In the sol-gel method adopted in formation of an optical thin film, an optical surface of an optical member is coated with an optical thin-film material sol and a film is formed by drying and thus solidifying the optical thin-film material sol so as to render it into a gel film. It is to be noted that a wet process other than the sol-gel method may be adopted and a solid film may be formed directly without gelling the material.

As described above, the first layer 101a through the sixth player 101f in the anti-reflection film 101 are formed through an electron beam deposition method, which is a dry process, whereas the seventh layer 101g, i.e., the uppermost layer, is formed through a wet process in a procedure to be described next by using a sol liquid prepared through a hydrofluoric acid/magnesium acetate method. First, using a vacuum vapor deposition apparatus, an aluminum oxide layer, a titanium oxide-zirconium oxide blend layer, an aluminum oxide layer, a titanium oxide-zirconium oxide blend layer, an aluminum oxide layer and a titanium oxide-zirconium oxide blend layer are formed in sequence respectively as the first layer 101a, the second layer 101b, the third layer 101c, the fourth layer 101d, the fifth layer 101e and the sixth layer 101f at a lens film formation surface (the optical surface of the optical member 102 mentioned earlier). Then, the optical member 102 is taken out of the deposition apparatus, and a layer constituted of a blend of magnesium fluoride and silica is formed as the seventh layer 101g by applying, through a spin-coating method, a sol liquid prepared through the hydrofluoric acid/magnesium acetate method and mixed with silicon alkoxide. The sol liquid is prepared through the hydrofluoric acid/magnesium acetate method as indicated in the following reaction formula (b).

$$2HF + Mg(CH_3COO)_2 \rightarrow MgF_2 + 2CH_3COOH \qquad (b)$$

The sol liquid is used for the film formation after the materials are mixed and the mixture undergoes a high-temperature pressure aging treatment at 140° C. over a 24-hour period in an autoclave. Once the formation of the seventh layer 101g is completed, the optical member 102 undergoes a heat treatment at 160° C. for an hour in open air. Through the sol-gel method described above, the seventh layer 101g is formed as particles with their sizes in a range of several nm to several tens of nm deposited with unfilled space (gaps) in between them.

The optical performance of optical members having the anti-reflection film 101 formed as described above will be described in reference to the spectral characteristics thereof indicated in FIG. 13.

Optical members (lenses) having the anti-reflection film in the embodiment may be formed under the conditions indicated in the following Table 13. Table 13 lists optical film thicknesses of the individual layers 101a (first layer) through 101g (seventh layer) in the anti-reflection film 101 in correspondence to various refractive indices 1.62, 1.74 and 1.85 taken for the substrate (optical member) relative to the reference wavelength λ. It is to be noted that in Table 13, aluminum oxide is notated as Al2O3, a titanium oxide-zirconium oxide blend is notated as ZrO2+TiO2 and a magnesium fluoride-silica blend is notated as MgF2+SiO2.

TABLE 13

| | Substance | Refractive Index | Optical Film thickness | Optical Film thickness | Optical Film thickness |
|---|---|---|---|---|---|
| Medium | Air | 1 | | | |
| 7th layer | MgF2 + SiO2 | 1.26 | 0.268λ | 0.271λ | 0.269λ |
| 6th layer | ZrO2 + TiO2 | 2.12 | 0.057λ | 0.054λ | 0.059λ |
| 5th layer | Al2O3 | 1.65 | 0.171λ | 0.178λ | 0.162λ |
| 4th layer | ZrO2 + TiO2 | 2.12 | 0.127λ | 0.13λ | 0.158λ |
| 3rd layer | Al2O3 | 1.65 | 0.122λ | 0.107λ | 0.08λ |
| 2nd layer | ZrO2 + TiO2 | 2.12 | 0.059λ | 0.075λ | 0.105λ |
| 1st layer | Al2O3 | 1.65 | 0.257λ | 0.03λ | 0.03λ |
| Substrate Refractive Index | | | 1.62 | 1.74 | 1.85 |

Figure 13:
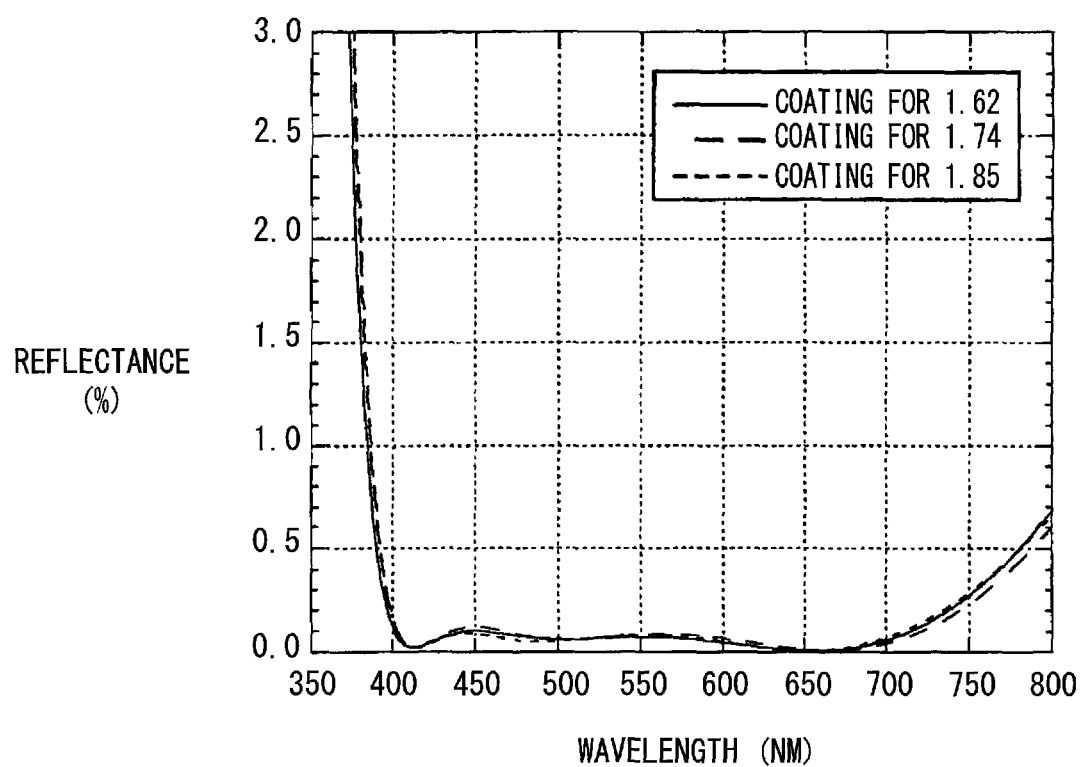
FIG. 13 is a showing a graph indicating spectral characteristics of anti-reflection films.

FIG. 13 indicates the spectral characteristics observed as light enters at a right angle at the optical members with various layers in the anti-reflection film 101 thereat designed to have the corresponding optical film thicknesses as indicated in Table 13 with the reference wavelength λ at 550 nm.

FIG. 13 indicates that the reflectance can be kept at or below 0.2% over a full light wavelength range of 420 nm through 720 nm at each optical member with the anti-reflection film 101 designed with the reference wavelength λ at 550 nm. In addition, even at an optical member with an anti-reflection film 101 with the individual optical film thicknesses determined in correspondence to the reference wavelength λ in Table 13 set at the d-line (wavelength 587.6 nm), the spectral characteristics are hardly affected. In other words, even at such an optical member, spectral characteristics substantially matching the spectral characteristics in FIG. 13, demonstrated at the optical members designed in correspondence to the reference wavelength λ at 550 nm, are achieved.

Next, a variation of the anti-reflection film will be described. The anti-reflection film in this variation is made up with five layers, with the optical film thicknesses of the various layers determined in correspondence to the reference wavelength λ under the conditions indicated in the following Table 14, which is similar to Table 13. The fifth layer in the variation is formed through the sol-gel method described earlier.

TABLE 14

| | Substance | Refractive Index | Optical Film thickness | Optical Film thickness |
|---|---|---|---|---|
| Medium | Air | 1 | | |
| 5th layer | MgF2 + SiO2 | 1.26 | 0.275λ | 0.269λ |
| 4th layer | ZrO2 + TiO2 | 2.12 | 0.045λ | 0.043λ |

TABLE 14-continued

| | Substance | Refractive Index | Optical Film thickness | Optical Film thickness |
|---|---|---|---|---|
| 3rd layer | Al2O3 | 1.65 | 0.212λ | 0.217λ |
| 2nd layer | ZrO2 + TiO2 | 2.12 | 0.077λ | 0.066λ |
| 1st layer | Al2O3 | 1.65 | 0.288λ | 0.290λ |
| Substrate Refractive Index | | | 1.46 | 1.52 |

Figure 14:
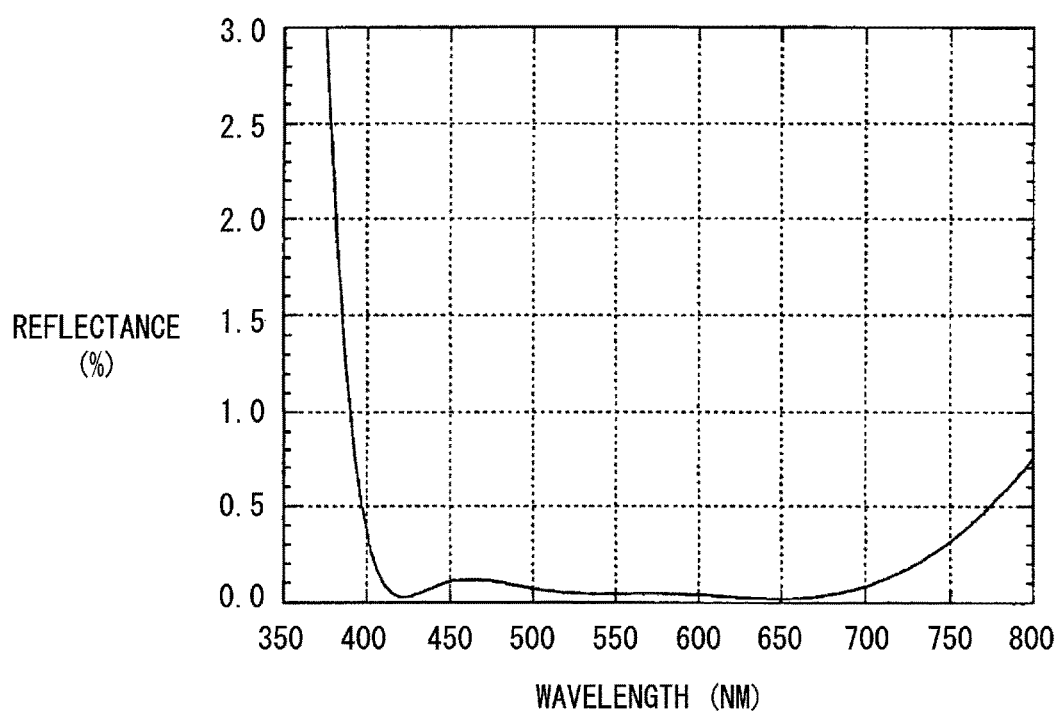
FIG. 14 is a figure showing a graph indicating the spectral characteristics of an anti-reflection film in a variation.

FIG. 14 indicates the spectral characteristics observed as light enters at a right angle at an optical member with the anti-reflection film thereat designed to have the corresponding optical film thicknesses indicated in Table 14, with the reference wavelength λ at 550 nm when the refractive index of the substrate is 1.52. FIG. 14 indicates that the reflectance can be kept at or below 0.2% over a full light wavelength range of 420 nm through 720 nm with the anti-reflection film in the variation. It is to be noted that, even at an optical member with an anti-reflection film with the individual optical film thicknesses determined in correspondence to the reference wavelength λ in Table 14 set at the d-line (wavelength 587.6 nm), the spectral characteristics are hardly affected. In other words, even at such an optical member, spectral characteristics substantially matching those shown in FIG. 14 are achieved.

Figure 15:
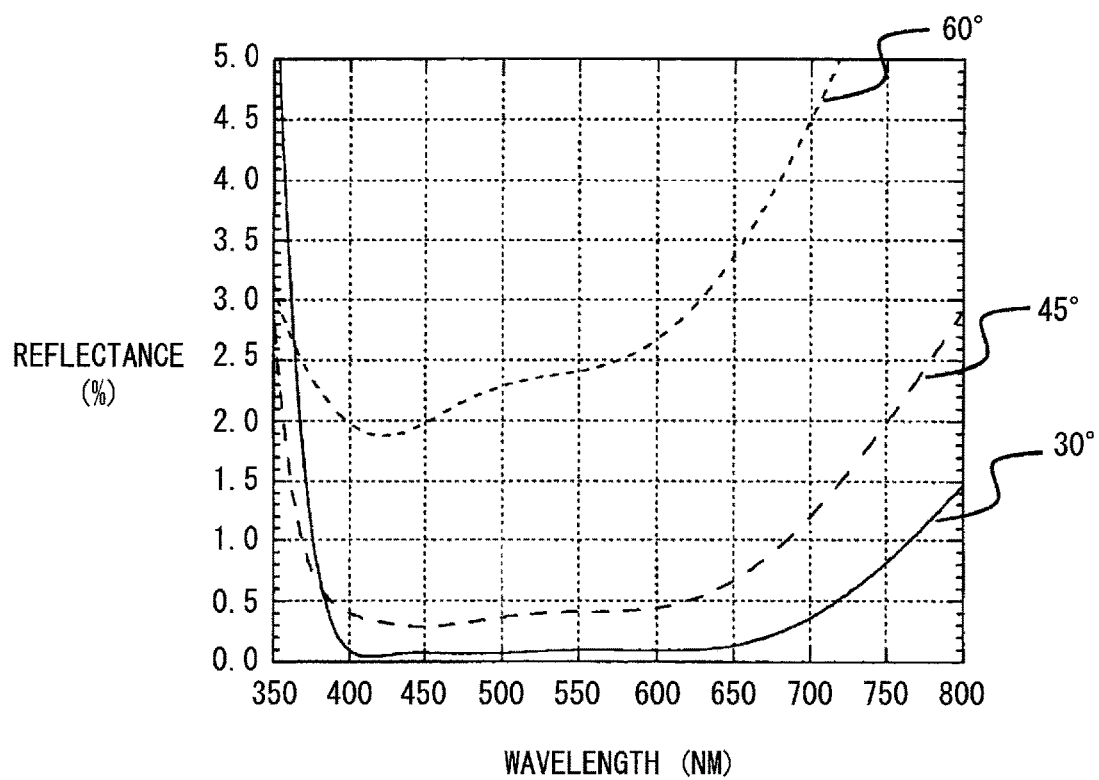
FIG. 15 is a figure showing a graph indicating the entry angle dependency of the spectral characteristics observed at the anti-reflection film in the variation.

FIG. 15 indicates the spectral characteristics observed at the optical member with the spectral characteristics indicated in FIG. 14 when light enters the optical member with entry angles of 30°, 45° and 60°. It is to be noted that while the spectral characteristics of an optical member with the anti-reflection film thereof formed for a substrate with a refractive index of 1.46 in Table 14 are not indicated in FIG. 14 and FIG. 15, such an optical member obviously has spectral characteristics substantially matching those of the optical member with the substrate thereof having a refractive index of 1.52.

Figure 16:
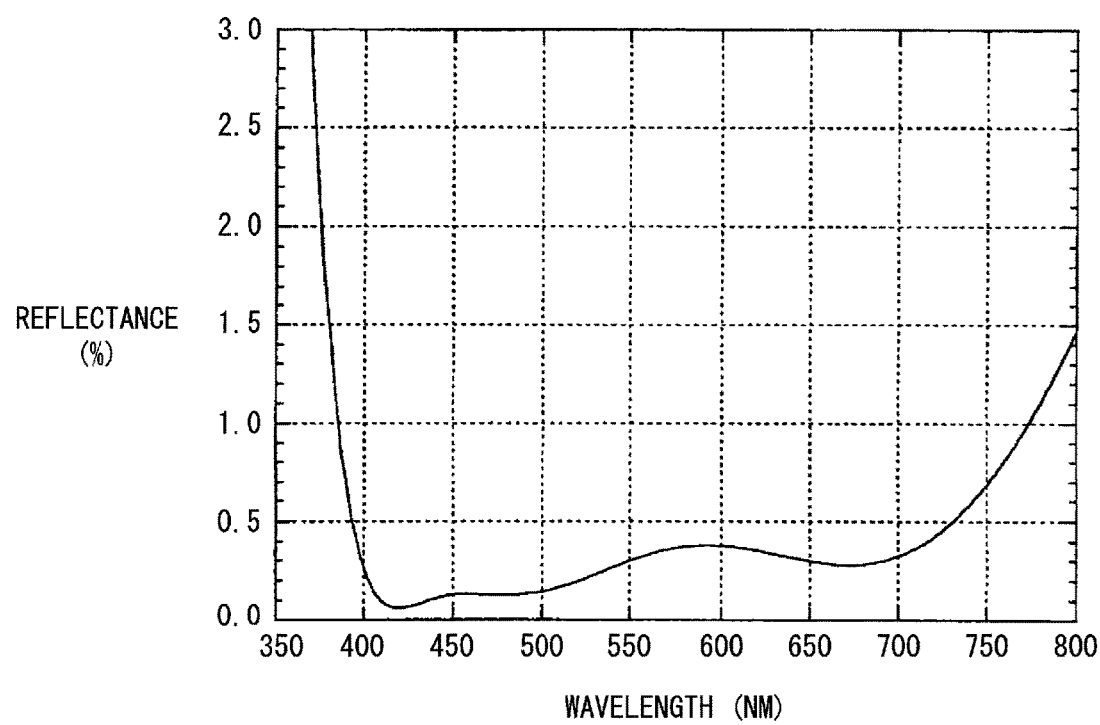
FIG. 16 is a figure showing a graph indicating spectral characteristics of an anti-reflection film prepared by adopting a related art.

In addition, for purposes of comparison, FIG. 16 presents an example of an anti-reflection film formed entirely through a dry process such as the vacuum deposition method in the related art. FIG. 16 indicates the spectral characteristics observed at an optical member with an anti-reflection film thereof designed under the conditions indicated in Table 15 below, with the substrate thereof having a refractive index of 1.52, as in Table 14 when light enters the optical member at a right angle. In addition, FIG. 17 indicates the spectral characteristics observed at the optical member with the spectral characteristics indicated in FIG. 16 when light enters with entry angles of 30°, 45° and 60°.

TABLE 15

| | Substance | Refractive Index | Optical Film thickness |
|---|---|---|---|
| Medium | Air | 1 | |
| 7th layer | MgF2 | 1.39 | 0.243λ |
| 6th layer | ZrO2 + TiO2 | 2.12 | 0.119λ |
| 5th layer | Al2O3 | 1.65 | 0.057λ |
| 4th layer | ZrO2 + TiO2 | 2.12 | 0.220λ |
| 3rd layer | Al2O3 | 1.65 | 0.064λ |
| 2nd layer | ZrO2 + TiO2 | 2.12 | 0.057λ |
| 1st layer | Al2O3 | 1.65 | 0.193λ |
| Substrate Refractive Index | | 1.52 | |

Figure 17:
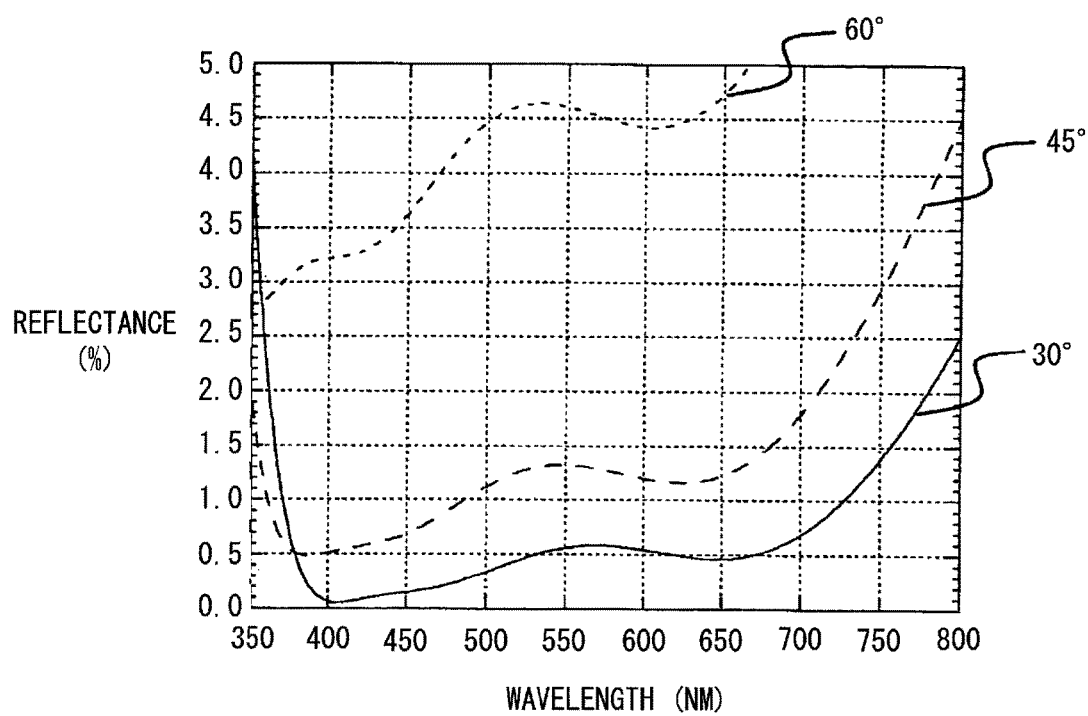
FIG. 17 is a figure showing a graph indicating the entry angle dependency of the spectral characteristics observed in relation to the anti-reflection film manufactured by adopting the related art.

Comparison of the spectral characteristics of the optical members with the anti-reflection film in the embodiment, indicated in FIG. 13 through FIG. 15, with the spectral characteristics of the optical member in the example of the related art in FIG. 16 and FIG. 17 clearly reveals that lower reflectance is assured via the anti-reflection film in the embodiment at all the entry angles and that low reflectance is assured over a wider range.

Next, examples in which anti-reflection films indicated in Table 13 and Table 14 above are adopted in the first example through the fourth example of the present invention will be described.

In the optical system OS1 in the first example, the refractive index of the negative meniscus lens L1b in the first lens group G1 is nd=1.575010 and the refractive index of the positive meniscus lens L2a in the second lens group G2 is nd=1.516800, as indicated in Table 1. Accordingly, by disposing an anti-reflection film 101 (see Table 13) corresponding to the substrate refractive index of 1.62 at the image surface side lens surface of the negative meniscus lens L1b and disposing an anti-reflection film 101 (see Table 14) corresponding to the substrate refractive index of 1.52 at the object side lens surface of the positive meniscus lens L2a, the amount of light reflected from these lens surfaces can be reduced and as a result, the extents of ghosting and flare can be reduced.

In the optical system OS2 in the second example, the refractive index of the positive meniscus lens L2b2 in the second lens group G2 is nd=1.593190 and the refractive index of the bi-concave lens L2cn in the second lens group G2 is nd=1.581440, as indicated in Table 4. Accordingly, by disposing an anti-reflection film 101 (see Table 13) corresponding to the substrate refractive index of 1.62 at the image surface side lens surface of the positive meniscus lens L2b2 and also disposing an anti-reflection film 101 (see Table 13) corresponding to the substrate refractive index of 1.62 at the object side lens surface of the bi-concave lens L2cn, the amount of light reflected from these lens surfaces can be reduced and as a result, the extents of ghosting and flare can be reduced.

In the optical system OS3 in the third example, the refractive index of the negative lens L2n in the second lens group G2 is nd=1.603420 and the refractive index of the positive lens L2b1 in the second lens group G2 is nd=1.755000, as indicated in Table 7. Accordingly, by disposing an anti-reflection film 101 (see Table 13) corresponding to the substrate refractive index of 1.62 at the image surface side lens surface of the negative lens L2n and by disposing an anti-reflection film 101 (see Table 13) corresponding to the substrate refractive index of 1.74 at the object side lens surface of the negative lens L2n, the amount of light reflected from these lens surfaces can be reduced and as a result, the extents of ghosting and flare can be reduced.

In the optical system OS4 in the fourth example, the refractive index of the positive meniscus lens L1 in the first lens group G1 is nd=1.618000 and the refractive index of the positive meniscus lens L2 in the first lens group G1 is nd=1.433852, as indicated in Table 10. Accordingly, by disposing an anti-reflection film 101 (see Table 13) corresponding to the substrate refractive index of 1.62 at the image surface side lens surface of the positive meniscus lens L1 and disposing an anti-reflection film 101 (see Table 14) corresponding to the substrate refractive index of 1.46 at the object side lens surface of the positive meniscus lens L2, the amount of light reflected from these lens surfaces can be reduced and as a result, the extents of ghosting and flare can be reduced.

Figure 18:
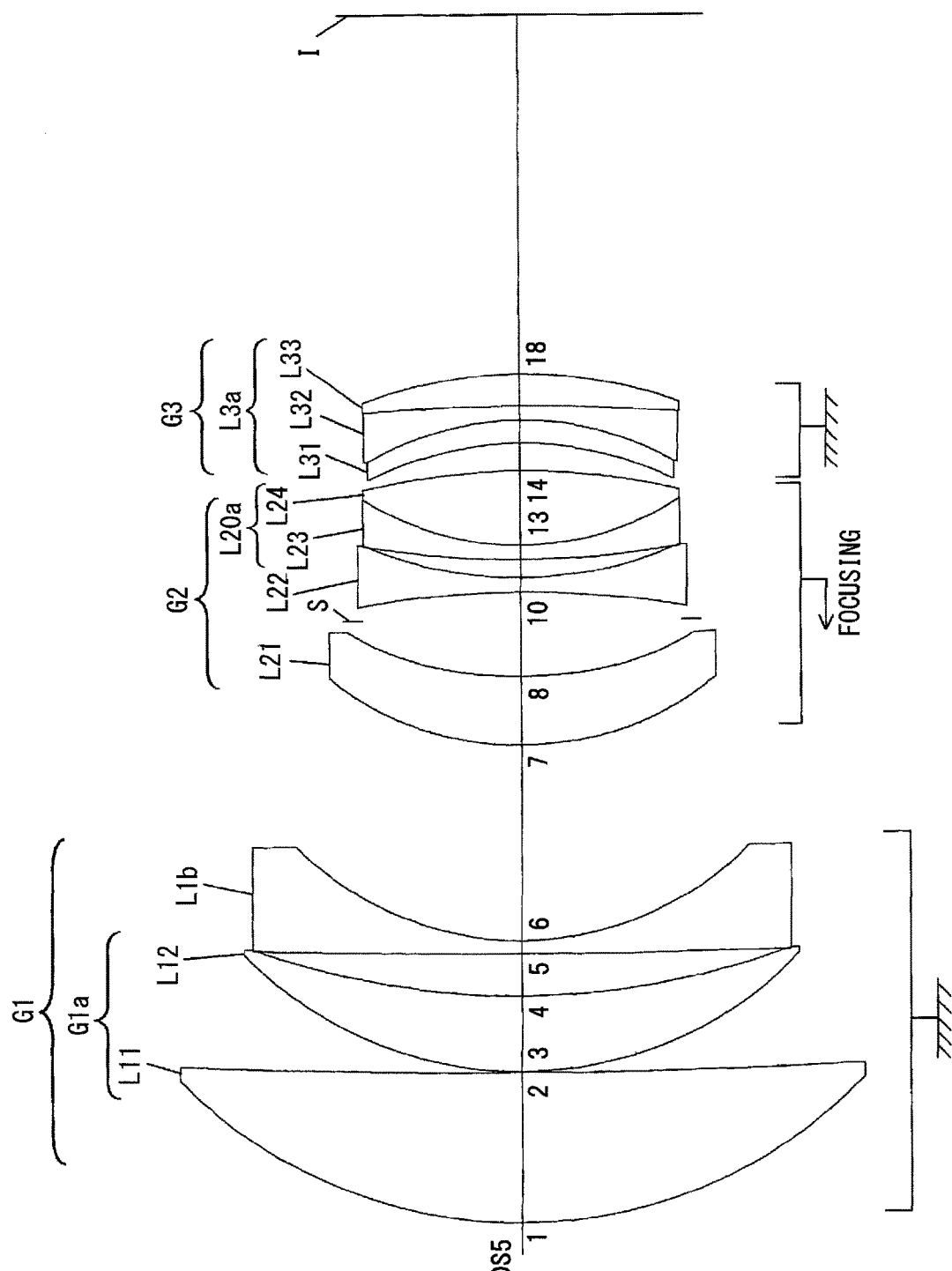
FIG. 18 is a figure showing a sectional view of a lens configuration adopted in an optical system in a fifth example of the present invention in an infinity in-focus state.

The following is a description of a second embodiment of the present invention, given in reference to drawings. As shown in FIG. 18, an optical system OS in this embodiment comprises a first lens group G1 having a positive refractive power, which remains fixed along the optical axis relative to the image surface upon focusing, a second lens group G2 having a positive refractive power, which moves along the optical axis upon focusing, and a third lens group G3 having a positive refractive power, which remains fixed along the optical axis relative to the image surface upon focusing, disposed in this order along the optical axis starting on the object side. The first lens group G1 comprises a partial lens group G1a that comprises at least two positive lenses L11 and L12 and has, as a whole, a positive refractive power, and a negative lens L1b. The second lens group G2 comprises a positive lens L21, a negative lens L22 and a cemented lens L20a having a positive refractive power, and the third lens group comprises a cemented lens L3a, all disposed in this order along the optical axis starting on the object side. The cemented lens L20a is formed by bonding together at least a negative lens L23 and a positive lens L24.

The optical system OS in the embodiment basically better addresses the issues of spherical aberration, comatic aberration and sagittal comatic aberration, which pose a concern in an inner focus-type optical system with fixed front and rear groups and, in particular, when such an optical system comprises a large diameter lens, without exacerbating chromatic aberration, field curvature or astigmatism. The following is an explanation of conditions that need to be satisfied when configuring such an optical system OS.

It is desirable that the optical system OS in the embodiment satisfy the conditional expression (101) below.

$$-1.00<(r2nb+r2na)/(r2nb-r2na)<0.00 \tag{101}$$

where:
r2na: a radius of curvature of the object side lens surface of the negative lens L22 in the second lens group G2; and
r2nb: a radius of curvature of the image side lens surface of the negative lens L22 in the second lens group G2.

Conditional expression (101) expresses conditions that must be satisfied when setting a shape factor (q factor) of the negative lens L22 in the second lens group G2 to an optimal value. The essential characteristics of the embodiment is that the focusing lens group adopting the inner focus method is configured with an optical system commonly known as a Tessar-type optical system. A Tessar-type lens group is configured with the smallest possible number of lenses and still can be adopted in a large-diameter structure, which assures optimal characteristics as a focusing lens group that satisfies the various requirements for an autofocus system. It is crucial that the optimal shape factor value be achieved for a negative lens that is disposed at the center of the Tessar-type focusing lens group in order to achieve good correction of spherical aberration, astigmatism and comatic aberration.

A value exceeding the upper limit set in conditional expression (101) would indicate that the shape of the negative lens L22 would begin to deviate from the bi-concave shape achieved when the absolute value of the radius of curvature of its object side lens surface and the absolute value of the radius of curvature of its image side lens surface are equal to each other and instead, the negative lens L22 would have a shape defined by a greater curvature achieved on the object side relative to the image surface side, i.e., the radius of curvature of the object side lens surface taking a smaller absolute value than the absolute value of the radius of curvature of the image surface side lens surface. If the lens shape was represented by an even greater positive value, the negative lens L22 would have a plano-concave shape with the concave surface thereof facing the object side, and as the value is further increased, the lens would have a meniscus shape with a convex surface thereof facing the image side. It is not desirable to have such a shape, since spherical aberration and comatic aberration would worsen. It is to be noted that the various types of aberration mentioned above can be corrected even more effectively by setting the upper limit value in conditional expression (101) to −0.05. Even better correction of the various types of aberration mentioned above can be achieved by setting the upper limit value in conditional expression (101) to −0.10. Moreover, the advantageous effects of the embodiment can be maximized by setting the upper limit value in conditional expression (101) to −0.20.

A value less than the lower limit set in conditional expression (101) would indicate that the negative lens L22 would begin to deviate from a plano-concave shape with the concave surface thereof facing the image side and instead, the negative lens L22 would have a meniscus shape with the convex surface thereof facing the object side. Such a lens shape is not desirable, as it would make it difficult to correct astigmatism, field curvature and comatic aberration. It is to be noted that the various types of aberration mentioned above can be corrected even more effectively by setting the lower limit value in conditional expression (101) to −0.90. Even better correction of the various types of aberration mentioned above can be achieved by setting the lower limit value in conditional expression (101) to −0.85. Moreover, the advantageous effects of the embodiment can be maximized by setting the lower limit value in conditional expression (101) to −0.83.

By adopting the structure described above, an optical system with the focusing lens group thereof configured with a small number of lenses, which assures good performance and limits various types of aberration, can be achieved.

It is also desirable that the optical system OS in the embodiment satisfy the conditional expression (102) below.

$$-0.35 < f2/f1 < 1.00 \tag{102}$$

where:
f2: a focal length of the second lens group G2; and
f1: a focal length of the first lens group G1.

Conditional expression (102) expresses the conditions to be satisfied in order to set an optimal value for the focal length of the second lens group G2, i.e., an optimal value for the refractive power of the second lens group G2.

A value exceeding the upper limit value set in conditional expression (102) would indicate that the second lens group would have a lower refractive power, which would lead to a bulkier optical system and an increase in the extent to which the second lens group must move upon focusing. This would pose difficulty in AF drive via an actuator. In addition, since the refractive power of the first lens group G1 would be relatively high, it would become difficult to correct spherical aberration and axial chromatic aberration under such circumstances. It is to be noted that the various types of aberration mentioned above can be corrected more effectively by setting the upper limit value in conditional expression (102) to 0.90. In addition, the various types of aberration mentioned above can be corrected even more effectively by setting the upper limit value in conditional expression (102) to 0.80. Furthermore, the advantageous effects of the embodiment can be maximized by setting the upper limit value in conditional expression (102) to 0.70.

A value lower than the lower limit value set in conditional expression (102) would indicate that the second lens group would have a higher refractive power which would make it difficult to correct, in particular, spherical aberration and comatic aberration. Namely, the outcome would be undesirable. It is to be noted that the various types of aberration can be corrected more effectively by setting the lower limit value in conditional expression (102) to 0.36. In addition, the various types of aberration can be corrected even more effectively by setting the lower limit value in conditional expression (102) to 0.37. Furthermore, the advantageous effects of the embodiment can be maximized by setting the lower limit value in conditional expression (102) to 0.38.

It is further desirable that conditions expressed in the following conditional expression (103) be satisfied in the optical system OS in the embodiment.

$$0.00 < X2/f2 < 0.10 \tag{103}$$

where:
X2: a distance over which the second lens group G2 moves to adjust focus from an infinity in-focus state to a state equivalent to an image-forming magnification factor $\beta = -1/30$; and
f2: a focal length of the second lens group G2.

Conditional expression (103) defines the relationship between the distance over which the second lens group G2, i.e., the focusing lens group, moves and its refractive power.

If X2/f2 exceeded the upper limit set in conditional expression (103), the distance over which the second lens group G2 must travel upon focusing would increase and thus it would become difficult to achieve AF drive via an actuator. Under these circumstances, the focal length of the second lens group G2, i.e., the focusing lens group, would be smaller and the refractive index thereof would be higher, making it difficult to correct spherical aberration and comatic aberration. It is to be noted that the various types of aberration mentioned above can be corrected more effectively by setting the upper limit value in conditional expression (103) to 0.08. In addition, the various types of aberration mentioned above can be corrected even more effectively by setting the upper limit value in conditional expression (103) to 0.07. Furthermore, the advantageous effects of the embodiment can be maximized by setting the upper limit value in conditional expression (103) to 0.06.

In addition, if X2/f2 takes a value higher than the lower limit set in conditional expression (103), short-distance fluctuation and the like occurring in spherical aberration can be corrected in a desirable manner. It is to be noted that the short distance fluctuation and the like in spherical aberration can be corrected more effectively by setting the lower limit value in conditional expression (103) to 0.02. In addition, the various types of aberration can be corrected even more effectively by setting the lower limit value in conditional expression (103) to 0.03. Furthermore, the advantageous effects of the embodiment can be maximized by setting the lower limit value in conditional expression (103) to 0.04.

It is desirable that the optical system OS in the embodiment satisfy conditions expressed in conditional expression (104) below.

$$1.00 < f3/f0 < 20.00 \tag{104}$$

where:
f3: a focal length of the third lens group G3; and
f0: a focal length of the entire system in an infinity in-focus state.

Conditional expression (104) expresses the conditions to be satisfied in order to set an optimal value for the focal length of the third lens group G3, i.e., an optimal value for the refractive power of the third lens group G3.

If f3/f0 exceeded the upper limit set in conditional expression (104), the refractive power of the third lens group G3, which remains fixed along the optical axis relative to the image surface upon focusing, would be greatly lowered.

Under such circumstances, the aberration correcting effect will diminish and, as a result, it would be difficult to correct off-axial aberration such as comatic aberration. Such an outcome would be undesirable. It is to be noted that the various types of aberration mentioned above can be corrected more effectively by setting the upper limit value in conditional expression (104) to 19.00. In addition, the various types of aberration mentioned above can be corrected even more effectively by setting the upper limit value in conditional expression (104) to 18.00. Furthermore, the advantageous effects of the embodiment can be maximized by setting the upper limit value in conditional expression (104) to 17.50.

If, on the other hand, f3/f0 took a value less than the lower limit set in conditional expression (104), the third lens group G3 would have a higher refractive power and the back focus would be shortened. If the refractive powers of the individual lens groups were set so as to assure sufficient back focus, it will become difficult to correct spherical aberration and field curvature and furthermore, the extent of short-distance aberration fluctuation will increase. Such an outcome will not be desirable. It is to be noted that the various types of aberration mentioned above can be corrected more effectively by setting the lower limit value in conditional expression (104) to 1.30. In addition, the various types of aberration mentioned above can be corrected even more effectively by setting the lower limit value in conditional expression (104) to 1.50. Furthermore, the advantageous effects of the embodiment can be maximized by setting the lower limit value in conditional expression (104) to 2.00.

Moreover, it is desirable that the cemented lens L20a in the second lens group G2 in the optical system OS in the embodiment be formed by bonding together the negative lens L23 and the positive lens L24 and that the optical system OS satisfy conditional expression (105) below.

$$0.10 < N24 - N23 < 0.50 \qquad (105)$$

where:
N23: a refractive index at the d-line of the negative lens L23 constituting part of the cemented lens L20a in the second lens group G2; and
N24: a refractive index at the d-line of the positive lens L24 constituting part of the cemented lens L20a in the second lens group G2.

Conditional expression (105) defines the relationship between the value representing the refractive index of the positive lens L24 constituting part of the cemented lens L20a, and the value representing the refractive index of the negative lens L23 constituting part of the cemented lens L20a in the second lens group G2. By satisfying these conditions, an optimal value can be set for the Petzval sum and field curvature and astigmatism can be effectively corrected.

A value exceeding the upper limit value set in conditional expression (105) would indicate that a high dispersion glass material selected as an optimal glass material would need to be used extensively, which would make it difficult to correct axial chromatic aberration and chromatic aberration of magnification. In other words, the outcome would be undesirable. It is to be noted that the various types of aberration mentioned above can be corrected more effectively by setting the upper limit value in conditional expression (105) to 0.45. In addition, the various types of aberration mentioned above can be corrected even more effectively by setting the upper limit value in conditional expression (105) to 0.40. Furthermore, the advantageous effects of the embodiment can be maximized by setting the upper limit value in conditional expression (105) to 0.30.

In addition, a value below the lower limit value set in conditional expression (105) would indicate that an optimal Petzval sum could not readily be set, which would make it difficult to correct field curvature and astigmatism. In other words, the outcome would be undesirable. It is to be noted that the various types of aberration can be corrected more effectively by setting the lower limit value in conditional expression (105) to 0.15. In addition, the various types of aberration can be corrected even more effectively by setting the lower limit value in conditional expression (105) to 0.19. Furthermore, the advantageous effects of the embodiment can be maximized by setting the lower limit value in conditional expression (105) to 0.21.

It is also desirable that the cemented lens L3a in the third lens group G3 in the optical system OS in the embodiment comprise an object side positive lens L31 disposed closest to the object side and a negative lens L32 bonded on the image side of the object side positive lens and that the optical system OS satisfy conditional expression (106) below.

$$0.10 < N31 - N32 < 0.50 \qquad (106)$$

where:
N31: a refractive index of the object side positive lens L31 at the d-line
N32: a refractive index at the d-line of the negative lens L32 bonded on the image side of the object side positive lens L31.

Conditional expression (106) defines the relationship between the value representing the refractive index of the object side positive lens L31 and the value representing the refractive index of the negative lens L32 in the cemented lens L3a in the third lens group G3. By satisfying these conditions, an optimal value can be set for the Petzval sum and field curvature and astigmatism can be effectively corrected.

A value exceeding the upper limit value set in conditional expression (106) would indicate that a high dispersion glass material, selected as an optimal glass material would need to be used extensively, which would make it difficult to correct axial chromatic aberration and chromatic aberration of magnification. In other words, the outcome would be undesirable. It is to be noted that the various types of aberration mentioned above can be corrected more effectively by setting the upper limit value in conditional expression (106) to 0.45. In addition, the various types of aberration mentioned above can be corrected even more effectively by setting the upper limit value in conditional expression (106) to 0.40. Furthermore, the advantageous effects of the embodiment can be maximized by setting the upper limit value in conditional expression (106) to 0.30.

A value below the lower limit value set in conditional expression (106) would indicate that an optimal Petzval sum could not readily be set, which would make it difficult to correct field curvature and astigmatism. In other words, the outcome would be undesirable. It is to be noted that the various types of aberration can be corrected more effectively by setting the lower limit value in conditional expression (106) to 0.12. In addition, the various types of aberration can be corrected even more effectively by setting the lower limit value in conditional expression (106) to 0.13. Furthermore, the advantageous effects of the embodiment can be maximized by setting the lower limit value in conditional expression (106) to 0.15.

Furthermore, it is desirable that the following conditional expression (107) be satisfied in the optical system OS in the embodiment.

$$57.00 < vd1a \qquad (107)$$

where:
vd1a: an average value of Abbe numbers of the at least two positive lenses (L11, L12) in the partial lens group G1a.

Conditional expression (107) expresses conditions to be satisfied when setting the average value for the Abbe numbers of all the positive lenses in the partial lens group G1a, which comprises a plurality of positive lenses and has a positive refractive power. The partial lens group G1a, is located further toward the object side within the first lens group G1 and has a positive refractive power, bears significant relevance to achieving good correction of axial chromatic aberration and chromatic aberration of magnification. In this embodiment, axial chromatic aberration, in particular, is corrected with improved effectiveness by utilizing anomalous partial dispersion glass or fluorite.

If the conditions expressed in conditional expression (107) were not satisfied, a glass material having characteristics known as anomalous partial dispersion characteristics could not be used and thus it would be difficult to assure good correction of axial chromatic aberration and chromatic aberration of magnification and in particular, good correction of second-order dispersion. It is to be noted that the various types of aberration such as chromatic aberration can be corrected more effectively by setting the lower limit value in conditional expression (107) to 60.00. In addition, the various types of aberration such as axial chromatic aberration can be corrected even more effectively by setting the lower limit value in conditional expression (107) to 69.00. Furthermore, the advantageous effects of the embodiment can be maximized by setting the lower limit value in conditional expression (107) to 75.00.

It is further desirable that the optical system OS in the embodiment comprise an aperture stop S via which the F number is determined, disposed further toward the image side relative to the first lens group G1. It is even more desirable that the optical system OS comprise an aperture stop S for determining the F number disposed within the second lens group G2. It is further desirable that the optical system OS comprise an aperture stop S via which the F number is determined, disposed either between the positive lens L21 and the negative lens L22 in the second lens group G2 or between the negative lens L22 and the cemented lens L20a in the second lens group G2. This will make it possible to correct astigmatism and distortion in a desirable manner.

In addition, it is desirable that the optical system OS in the embodiment comprise at least one aspherical surface. In such a case comatic aberration and more specifically, sagittal comatic aberration, and spherical aberration can be corrected in a desirable manner.

FIG. 9 is a schematic sectional view of a single lens reflex camera 1 (hereafter will be simply referred to as a camera 1), representing an example of an image-capturing device comprising the optical system OS described above. In the camera 1, light departing an object (photographic subject) (not shown) is condensed at a photographic lens 2 (optical system OS) and an image is formed via a quick-return mirror 3 on a reticle 4. The light having formed an image at the reticle 4 is reflected a plurality of times within a pentaprism 5 and is then guided to an eyepiece lens 6. The photographer is thus able to view an object (photographic subject) image as an upright image via the eyepiece lens 6.

In addition, as the photographer presses a shutter release button (not shown), the quick-return mirror 3 retreats to a position outside the optical path, and the light from the object (photographic subject) (not shown), condensed at the photographic lens 2, forms a subject image on an image sensor 7. Thus, an image is captured at the image sensor 7 with the light from the object (photographic subject) and the image thus captured is recorded as an object (photographic subject) image into a memory (not shown). Through this process, the photographer is able to photograph the object (photographic subject) with the camera 1. It is to be noted that the photographic lens 2 in the camera 1 shown in FIG. 9 may be a detachable lens or an integrated part of the camera 1. Furthermore, the camera 1 may be what has been referred to as a single lens reflex camera, or it may be a compact camera that does not include a quick-return mirror and the like or a mirrorless single lens reflex camera.

The optical system OS with its characteristic lens configuration, with its focusing lens group configured with a small number of lenses, is used as the photographic lens 2, which assures high performance and limits the extents of the various types of aberration, in the camera 1. As a result, the camera 1 is able to achieve fast focusing and high-performance shooting.

In addition, the alternatives described below may be adopted as deemed appropriate as long as the optical performance remains intact.

While the optical system OS in the embodiment adopts a three-group configuration, the structural characteristics and the like described above may be adopted in another group configuration such as a four-group configuration or a five-group configuration. In addition, they may be adopted in a configuration with an additional lens or an additional lens group which is disposed closest to the object, a configuration with an additional lens or an additional lens group which is disposed closest to the image or in a configuration with an additional lens or an additional lens group which is disposed between lens groups. It is to be noted that the term "lens group" is used to refer to a portion made up with at least one lens, which is separated via an air gap. Furthermore, in addition to the positive lens, the negative lens and the cemented lens having a positive refractive power, the second lens group may comprise another lens component disposed on the object side or image side of the lens, or between the lenses.

In addition, the optical system according to the present invention may adopt a structure in which part of a lens group, a single lens group in its entirety or a plurality of lens groups is made to move along the optical axis as a focusing lens group upon focusing from an infinity-distance object to a short-distance object. It is particularly desirable to use the second lens group as the focusing lens group. Such a focusing lens group can also be used for autofocusing and is optimal for motor drive for autofocus operation in which an ultrasonic motor or the like is utilized.

Furthermore, a lens group, a partial lens group or a part thereof in the optical system according to the present invention may be utilized as a vibration-proofing lens group, which is made to move in a direction having a component perpendicular to the optical axis or rotationally move (swing) along a direction in which a plane containing the optical axis ranges in order to correct image blurring caused by camera shaking or the like. It is particularly desirable to use the second lens group or part of the second lens group as the vibration-proofing lens group in the optical system according to the present invention.

A lens constituting part of the optical system according to the present invention may have a spherical lens surface, a planar lens surface or an aspherical lens surface. A spherical or planar lens surface is desirable in that the lens can be machined with ease and facilitates assembly/adjustment, which makes it possible to prevent degradation of optical performance due to error occurring during the machining and assembly/adjustment processes. A spherical or planar lens surface is desirable in that even in the event of the image surface misalignment, the extent of degradation in imaging performance is limited. An aspherical lens surface may be formed through grinding. Or an aspherical surface may be a glass mold aspherical surface constituted of glass formed in an aspherical surface with a mold or a composite aspherical shape constituted of resin disposed at the surface of glass and formed in an aspherical shape. Furthermore, the present invention may be adopted in conjunction with a lens with a diffractive surface, or it may be adopted in conjunction with a gradient index lens (GRIN lens) or a plastic lens.

While it is desirable to dispose the aperture stop S near the center of the optical system OS, the function of an aperture stop may be fulfilled via a lens frame without disposing a dedicated aperture stop member.

Moreover, an anti-reflection film assuring high transmittance over a wide wavelength range may be disposed at the individual lens surfaces so as to limit the extents of ghosting and flare and assure a high level of optical performance with high contrast.

Figure 26:
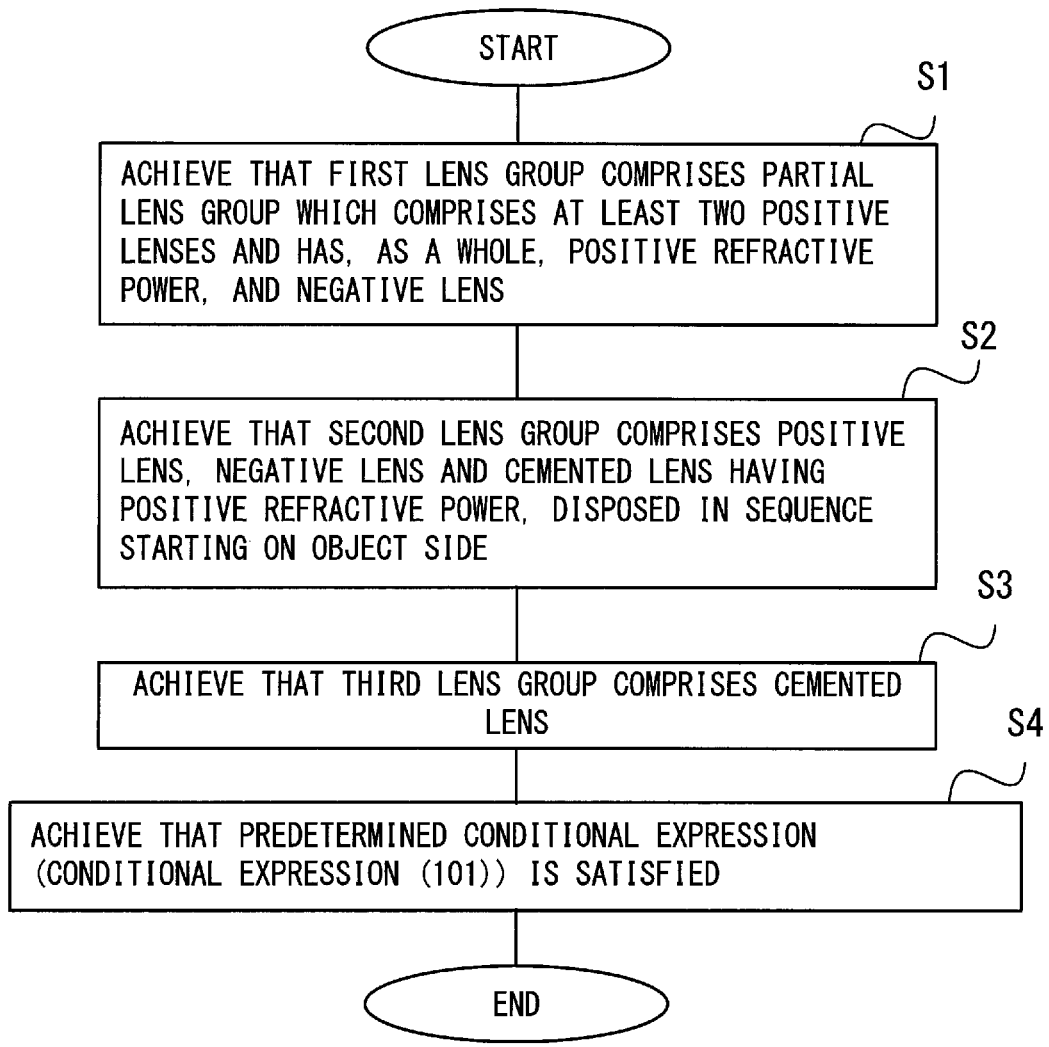
FIG. 26 is a figure showing a flowchart in reference to which a method for manufacturing the optical system according to the present invention is to be explained.

Next, in reference to FIG. 26, an optical system manufacturing method for manufacturing an optical system OS in an embodiment will be briefly explained. The method for manufacturing an optical system, through which an optical system OS comprising a first lens group G1 having a positive refractive power, which remains fixed along the optical axis relative to the image surface upon focusing, a second lens group G2 having a positive refractive power, which moves along the optical axis upon focusing and a third lens group G3 having a positive refractive power, which remains fixed along the optical axis relative to the image surface upon focusing, disposed in this order along the optical axis starting on the object side, is manufactured, comprises the following steps S1 through S4.

A step of achieving that the first lens group G1 comprises a partial lens group G1a, which comprises at least two positive lenses L11 and L12 and has, as a whole, a positive refractive power, and a negative lens L1b (step S1)

A step of achieving that the second lens group G2 comprises a positive lens L21, a negative lens L22 and a cemented lens L20a having a positive refractive power, disposed in sequence starting on the object side (step S2)

A step of achieving that the third lens group G3 comprises a cemented lens L3a (step S3)

A step of achieving that conditions expressed in predetermined conditional expression (101) are satisfied (step S4)

$$-1.00 < (r2nb+r2na)/(r2nb-r2na) < 0.00 \quad (101)$$

where:
r2na: a radius of curvature of the object side lens surface of the negative lens L22 in the second lens group; and
r2nb: a radius of curvature of the image side lens surface of the negative lens L22 in the second lens group.

Through this optical system manufacturing method, an optical system with a focusing lens group requiring a small number of components, assuring a high level of performance and lesser extents of various types of aberration can be manufactured.

The following is a description of examples of the optical system OS achieved by taking specific numerical values, given in reference to drawings. It is to be noted that FIG. 18, FIG. 20, FIG. 22 and FIG. 24 show the configurations of optical systems OS (OS5 through OS8) in the individual examples.

Each aspherical surface in the examples can be expressed with the following equation (a), with y representing the height measured along the direction perpendicular to the optical axis, S(y) representing the distance (sag quantity) measured along the optical axis from the tangent plane of the vertex of each aspherical surface to the particular aspherical surface at the height y, r representing the radius of curvature at a reference spherical surface (paraxial curvature radius), κ representing the conic constant and An indicates the aspherical coefficient of the nth order;

$$X(y)=(y^2/r)/[1+[1-\kappa(y^2/r^2)]^{1/2}]+A4 \times y^4 + A6 \times y^6 + A8 \times y^8 + A10 \times y^{10} \quad (a)$$

It is to be noted that the aspherical coefficient A2 of the second order is 0 in all the examples. In addition, each aspherical surface is marked with "*" affixed on the right side of its surface number in the tables provided in correspondence to the individual examples.

Fifth Example

FIG. 18 illustrates the configuration of an optical system OS5 in the fifth example. The optical system OS5 comprises a first lens group G1 having a positive refractive power, which remains fixed along the optical axis relative to the image surface upon focusing, a second lens group G2 having a positive refractive power, which moves along the optical axis toward the object side upon focusing, and a third lens group G3 having a positive refractive power, which remains fixed along the optical axis relative to the image surface upon focusing, disposed in this order along the optical axis starting on the object side.

The first lens group G1 comprises a partial lens group G1a having a positive refractive power and a negative meniscus lens L1b with a convex surface thereof facing the object side. The partial lens group G1a is made up with a positive meniscus lens L11 with a convex surface thereof facing the object side and a positive meniscus lens L12 with a convex surface thereof facing the object side.

The second lens group G2 comprises a positive meniscus lens L21 with a convex surface thereof facing the object side and both lens surfaces, one on the object side and the other on the image side, having an aspherical shape, an aperture stop S, a bi-concave negative lens L22, and a cemented positive lens L20a formed by bonding together a negative meniscus lens L23 with a convex surface thereof facing the object side and a bi-convex positive lens L24, disposed in this order starting on the object side.

The third lens group G3 is constituted with a cemented positive lens formed by bonding together three lenses, i.e., a positive meniscus lens L31 with a convex surface thereof facing the image side, a negative meniscus lens L32 with a convex surface thereof facing the image side and a positive meniscus lens L33 with a convex surface thereof facing the image side.

Table 101 below lists data values pertaining to the optical system OS5 in the fifth example. In [Overall Specifications] in Table 101, "f" indicates the focal length, "FNO" indicates the F number, "ω" indicates the half angle of field (unit: "°"), "Y" indicates the image height, "TL" indicates the total length of the optical system OS5 and "Bf" indicates the back focus. It is to be noted that the total length TL indicates the distance measured on the optical axis from the lens surface (first surface) in the optical system OS, which is located closest to the object side, to the image surface.

In addition, in [Surface Data], the order (surface number) with which a given optical surface is positioned, viewed from the object side along the direction in which light advances, is indicated in the first column, the radius of curvature of each optical surface is indicated in the second column r, the surface distance (the distance between an nth surface (n is an integer) and an n+1th surface) is indicated in the third column d, the Abbe number at the d-line (wavelength λ=587.6 nm) is indicated in the fourth column vd and the refractive index at the d-line is indicated in the fifth column nd. Furthermore, the radius of curvature r=∞ means a flat surface at a lens and means an opening at the aperture stop S. The refractive index nd=1.00000 of air is not indicated. In addition, the surface distance for the last surface (18th surface) indicates the distance to the image surface I measured on the optical axis. Surface numbers 1 through 18 correspond to the numbers 1 through 18 in FIG. 18.

In [Lens Group Focal Length], the surface number of the surface located closest to the object side in each lens group (Starting Surface) and the focal length of the particular lens group are indicated.

In [Individual Distance Data], "F" indicates the focal length of the entire system, "β" indicates the image forming magnification factor with which the object is magnified in the image, "Di" (i is an integer) indicates a variable surface distance pertaining to an ith surface. In addition, "Infinite" indicates an infinity in-focus state, "Intermediate" indicates an intermediate distance in-focus state and "Short-distance" indicates a short distance in-focus state. It is to be noted that "D0" indicates the distance from the object to the first surface.

While "mm" is normally used as the unit for length, such as the focal length f, the radius of curvature r and the surface distance d, among all the data values listed below, equivalent optical performance can be achieved in an optical system that is either proportionally expanded or proportionally reduced and thus, the applicable unit is not limited to "mm". In addition, the reference symbols and the data notations described above are applicable in subsequent examples, as well.

TABLE 101

[Overall Specifications]

f = 103.256
FNO = 1.45
ω = 11.68
Y = 21.6
TL = 130.513
Bf = 39.073

[Surface Data]

| Surface Number | r | d | nd | vd |
|---|---|---|---|---|
| Object Surface | ∞ | ∞ | | |
| 1 | 51.1279 | 16.3006 | 66.99 | 1.593490 |
| 2 | 755.5654 | 0.1000 | | |
| 3 | 41.4637 | 8.1027 | 95.25 | 1.433852 |

TABLE 101-continued

| | | | | |
|---|---|---|---|---|
| 4 | 84.3725 | 4.5000 | | |
| 5 | 791.5941 | 1.4692 | 38.03 | 1.603420 |
| 6 | 33.8617 | variable | | |
| 7* | 35.5717 | 7.4058 | 66.99 | 1.593490 |
| 8* | 48.2846 | 6.0000 | | |
| 9(aperture) | | 3.0000 | | |
| 10 | −102.8594 | 1.5000 | 38.03 | 1.603420 |
| 11 | 42.6185 | 2.0000 | | |
| 12 | 102.8934 | 1.5000 | 40.98 | 1.581440 |
| 13 | 31.6297 | 8.0000 | 46.60 | 1.804000 |
| 14 | −71.5505 | variable | | |
| 15 | −35.9311 | 2.5000 | 52.34 | 1.755000 |
| 16 | −32.3912 | 1.5000 | 38.03 | 1.603420 |
| 17 | −214.6029 | 3.5000 | 35.73 | 1.902650 |
| 18 | −47.9685 | 39.07303 | | |
| Image Surface | ∞ | | | |

[Lens Group Focus length]

| Group | Starting Surface | Focal Length |
|---|---|---|
| 1 | 1 | 216.18736 |
| 2 | 7 | 105.33824 |
| 3 | 15 | 380.67323 |

[Individual Distance Data]

| | Infinite | Intermediate | Short-distance |
|---|---|---|---|
| F, β | 103.25555 | −0.03333 | −0.13063 |
| D0 | ∞ | 3107.7663 | 819.4870 |
| d6 | 21.06494 | 16.43139 | 4.14418 |
| D14 | 2.99667 | 7.63022 | 19.91743 |

The lens surfaces designated with surface numbers 7 and 8 in the optical system OS5 in the fifth example are formed as aspherical surfaces. Table 102 below provides aspherical surface data, i.e., the values taken for the conic constant κ and the various aspherical coefficients A4 through A10. It is to be noted that "E−n" means "×10$^{-n}$" in the description of subsequent examples.

TABLE 102

[Aspherical Surface Data]

| | K | A4 | A6 | A8 | A10 |
|---|---|---|---|---|---|
| No. 7 Surface | 1.0000 | 2.14745E−06 | 4.07060E−09 | −2.12514E−12 | −7.96097E−16 |
| No. 8 Surface | 1.0000 | 5.98947E−06 | 6.10636E−09 | 2.89314E−12 | −1.24745E−14 |

Table 103 below lists specific values corresponding to the conditional expressions pertaining to the optical system OS5 in the fifth example described above. It is to be noted that "r2na" represents the radius of curvature of the object side lens surface of the negative lens L22 in the second lens group G2. In addition, "r2nb" represents the radius of curvature of the image side lens surface of the negative lens L22 in the second lens group G2. "f2" represents the focal length of the second lens group G2. "f1" represents the focal length of the first lens group G1. "X2" represents the distance by which the second lens group G2 moves to adjust focus from an infinity in-focus state to a state equivalent to the image forming magnification factor β=−1/30. "f3" represents the focal length of the third lens group G3. "f0" represents the focal length of the entire system in an infinity in-focus state. "N23" represents the refractive index at the d-line of the negative lens L23 constituting part of the cemented lens L20a in the second lens group G2. "N24" represents the refractive index at the d-line of the positive lens L24 constituting part of the cemented lens L20a in the second lens group G2. "N31" represents the refractive index of the object side positive lens L31 at the d-line. "N32" represents the refractive index at the d-line of the negative lens L32 bonded on the image side of the object side positive lens L31. "vd1a" represents the average value of the Abbe numbers of the at least positive lenses (L11, L12) in the partial lens group G1a.

TABLE 103

| (101) | (r2nb + r2na)/(r2nb − r2na) = −0.414 |
|---|---|
| (102) | f2/f1 = 0.487 |
| (103) | X2/f2 = 0.0440 |
| (104) | f3/f0 = 3.69 |
| (105) | N24 − N23 = 0.223 |
| (106) | N31 − N32 = 0.152 |
| (107) | vd1a = 81.1 |

As indicated above, the optical system OS5 in the fifth example satisfies all the conditional expressions (101) through (107) described above.

Figure 19:
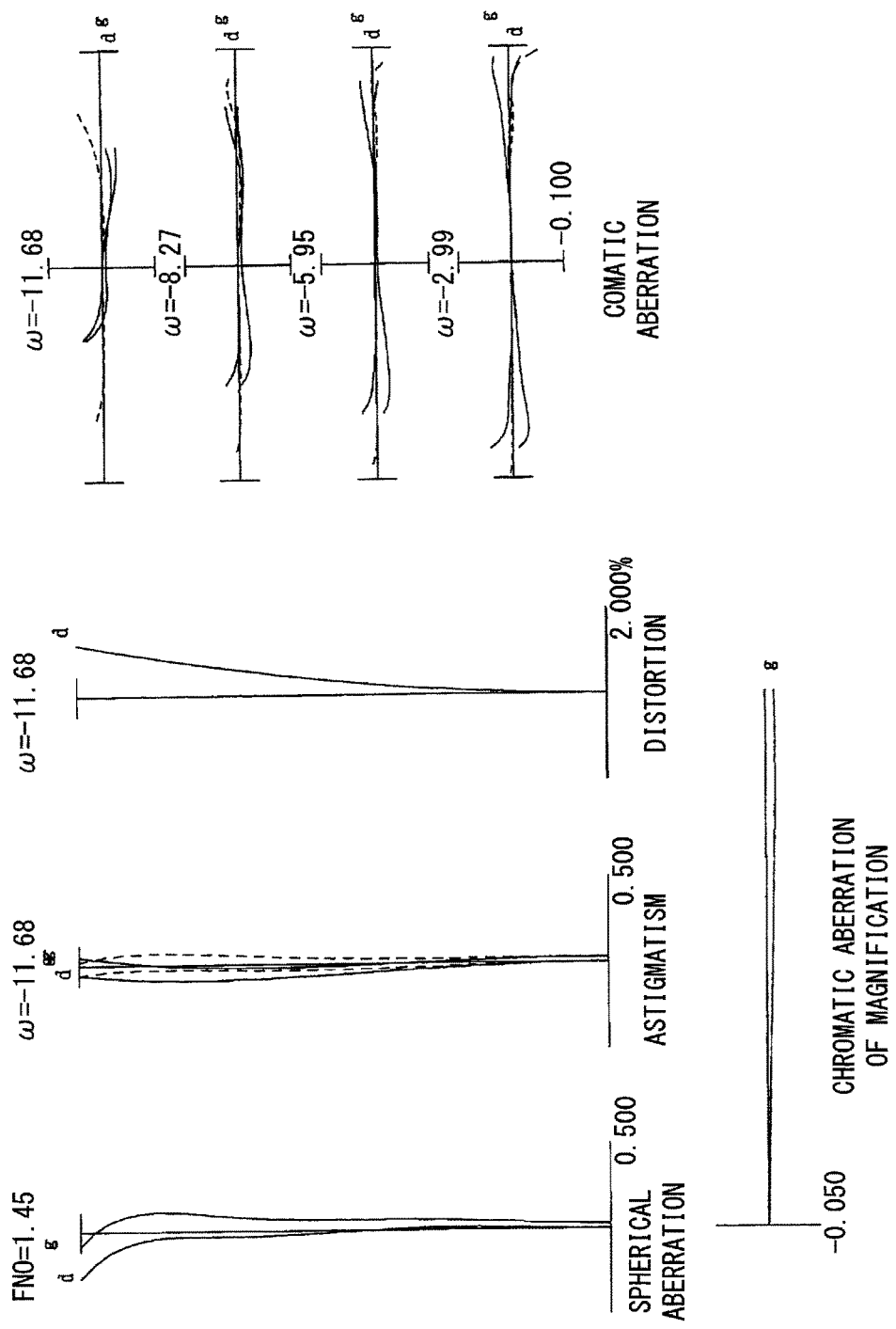
FIG. 19 is a figure showing diagrams of various types of aberration occurring at the optical system in the fifth example of the present invention in an infinity in-focus state.

FIG. 19 provides diagrams pertaining to various types of aberration, i.e., spherical aberration, astigmatism, distortion, chromatic aberration of magnification and comatic aberration, occurring at the optical system OS5 in the fifth example in an infinity in-focus state. In these aberration diagrams "FNO" indicates the F number, "Y" indicates the image height and "ω" indicates the half angle of field [unit: "°"]. In addition, "d" and "g" in the aberration diagrams respectively indicate the aberration at the d-line (wavelength λ=587.6 nm) and the aberration at the g-line (wavelength λ=435.8 nm). In the astigmatism diagram, the solid line represents the sagittal image surface and the dotted line represents the meridional image surface. Furthermore, in the comatic aberration diagram that indicates comatic aberration occurring at various half angles of field "ω", the meridional comatic aberration occurring at the d-line and the g-line is represented by the solid lines, the sagittal comatic aberration occurring at the d-line along the meridional direction is represented by the dotted line on the left side of the origin point and the sagittal comatic aberration occurring at the d-line along the sagittal direction is represented by the dotted line on the right side of the origin point. It is to be noted that the notational designations in these aberration diagrams will also be used in the description of subsequent examples. As the various aberration diagrams in FIG. 19 clearly indicate, the various types of aberration, including spherical aberration, sagittal comatic aberration, field curvature, astigmatism and meridional comatic aberration are well corrected in the optical system OS5 in the fifth example, allowing the optical system OS5 to assure a high level of optical performance.

Sixth Example

Figure 20:
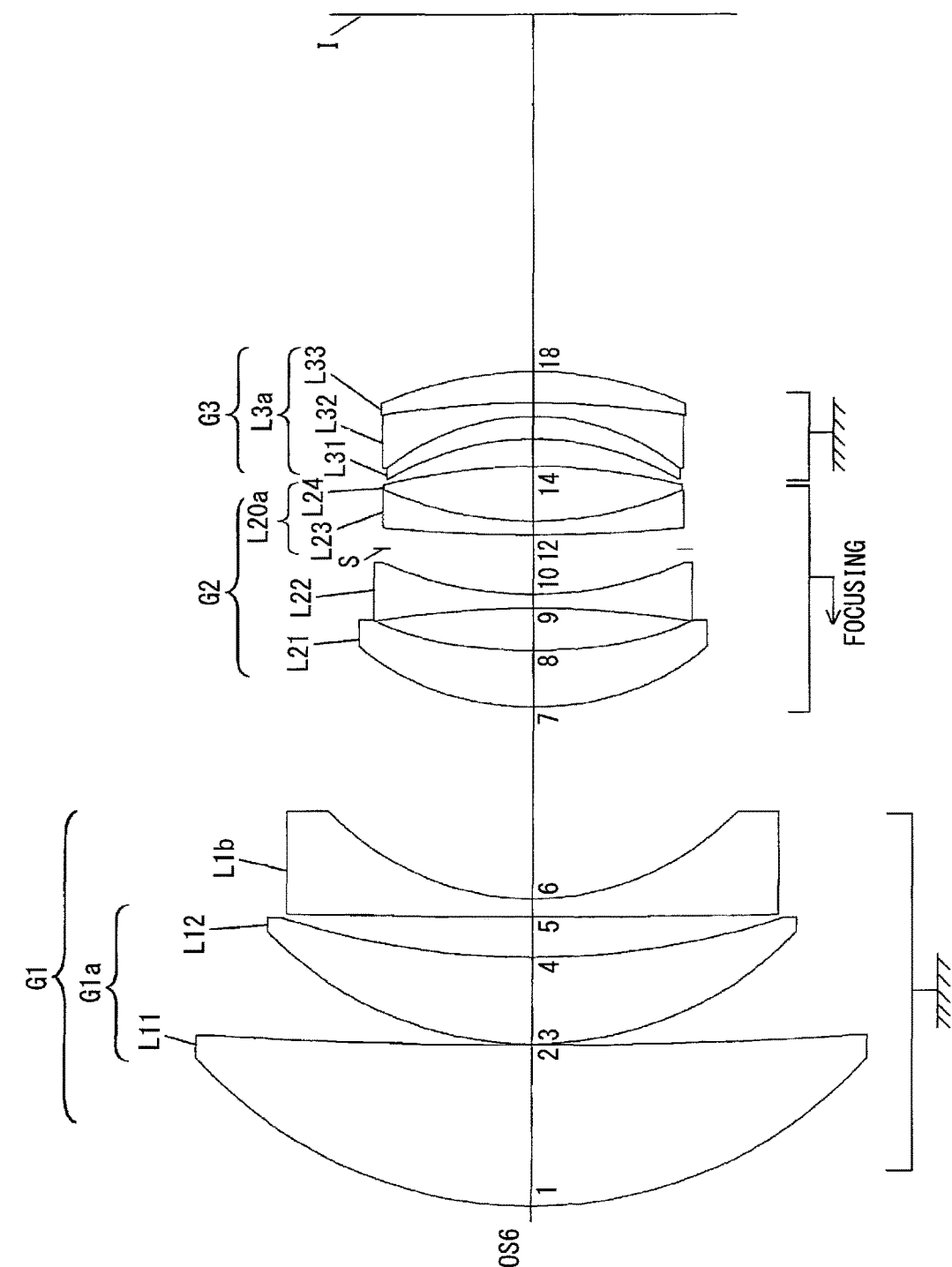
FIG. 20 is a figure showing a sectional view of a lens configuration adopted in an optical system in a sixth example of the present invention in an infinity in-focus state.

FIG. 20 illustrates the configuration of an optical system OS6 in the sixth example. The optical system OS6 comprises a first lens group G1 having a positive refractive power, which remains fixed along the optical axis relative to the image surface upon focusing, a second lens group G2 having a positive refractive power, which moves along the optical axis toward the object side upon focusing and a third lens group G3 having a positive refractive power, which remains fixed along the optical axis relative to the image surface upon focusing, disposed in this order along the optical axis starting on the object side.

The first lens group G1 comprises a partial lens group G1a having a positive refractive power and a negative meniscus lens L1b with a convex surface thereof facing the object side. The partial lens group G1a is made up with a positive meniscus lens L11 with a convex surface thereof facing the object side and a positive meniscus lens L12 with a convex surface thereof facing the object side.

The second lens group G2 comprises a positive meniscus lens L21 with a convex surface thereof facing the object side and both lens surfaces, one on the object side and the other on the image side, having an aspherical shape, a bi-concave negative lens L22, an aperture stop S, and a cemented positive lens L20a formed by bonding together a negative meniscus lens L23 with a convex surface thereof facing the object side and a bi-convex positive lens L24, disposed in this order starting on the object side.

The third lens group G3 is constituted with a cemented positive lens L3a formed by bonding together three lenses, i.e., a positive meniscus lens L31 with a convex surface thereof facing the image side, a negative meniscus lens L32 with a convex surface thereof facing the image side and a positive meniscus lens L33 with a convex surface thereof facing the image side.

Table 104 below lists data values pertaining to the optical system OS6 in the sixth example. It is to be noted that surface numbers 1 through 18 in [Surface Data] correspond to the numbers 1 through 18 in FIG. 20.

TABLE 104

[Overall Specifications]

f = 103.026
FNO = 1.45
ω = 11.76
Y = 21.6
TL = 131.154
Bf = 39.078

[Surface Data]

| Surface Number | r | d | nd | vd |
|---|---|---|---|---|
| Object Surface | ∞ | ∞ | | |
| 1 | 50.8264 | 18.0000 | 66.99 | 1.593490 |
| 2 | 574.4441 | 0.1000 | | |
| 3 | 41.5651 | 9.5000 | 95.25 | 1.433852 |
| 4 | 90.7854 | 4.5000 | | |
| 5 | 989.3195 | 2.0000 | 38.03 | 1.603420 |
| 6 | 31.8136 | variable | | |
| 7* | 34.1685 | 6.3000 | 66.99 | 1.593490 |
| 8* | 65.5156 | 4.6142 | | |
| 9 | −113.4743 | 1.5000 | 38.03 | 1.603420 |
| 10 | 42.6185 | 5.0000 | | |
| 11(aperture) | | 1.5000 | | |
| 12 | 175.0933 | 1.5000 | 40.98 | 1.581440 |
| 13 | 41.8243 | 6.0000 | 46.60 | 1.804000 |
| 14 | −68.3276 | variable | | |
| 15 | −32.0146 | 2.5000 | 52.34 | 1.755000 |
| 16 | −26.3138 | 1.5000 | 38.03 | 1.603420 |
| 17 | −109.0768 | 3.5000 | 35.73 | 1.902650 |
| 18 | −42.6458 | 39.07848 | | |
| Image Surface | ∞ | | | |

[Lens Group Focus length]

| Group | Starting Surface | Focal Length |
|---|---|---|
| 1 | 1 | 219.63262 |
| 2 | 7 | 91.42405 |
| 3 | 15 | 397.58314 |

TABLE 104-continued

[Individual Distance Data]

| | Infinite | Intermediate | Short-distance |
|---|---|---|---|
| F, β | 103.02606 | −0.03333 | −0.12814 |
| D0 | ∞ | 3084.1355 | 818.8457 |
| d6 | 21.06494 | 16.67023 | 5.33006 |
| d14 | 2.99667 | 7.39138 | 18.73154 |

The seventh lens surface and the eighth lens surface in the optical system OS6 in the sixth example are each formed as an aspherical surface. Table 105 below provides aspherical surface data, i.e., the values taken for the conic constant κ and the various aspherical coefficients A4 through A10.

TABLE 105

[Aspherical Surface Data]

| | K | A4 | A6 | A8 | A10 |
|---|---|---|---|---|---|
| No. 7 surface | 1.0000 | 2.44656E−06 | 4.38628E−09 | 4.85921E−12 | 0.00000 |
| No. 8 surface | 1.0000 | 5.98947E−06 | 7.23342E−09 | 0.00000 | 0.00000 |

Table 106 below lists specific values corresponding to the conditional expressions pertaining to the optical system OS6 in sixth example.

TABLE 106

| (101) | (r2nb + r2na)/(r2nb − r2na) = −0.454 |
|---|---|
| (102) | f2/f1 = 0.416 |
| (103) | X2/f2 = 0.0481 |
| (104) | f3/f0 = 3.86 |
| (105) | N24 − N23 = 0.223 |
| (106) | N31 − N32 = 0.152 |
| (107) | vd1a = 81.1 |

As indicated above, the optical system OS6 in the sixth example satisfies all the conditional expressions (101) through (107) described above.

Figure 21:
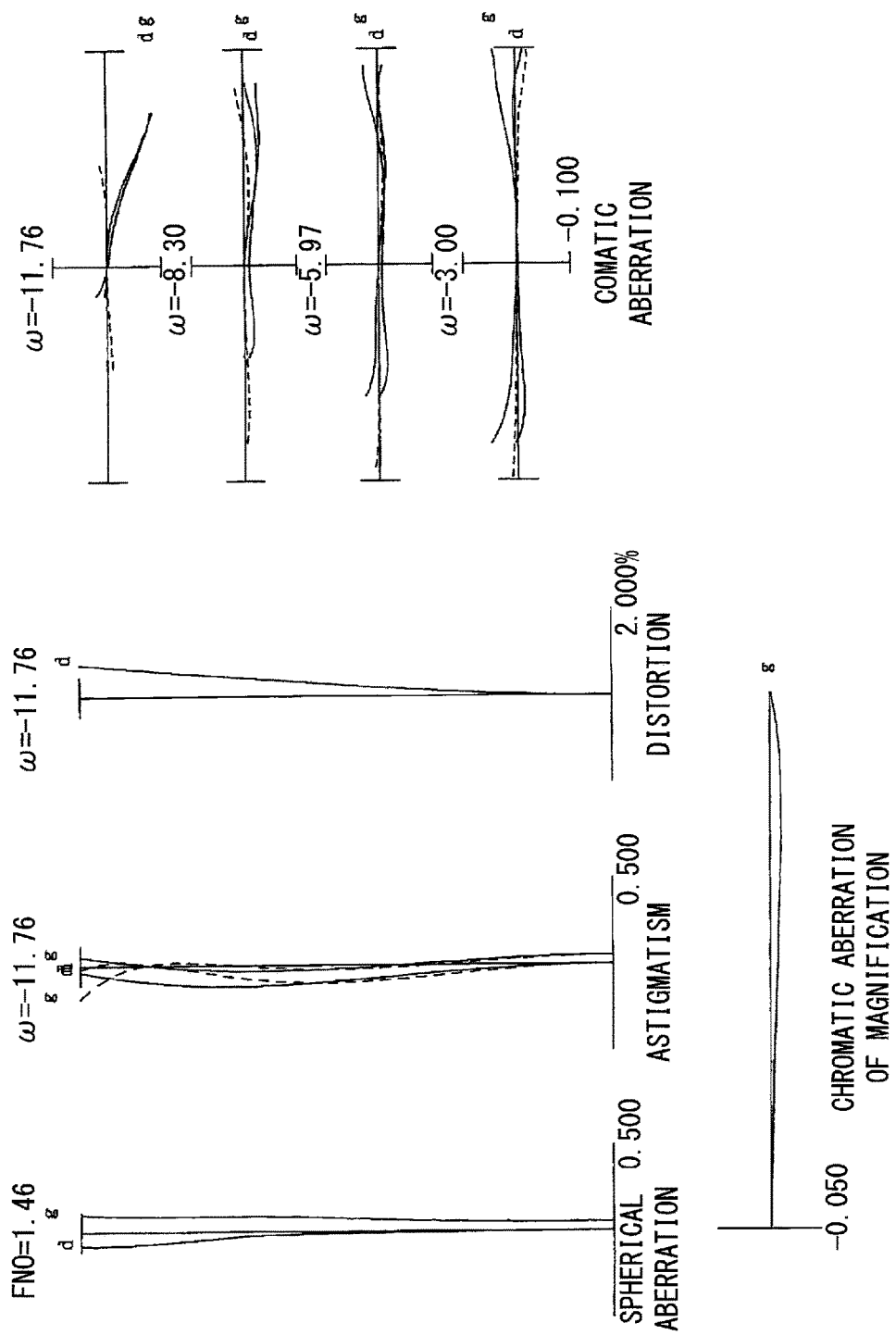
FIG. 21 is a figure showing diagrams of various types of aberration occurring at the optical system in the sixth implementation example of the present invention in an infinity in-focus state.

FIG. 21 provides diagrams pertaining to various types of aberration, i.e., spherical aberration, astigmatism, distortion, chromatic aberration of magnification and comatic aberration, occurring at the optical system OS6 in the sixth example in an infinity in-focus state. As the various aberration diagrams in FIG. 21 clearly indicate, the various types of aberration, including spherical aberration, sagittal comatic aberration, field curvature, astigmatism and meridional comatic aberration are well corrected in the optical system OS6 in the second example, allowing the optical system OS6 to assure a high level of optical performance.

Seventh Example

Figure 22:
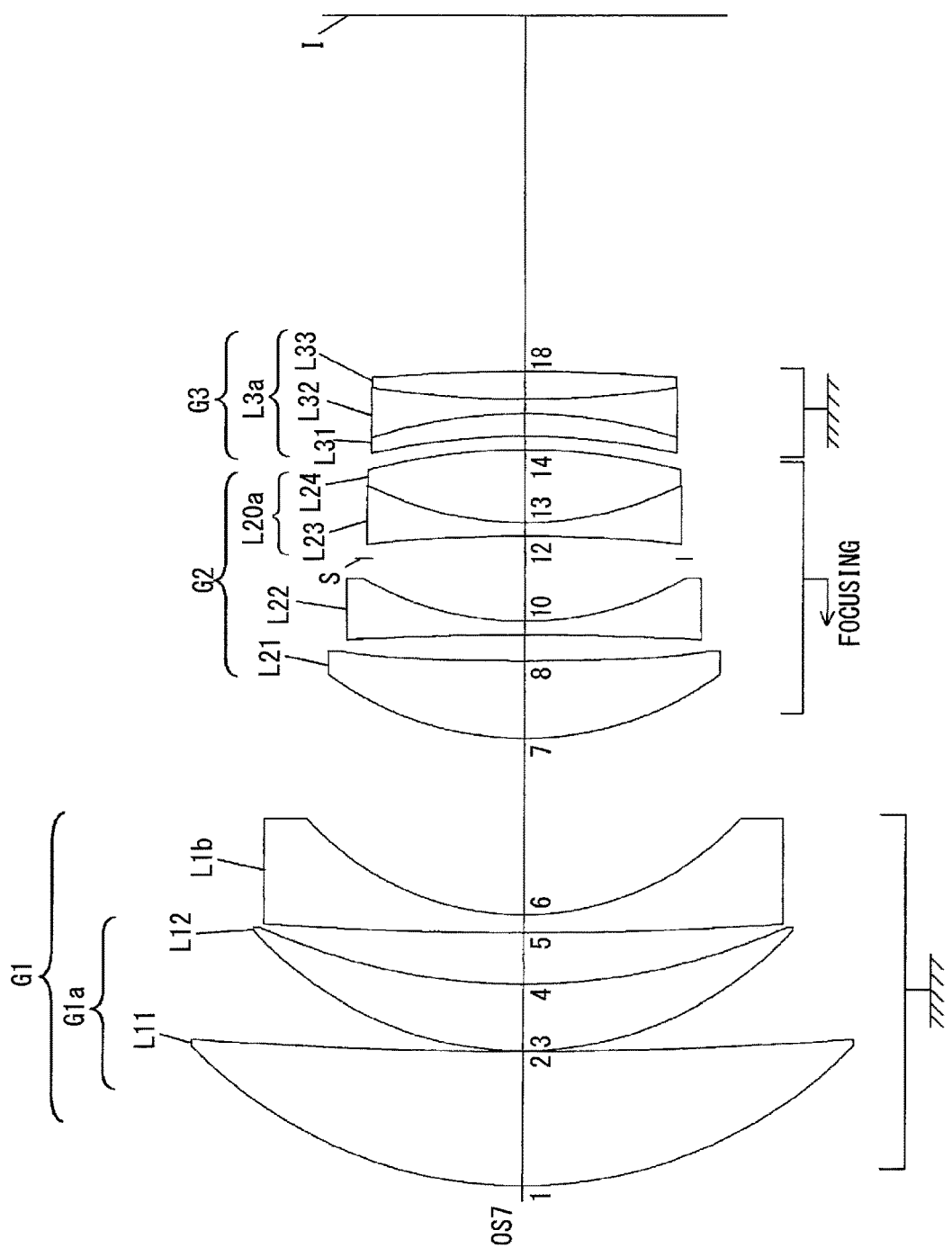
FIG. 22 is a figure showing a sectional view of a lens configuration adopted in an optical system in a seventh example of the present invention in an infinity in-focus state.

FIG. 22 illustrates the configuration of an optical system OS7 in the seventh example. The optical system OS7 comprises a first lens group G1 having a positive refractive power, which remains fixed along the optical axis relative to the image surface upon focusing, a second lens group G2 having a positive refractive power, which moves along the optical axis toward the object side upon focusing, and a third lens group G3 having a positive refractive power, which remains fixed along the optical axis relative to the image surface upon focusing, disposed in this order along the optical axis starting on the object side.

The first lens group G1 comprises a partial lens group G1a having a positive refractive power and a negative meniscus lens L1b with a convex surface thereof facing the object side. The partial lens group G1a is made up with a positive meniscus lens L11 with a convex surface thereof facing the object side and a positive meniscus lens L12 with a convex surface thereof facing the object side.

The second lens group G2 comprises a positive meniscus lens L21 with a convex surface thereof facing the object side and both lens surfaces, one on the object side and the other on the image side, having an aspherical shape, a bi-concave negative lens L22, an aperture stop S and a cemented positive lens L20a formed by bonding together a bi-concave negative lens L23 and a bi-convex positive lens L24, disposed in this order starting on the object side.

The third lens group G3 is constituted with a cemented positive lens L3a formed by bonding together three lenses, i.e., a positive meniscus lens L31 with a convex surface thereof facing the image side, a bi-concave negative lens L32 and a bi-convex positive lens L33.

Table 107 below lists data values pertaining to the optical system OS7 in the seventh example. It is to be noted that surface numbers 1 through 18 in [Surface Data] correspond to the numbers 1 through 18 in FIG. 22.

TABLE 107

[Overall Specifications]

f = 102.950
FNO = 1.45
ω = 11.76
Y = 21.6
TL = 129.128
Bf = 39.107

[Surface Data]

| Surface Number | r | d | nd | vd |
|---|---|---|---|---|
| Object Surface | ∞ | ∞ | | |
| 1 | 51.4246 | 15.0000 | 66.99 | 1.593490 |
| 2 | 475.3841 | 0.1000 | | |
| 3 | 40.6677 | 7.3441 | 95.25 | 1.433852 |
| 4 | 71.7978 | 5.7000 | | |
| 5 | 429.5958 | 2.0000 | 40.98 | 1.581440 |
| 6 | 32.9292 | variable | | |
| 7* | 38.0361 | 8.5000 | 66.99 | 1.593490 |
| 8* | 426.5656 | 2.8267 | | |
| 9 | −387.2993 | 1.5000 | 38.03 | 1.603420 |
| 10 | 36.3815 | 7.0000 | | |
| 11(aperture) | | 2.5000 | | |
| 12 | −172.8451 | 1.5000 | 40.98 | 1.581440 |
| 13 | 40.0035 | 8.0000 | 46.60 | 1.804000 |
| 14 | −70.0997 | variable | | |
| 15 | −80.4245 | 2.5000 | 31.31 | 1.903660 |
| 16 | −57.3390 | 1.6000 | 38.03 | 1.603420 |
| 17 | 117.5351 | 3.0000 | 35.73 | 1.902650 |
| 18 | −238.3742 | 39.10698 | | |
| Image Surface | ∞ | | | |

[Lens Group Focus length]

| Group | Starting Surface | Focal Length |
|---|---|---|
| 1 | 1 | 245.07287 |
| 2 | 7 | 93.80859 |
| 3 | 15 | 1783.64648 |

TABLE 107-continued

[Individual Distance Data]

| | Infinite | Intermediate | Short-distance |
|---|---|---|---|
| F, β | 102.94993 | −0.03333 | −0.12987 |
| D0 | ∞ | 3099.4053 | 820.8718 |
| d6 | 19.50557 | 15.46676 | 4.62396 |
| d14 | 1.44483 | 5.48363 | 16.32644 |
| BF | 39.10698 | 39.10698 | 39.10698 |

The seventh lens surface and the eighth lens surface in the optical system OS7 in the seventh example are each formed as an aspherical surface. Table 108 below provides aspherical surface data, i.e., the values taken for the conic constant κ and the various aspherical coefficients A4 through A10.

TABLE 108

| | K | A4 | A6 | A8 | A10 |
|---|---|---|---|---|---|
| No. 7 Surface | 1.0000 | 1.53599E−07 | 5.63564E−10 | 0.00000 | 0.00000 |
| No. 8 Surface | 1.0000 | 2.89610E−06 | 1.42416E−10 | 0.00000 | 0.00000 |

Table 109 below lists specific values corresponding to the conditional expressions pertaining to the optical system OS7 in seventh example.

TABLE 109

| (101) | (r2nb + r2na)/(r2nb − r2na) = −0.828 |
|---|---|
| (102) | f2/f1 = 0.383 |
| (103) | X2/f2 = 0.0431 |
| (104) | f3/f0 = 17.33 |
| (105) | N24 − N23 = 0.223 |
| (106) | N31 − N32 = 0.300 |
| (107) | vd1a = 81.1 |

As indicated above, the optical system OS7 in the seventh example satisfies all the conditional expressions (101) through (107) described above.

Figure 23:
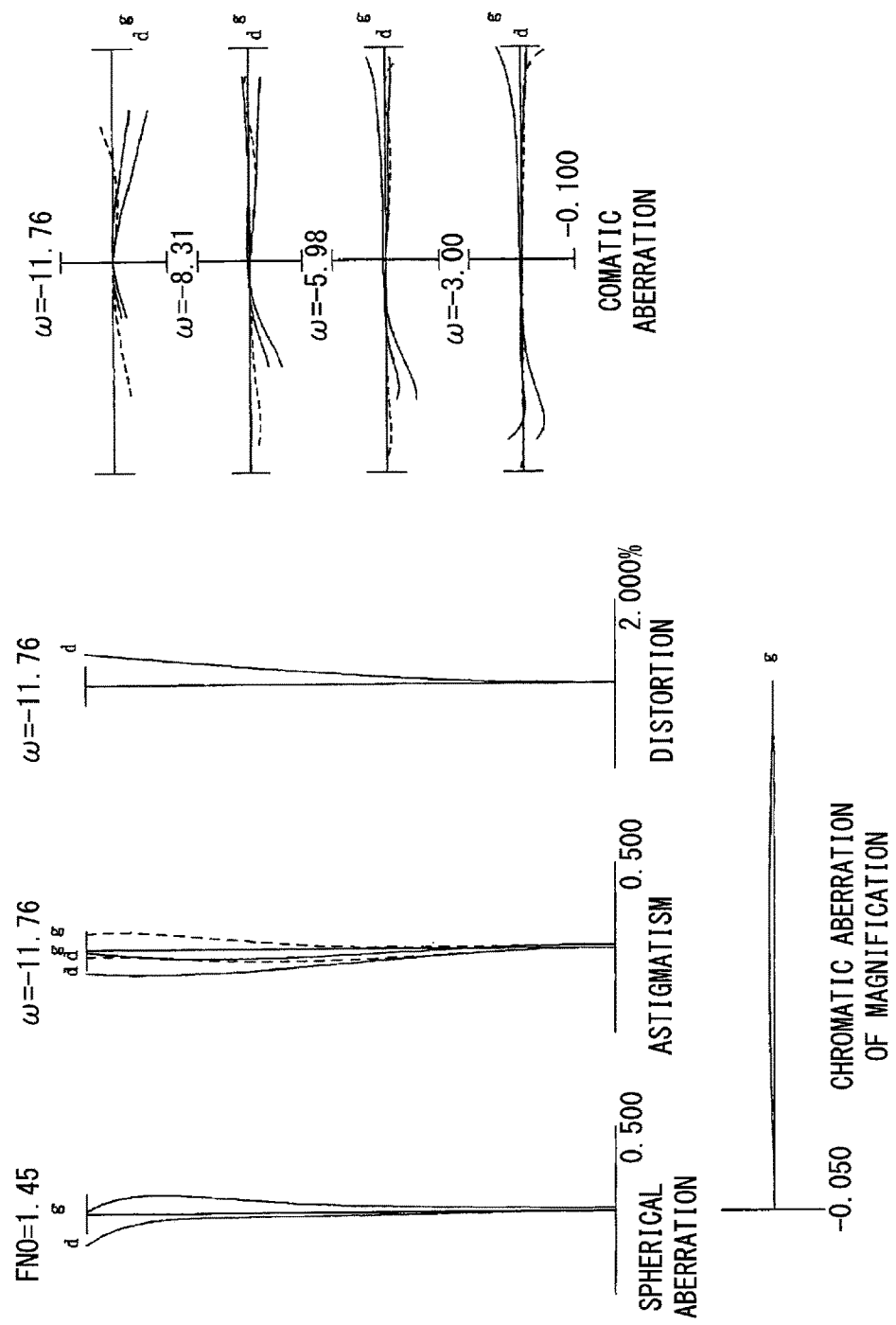
FIG. 23 is a figure showing diagrams of various types of aberration occurring at the optical system in the seventh example of the present invention in an infinity in-focus state.

FIG. 23 provides diagrams pertaining to various types of aberration, i.e., spherical aberration, astigmatism, distortion, chromatic aberration of magnification and comatic aberration, occurring at the optical system OS7 in the seventh example in an infinity in-focus state. As the various aberration diagrams in FIG. 23 clearly indicate, the various types of aberration, including spherical aberration, sagittal comatic aberration, field curvature, astigmatism and meridional comatic aberration are well corrected in the optical system OS7 in the seventh example, allowing the optical system OS7 to assure a high level of optical performance.

Eighth Example

Figure 24:
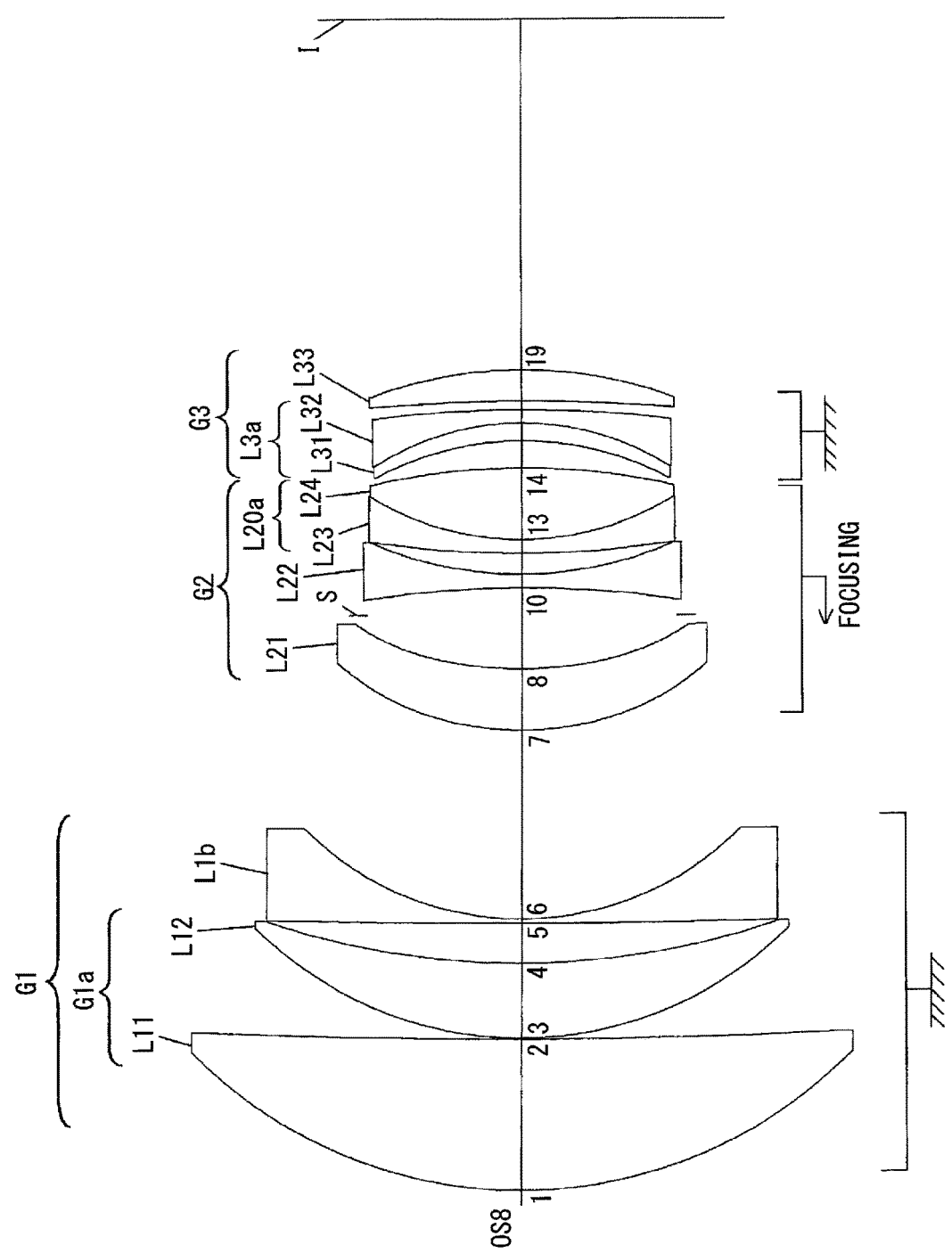
FIG. 24 is a figure showing a sectional view of a lens configuration adopted in an optical system in an eighth example of the present invention in an infinity in-focus state.

FIG. 24 illustrates the configuration of an optical system OS8 in the eighth example. The optical system OS8 comprises a first lens group G1 having a positive refractive power, which remains fixed along the optical axis relative to the image surface upon focusing, a second lens group G2 having a positive refractive power, which moves along the optical axis toward the object side upon focusing, and a third lens group G3 having a positive refractive power, which remains fixed along the optical axis relative to the image surface upon focusing, disposed in this order along the optical axis starting on the object side.

The first lens group G1 comprises a partial lens group G1a having a positive refractive power and a negative meniscus lens L1b with a convex surface thereof facing the object side. The partial lens group G1a is made up with a positive meniscus lens L11 with a convex surface thereof facing the object side and a positive meniscus lens L12 with a convex surface thereof facing the object side.

The second lens group G2 comprises a positive meniscus lens L21 with a convex surface thereof facing the object side and both lens surfaces, one on the object side and the other on the image side, having an aspherical shape, an aperture stop S, a bi-concave negative lens L22, and a cemented positive lens L20a formed by bonding together a negative meniscus lens L23 with a convex surface thereof facing the object side and a bi-convex positive lens L24, disposed in this order starting on the object side.

The third lens group G3 comprises a cemented lens L3a having a negative refractive power and a positive meniscus lens L33 with a convex surface thereof facing the image side. The cemented lens L3a is formed by bonding together a positive meniscus lens L31 with a convex surface thereof facing the image side and a negative meniscus lens L32 with a convex surface thereof facing the image side.

Table 110 below lists data values pertaining to the optical system OS8 in the eighth example. It is to be noted that surface numbers 1 through 19 in Table 10 correspond to the numbers 1 through 19 in FIG. 24.

TABLE 110

[Overall Specifications]

f = 103.323
FNO = 1.45
ω = 11.67
Y = 21.6
TL = 130.794
Bf = 38.989

[Surface Data]

| Surface Number | r | d | nd | vd |
|---|---|---|---|---|
| Object Surface | ∞ | ∞ | | |
| 1 | 51.1843 | 17.0852 | 66.99 | 1.593490 |
| 2 | 726.6420 | 0.1000 | | |
| 3 | 42.0230 | 8.3896 | 95.25 | 1.433852 |
| 4 | 88.5300 | 4.5000 | | |
| 5 | 988.8842 | 0.4859 | 38.03 | 1.603420 |
| 6 | 34.5201 | variable | | |
| 7* | 34.5273 | 6.8835 | 66.99 | 1.593490 |
| 8* | 45.6828 | 6.0000 | | |
| 9(aperture) | | 3.0000 | | |
| 10 | −118.3704 | 1.5000 | 38.03 | 1.603420 |
| 11 | 42.6185 | 2.3000 | | |
| 12 | 110.4518 | 1.5000 | 40.98 | 1.581440 |
| 13 | 32.2380 | 8.0000 | 46.60 | 1.804000 |
| 14 | −75.9672 | variable | | |
| 15 | −34.8997 | 2.0000 | 52.34 | 1.755000 |
| 16 | −30.5647 | 1.5000 | 38.03 | 1.603420 |
| 17 | −136.3982 | 1.0000 | | |
| 18 | −190.8904 | 3.5000 | 35.73 | 1.902650 |
| 19 | −48.5142 | 38.98862 | | |
| Image Surface | ∞ | | | |

[Lens Group Focus length]

| Group | Starting Surface | Focal Length |
|---|---|---|
| 1 | 1 | 211.75620 |
| 2 | 7 | 111.18807 |
| 3 | 15 | 309.68514 |

TABLE 110-continued

[Individual Distance Data]

|  | Infinite | Intermediate | Short-distance |
|---|---|---|---|
| F, β | 103.32338 | −0.03333 | −0.13107 |
| D0 | ∞ | 3111.0468 | 819.2056 |
| d6 | 21.06494 | 16.13836 | 3.10018 |
| d14 | 2.99667 | 7.92324 | 20.96143 |

The seventh lens surface and the eighth lens surface in the optical system OS8 in the eighth example are each formed as an aspherical surface. Table 111 below provides aspherical surface data, i.e., the values taken for the conic constant κ and the various aspherical coefficients A4 through A10.

TABLE 111

|  | K | A4 | A6 | A8 | A10 |
|---|---|---|---|---|---|
| No. 7 surface | 1.0000 | 2.22055E−06 | 4.81838E−09 | −1.13690E−12 | −1.12000E−15 |
| No. 8 surface | 1.0000 | 5.98947E−06 | 7.00736E−09 | 6.63981E−12 | −1.81185E−14 |

Table 112 below lists specific values corresponding to the conditional expressions pertaining to the optical system OS8 in eighth example.

TABLE 112

| (101) | (r2nb + r2na)/(r2nb − r2na) = −0.471 |
|---|---|
| (102) | f2/f1 = 0.525 |
| (103) | X2/f2 = 0.0443 |
| (104) | f3/f0 = 2.997 |
| (105) | N24 − N23 = 0.223 |
| (106) | N31 − N32 = 0.152 |
| (107) | vd1a = 81.1 |

As indicated above, the optical system OS8 in the eighth example satisfies all the conditional expressions (101) through (107) described above.

Figure 25:
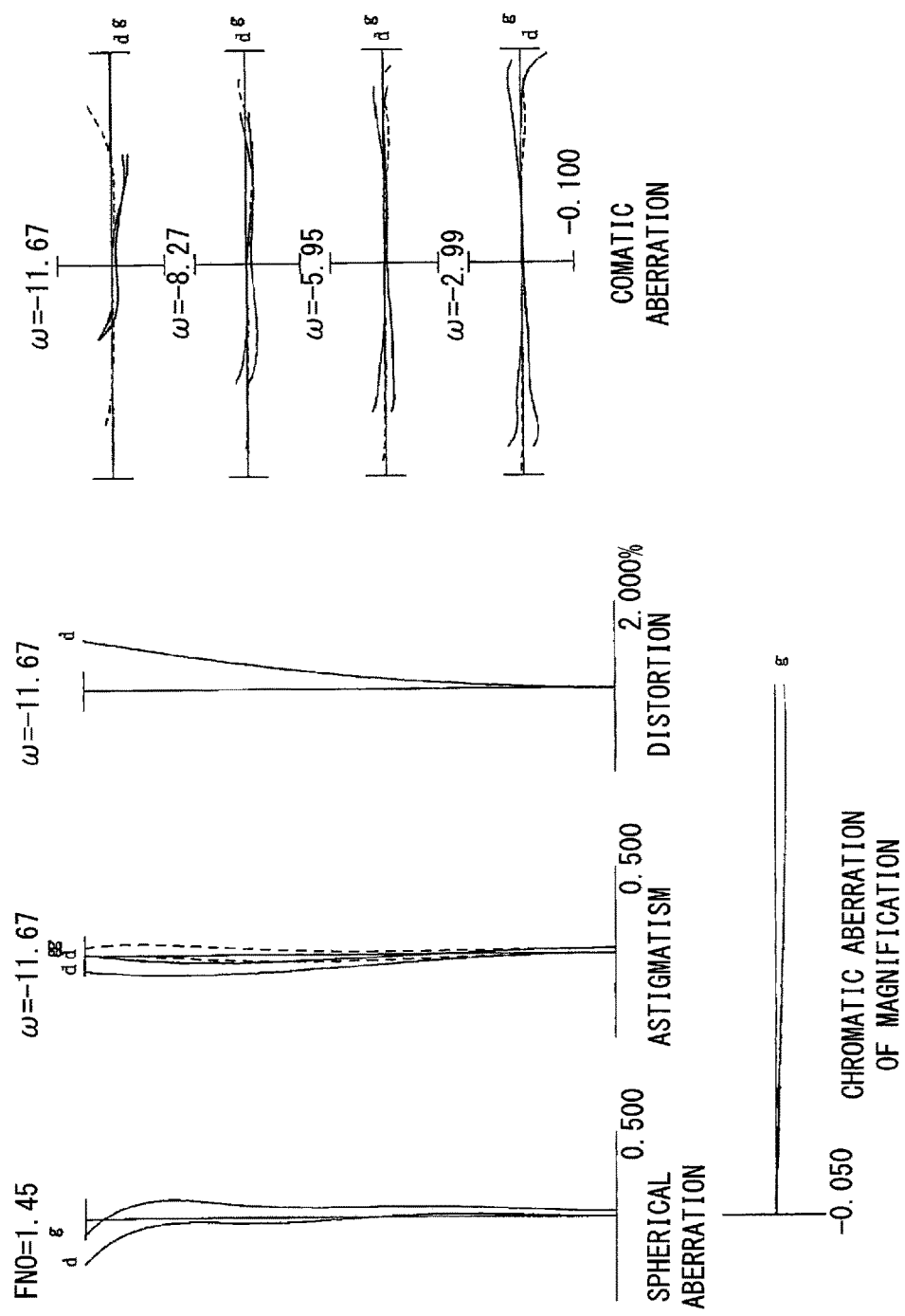
FIG. 25 is a figure showing diagrams of various types of aberration occurring at the optical system in the eighth example of the present invention in an infinity in-focus state.

FIG. 25 provides diagrams pertaining to various types of aberration, i.e., spherical aberration, astigmatism, distortion, chromatic aberration of magnification and comatic aberration, occurring at the optical system OS8 in the eighth example in an infinity in-focus state. As the various aberration diagrams in FIG. 25 clearly indicate, the various types of aberration, including spherical aberration, sagittal comatic aberration, field curvature, astigmatism and meridional comatic aberration are well corrected in the optical system OS8 in the eighth example, allowing the optical system OS8 to assure a high level of optical performance.

Through each of the examples described above, an optical system OS assuming a coverage angle of approximately 2ω=23° and a large diameter of F1.4, which assures a high level of performance and good correction of spherical aberration, astigmatism, field curvature and comatic aberration, can be provided.

It will be obvious that the advantageous effects mentioned above can be achieved by mounting any of the optical systems OS5 through OS8 in the examples described above in the camera 1 described above. In addition, the examples described above each represent a specific example of the present invention and the present invention is in no way limited to these examples.

The disclosure of the following priority applications are herein incorporated by reference. Japanese Patent Application No. 2015-011652 filed on Jan. 23, 2015 Japanese Patent Application No. 2015-098229 filed on May 13, 2015

REFERENCE SIGNS LIST

OS (OS1~OS8) optical system
G1 first lens group
G2 second lens group
U1a first partial lens group having positive refractive power in first lens group
U2b second partial lens group having positive refractive power in second lens group
L2c cemented lens in second lens group
L1 first positive lens in partial lens group U1a
L2 second positive lens in partial lens group U1a
L3 third positive lens in partial lens group U1a
L1b negative lens in first lens group
L2a meniscus lens in second lens group
L2a2 positive lens in second lens group
L2n negative lens in second lens group
L2b1 positive lens in second partial lens group U2b
L2b2 positive lens in second partial lens group U2b
L2cpa positive lens in cemented lens L2c
L2cn negative lens in cemented lens L2c
L2cpb positive lens in cemented lens L2c
S aperture stop
1 single lens reflex camera (image-capturing device)
G3 third lens group
G1a partial lens group having a positive refractive power in first lens group
L20a cemented positive lens in second lens group
L11 first positive lens in partial lens group G1a
L12 second positive lens in partial lens group G1a
L21 positive meniscus lens in second lens group
L22 negative lens in second lens group
L23 negative lens in cemented positive lens L2a in second lens group
L24 positive lens in cemented positive lens L2a in second lens group
L31 positive lens in third lens group
L32 negative lens in third lens group
L33 positive lens in third lens group

The invention claimed is:

1. An optical system comprising, disposed in sequence along an optical axis starting on an object side:
   a first lens group having a positive refractive power, which remains fixed relative to an image surface upon focusing; and
   a second lens group having a positive refractive power, which moves along the optical axis upon focusing,
   wherein:
   the first lens group comprises:
      a first partial lens group that comprises at least two positive lenses and has a positive refractive power; and
      a negative lens,
   the second lens group comprises:
      at least one meniscus lens with a convex surface thereof facing the object side;
      at least one negative lens disposed toward the image surface side relative to the meniscus lens;

a second partial lens group that is disposed next to and on the image surface side of a negative lens having a highest negative refractive power, among the at least one negative lens, comprises at least one positive lens, and has a positive refractive power; and a cemented lens that is disposed on the image surface side of the second partial lens group, is formed by bonding together a plurality of lenses and has a positive refractive power, wherein:

a lens surface in the second partial lens group, located closest to the image surface side and a lens surface of the cemented lens, located closest to the object side, have a convex shape facing the image surface side and sit opposite each other via an air gap; and a following conditional expression is satisfied:

$-1.00<(rbc2-rbc1)/(rbc2+rbc1)<0.00$ where:
rbc1: a radius of curvature of the lens surface in the second partial lens group located closest to the image surface side; and
rbc2: a radius of curvature of the lens surface of the cemented lens located closest to the object side.

2. The optical system according to claim 1, wherein:
a following conditional expression is satisfied:

$0.00<|(ra2-ra1)/(ra2+ra1)|<1.00$ where:
ra1: a radius of curvature of an object side lens surface of the meniscus lens; and
ra2: a radius of curvature of an image surface side lens surface of the meniscus lens.

3. The optical system according to claim 1, wherein:
a following conditional expression is satisfied:

$0.40<f2/f0<1.00$ where:
f2: a focal length of the second lens group; and
f0: a focal length of an entire system in an infinity in-focus state.

4. The optical system according to claim 1, wherein:
a following conditional expression is satisfied:

$0.80<f1/f0<10.00$ where:
f1: a focal length of the first lens group; and
f0: a focal length of an entire system in an infinity in-focus state.

5. The optical system according to claim 1, wherein:
a following conditional expression is satisfied:

$55.00<vd1a$ where:
vd1a: an average value of Abbe numbers of the at least two positive lenses in the first partial lens group.

6. The optical system according to claim 1, wherein:
a following conditional expression is satisfied:

$50.00<vd2b$ where:
vd2b: an average value of Abbe numbers of the at least one positive lens in the second partial lens group.

7. The optical system according to claim 1, wherein:
a following conditional expression is satisfied:

$0.50<f2c/f0<3.00$ where:
f2c: a focal length of the cemented lens; and
f0: a focal length of an entire system in an infinity in-focus state.

8. The optical system according to claim 1, wherein:
the cemented lens comprises at least one positive lens and at least one negative lens and a following conditional expression is satisfied:

$0.10<N2cp-N2cn<0.50$ where:
N2cp: a refractive index at a d-line of an image surface side positive lens that is disposed closest to the image surface side, among the at least one positive lens in the cemented lens; and
N2cn: a refractive index at the d-line of a negative lens bonded on the object side of the image surface side positive lens, among the at least one negative lens in the cemented lens.

9. The optical system according to claim 1, further comprising:
an aperture stop, via which an F number is determined, disposed toward the image surface side relative to the first lens group.

10. The optical system according to claim 1, further comprising:
an aperture stop, via which an F number is determined, disposed in the second lens group.

11. The optical system according to claim 1, further comprising:
an aperture stop, via which an F number is determined, disposed between the meniscus lens and a negative lens located closest to the object side, among the at least one negative lens in the second lens group.

12. The optical system according to claim 1, having at least one aspherical surface.

13. The optical system according to claim 1, wherein:
an anti-reflection film is disposed at at least one optical surface; and
the anti-reflection film comprises at least one layer formed through a wet process.

14. The optical system according to claim 13, wherein:
the anti-reflection film is a multilayer film; and
the layer formed through the wet process is a layer at an outermost surface side, among layers constituting the multilayer film.

15. The optical system according to claim 13, wherein:
nd representing a refractive index at a d-line (wavelength $\lambda=587.6$ nm) of the layer formed through the wet process is equal to or less than 1.30.

16. The optical system according to claim 13, wherein:
the optical surface at which the anti-reflection film is disposed is a lens surface having a concave shape viewed from an aperture stop.

17. The optical system according to claim 16, wherein:
the lens surface having the concave shape viewed from the aperture stop is an image surface side lens surface.

18. The optical system according to claim 16, wherein:
the lens surface having the concave shape viewed from the aperture stop is an object side lens surface.

19. The optical system according to claim 13, wherein:
the optical surface at which the anti-reflection film is disposed is a lens surface having a concave shape viewed from the object side.

20. The optical system according to claim 13, wherein:
the optical surface at which the anti-reflection film is disposed is a lens surface having a concave shape viewed from the image surface side.

21. An image-capturing device comprising the optical system according to claim 1.

22. An optical system comprising, disposed in sequence along an optical axis starting on an object side:
- a first lens group having a positive refractive power, which remains fixed along an optical axis relative to the image surface upon focusing;
- a second lens group having a positive refractive power, which moves along the optical axis upon focusing; and
- a third lens group having a positive refractive power, which remains fixed along the optical axis relative to the image surface upon focusing, wherein:
- the first lens group comprises a partial lens group that comprises at least two positive lenses and has, as a whole, a positive refractive power, and a negative lens;
- the second lens group comprises a positive lens, a negative lens and a cemented lens having a positive refractive power, disposed in sequence starting on the object side;
- the third lens group comprises a cemented lens; and
- a following conditional expression is satisfied:

$$-1.00 < (r2nb+r2na)/(r2nb-r2na) < 0.00$$

where:
- r2na: a radius of curvature of an object side lens surface of the negative lens in the second lens group; and
- r2nb: a radius of curvature of an image side lens surface of the negative lens in the second lens group.

23. The optical system according to claim 22, wherein: a following conditional expression is satisfied:

$$0.35 < f2/f1 < 1.00$$

where:
- f2: a focal length of the second lens group; and
- f1: a focal length of the first lens group.

24. The optical system according to claim 22, wherein: a following conditional expression is satisfied:

$$0.00 < X2/f2 < 0.10$$

where:
- X2: a distance by which the second lens group moves for focusing from an infinity in-focus state to a state equivalent to an image-forming magnification factor $\beta=-\frac{1}{30}$; and
- f2: a focal length of the second lens group.

25. The optical system according to claim 22, wherein: a following conditional expression is satisfied:

$$1.00 < f3/f0 < 20.00$$

where:
- f3: a focal length of the third lens group; and
- f0: a focal length of an entire system in an infinity in-focus state.

26. The optical system according to claim 22, wherein:
- the cemented lens in the second lens group is formed by bonding together a negative lens and a positive lens; and
- a following conditional expression is satisfied:

$$0.10 < N24-N23 < 0.50$$

where:
- N23: a refractive index at a d-line of the negative lens constituting part of the cemented lens in the second lens group; and
- N24: a refractive index at the d-line of the positive lens constituting part of the cemented lens in the second lens group.

27. The optical system according to claim 22, wherein:
- the cemented lens in the third lens group comprises an object side positive lens that is disposed closest to the object side and a negative lens bonded on an image side of the object side positive lens; and
- a following conditional expression is satisfied:

$$0.10 < N31-N32 < 0.50$$

where:
- N31: a refractive index of the object side positive lens at a d-line
- N32: a refractive index at the d-line of the negative lens bonded on the image side of the object side positive lens.

28. The optical system according to claim 22, wherein: a following conditional expression is satisfied:

$$57.00 < vd1a$$

where:
- vd1a: an average value of Abbe numbers of the at least two positive lenses in the partial lens group.

29. The optical system according to claim 22, further comprising:
- an aperture stop, via which an F number is determined, disposed toward an image side relative to the first lens group.

30. The optical system according to claim 22, further comprising:
- an aperture stop, via which an F number is determined, disposed in the second lens group.

31. The optical system according to claim 22, further comprising:
- an aperture stop, via which an F number is determined, disposed between the positive lens and the negative lens within the second lens group, or between the negative lens and the cemented lens within the second lens group.

32. The optical system according to claim 22, comprising at least one aspherical surface.

33. An image-capturing device comprising the optical system according to claim 22.

34. A method for manufacturing an optical system that comprises a first lens group having a positive refractive power, which remains fixed relative to an image surface upon focusing, and a second lens group having a positive refractive power, which moves along an optical axis upon focusing, disposed in sequence along the optical axis starting on an object side, the method comprising:
- achieving that the first lens group comprises:
  - a first partial lens group that comprises at least two positive lenses and has a positive refractive power; and
  - a negative lens;
- achieving that the second lens group comprises:
  - at least one meniscus lens with a convex surface thereof facing the object side;
  - at least one negative lens, disposed toward an image surface side relative to the meniscus lens;
  - a second partial lens group that is disposed next to and on the image surface side of a negative lens having a highest negative refractive power, among the at least one negative lens, comprises at least one positive lens and has a positive refractive power; and
  - a cemented lens that is disposed on the image surface side of the second partial lens group, is formed by bonding together a plurality of lenses and has a positive refractive power;

achieving that a lens surface located closest to the image surface side in the second partial lens group and a lens surface located closest to the object side in the cemented lens have a convex shape facing the image surface side and sit opposite each other via an air gap; and achieving that a following conditional expression is satisfied $$-1.00<(rbc2-rbc1)/(rbc2+rbc1)<0.00$$

where:
rbc1: a radius of curvature of the lens surface in the second partial lens group located closest to the image surface side; and
rbc2: a radius of curvature of the lens surface of the cemented lens located closest to the object side.

35. The method for manufacturing an optical system according to claim 34, further comprising:
disposing an anti-reflection film at at least one optical surface, wherein:
the anti-reflection film comprises at least one layer formed through a wet process.

36. A method for manufacturing an optical system that comprises a first lens group having a positive refractive power, which remains fixed along an optical axis relative to an image surface upon focusing, a second lens group having a positive refractive power, which moves along the optical axis upon focusing, and a third lens group having a positive refractive power, which remains fixed along the optical axis relative to the image surface upon focusing, disposed in sequence along the optical axis starting on an object side, the method comprising:

achieving that the first lens group comprises a partial lens group which comprises at least two positive lenses and has, as a whole, a positive refractive power, and a negative lens;

achieving that the second lens group comprises a positive lens, a negative lens and a cemented lens having a positive refractive power, disposed in sequence starting on the object side;

achieving that the third lens group comprises a cemented lens; and achieving that a following conditional expression is satisfied:

$$-1.00<(r2nb+r2na)/(r2nb-r2na)<0.00$$

where:
r2na: a radius of curvature of an object side lens surface of the negative lens in the second lens group; and
r2nb: a radius of curvature of an image side lens surface of the negative lens in the second lens group.

* * * * *

UNITED STATES PATENT AND TRADEMARK OFFICE
CERTIFICATE OF CORRECTION

PATENT NO. : 10,302,905 B2
APPLICATION NO. : 15/544308
DATED : May 28, 2019
INVENTOR(S) : Sato et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 107 days.

Signed and Sealed this
Twenty-ninth Day of October, 2019

Andrei Iancu
*Director of the United States Patent and Trademark Office*